United States Patent
Kim et al.

(10) Patent No.: US 11,434,134 B2
(45) Date of Patent: Sep. 6, 2022

(54) MODIFIED SULFUR, METHOD FOR PREPARING SAME, APPARATUS FOR PREPARING SAME, AND USE THEREOF

(71) Applicant: Korea Institute of Science and Technology, Seoul (KR)

(72) Inventors: Goo Dae Kim, Seoul (KR); No Gyung Park, Pocheon-si (KR); Hyok Kwon, Seoul (KR); Young Sik Seo, Seoul (KR); Seung Gun Yu, Seoul (KR); Hyuk Rae Noh, Icheon-si (KR)

(73) Assignee: Korea Institute of Science and Technology, Seoul (KR)

( * ) Notice: Subject to any disclaimer, the term of this patent is extended or adjusted under 35 U.S.C. 154(b) by 907 days.

(21) Appl. No.: 16/246,819

(22) Filed: Jan. 14, 2019

(65) Prior Publication Data
US 2019/0185322 A1 Jun. 20, 2019

Related U.S. Application Data

(62) Division of application No. 14/900,102, filed as application No. PCT/KR2013/005487 on Jun. 21, 2013, now Pat. No. 10,179,736.

(30) Foreign Application Priority Data

Jun. 22, 2012 (KR) .......................... 10-2012-0067603
Jun. 19, 2013 (KR) .......................... 10-2013-0070552
(Continued)

(51) Int. Cl.
*C01B 17/02* (2006.01)
*C09D 145/00* (2006.01)
(Continued)

(52) U.S. Cl.
CPC ............. *C01B 17/0243* (2013.01); *B01J 8/16* (2013.01); *B01J 19/10* (2013.01); *B01J 19/245* (2013.01);
(Continued)

(58) Field of Classification Search
None
See application file for complete search history.

(56) References Cited

U.S. PATENT DOCUMENTS 4,025,352 A * 5/1977 Leutner ................... C08L 81/00
501/140
4,298,397 A * 11/1981 Burris ...................... C08K 3/06
516/41
(Continued)

FOREIGN PATENT DOCUMENTS

CN 1849273 A 10/2006
CN 101235505 A 8/2008
(Continued)

OTHER PUBLICATIONS

George Odian, "Principles of Polymerization," *Wiley-Interscience, A John Wiley & Sons, Inc.*, Publication, Fourth Edition, Feb. 27, 2004, pp. 227-228 (5 pages in English).
(Continued)

*Primary Examiner* — Joseph D Anthony
(74) *Attorney, Agent, or Firm* — NSIP Law

(57) ABSTRACT

Disclosure relates to modified sulfur, preparation method thereof, preparation equipment thereof. The modified sulfur has spinnability or includes micro-structures such as fiber-, film- and network-like structure. The modified sulfur can be prepared by inducing polymerization with ultrasonic or ageing. The modified sulfur has various excellent features such as anticorrosiveness, waterproofing, strength, and fast drying and can control the features depending on its viscos-
(Continued)

ity or polymerization degree. In addition due to the above features, the modified sulfur can be applied to anticorrosive or waterproofing material and can prepare anticorrosive or waterproofing material which has good workability, hardening, salt spray resistance, and weldability exceeding a certain level, and specially improved adhesiveness. Furthermore, when applying the modified sulfur to asphalt composition, gelation and depression are reduced, properties such as bending strength and tensile strength are improved, and it is possible to obtain asphalt composition with good working stability at RT.

7 Claims, 21 Drawing Sheets

(30) Foreign Application Priority Data

Jun. 19, 2013 (KR) .................. 10-2013-0070555
Jun. 19, 2013 (KR) .................. 10-2013-0070556
Jun. 19, 2013 (KR) .................. 10-2013-0070559

(51) Int. Cl.
  *B01J 19/24* (2006.01)
  *B01J 19/10* (2006.01)
  *C09D 5/08* (2006.01)
  *C08L 95/00* (2006.01)
  *B01J 8/16* (2006.01)

(52) U.S. Cl.
  CPC .............. *C08L 95/00* (2013.01); *C09D 5/08* (2013.01); *C09D 145/00* (2013.01); *B01J 2208/00017* (2013.01); *B01J 2208/00557* (2013.01); *B01J 2208/00575* (2013.01); *B01J 2219/00051* (2013.01); *B01J 2219/00164* (2013.01); *B01J 2219/00168* (2013.01); *Y02W 30/91* (2015.05)

(56) References Cited

U.S. PATENT DOCUMENTS

| | | | |
|---|---|---|---|
| 4,311,826 A | 1/1982 | McBee et al. | |
| 4,740,559 A * | 4/1988 | Johansson | C08G 75/00 525/289 |
| 7,846,979 B2 | 12/2010 | Rojey et al. | |
| 8,207,249 B2 * | 6/2012 | Choe | C04B 28/36 106/644 |
| 10,179,736 B2 * | 1/2019 | Kim | B01J 19/245 |
| 10,994,995 B2 * | 5/2021 | Kim | C09D 145/00 |
| 2005/0268822 A1 * | 12/2005 | Hashimoto | C04B 28/36 106/737 |
| 2011/0197790 A1 * | 8/2011 | Choe | C04B 28/36 106/781 |
| 2016/0137500 A1 * | 5/2016 | Kim | B01J 19/245 526/213 |
| 2019/0185322 A1 * | 6/2019 | Kim | B01J 19/10 |

FOREIGN PATENT DOCUMENTS

| | | |
|---|---|---|
| CN | 101284970 A | 10/2008 |
| CN | 102216235 A | 10/2011 |
| EP | 2 281 788 A1 | 2/2011 |
| JP | 2005-82475 A | 3/2005 |
| KR | 10-0927174 B1 | 12/2009 |
| KR | 10-2010-0072538 A | 7/2010 |
| KR | 10-2011-0052556 A | 5/2011 |
| KR | 10-2011-0061441 | 6/2011 |

OTHER PUBLICATIONS

Liu, Yong-Hui, et al. "Urea particle coating for controlled release by using DCPD modified sulfur." *Powder Technology* 183.1, 2008 (pp. 88-93).

Cha, Soo-Won et al., "Manufacture of modified sulfur polymer binder and characteristics of sulfur concrete." *Magazine of the Korea Concrete Institute* 23 (2011).

International Search Report and Written Opinion for PCT/KR2013/005487 dated Oct. 7, 2013 (18 pages in English).

Canadian Office Action dated Jun. 21, 2016 in corresponding Canadian Patent Application No. 2,915,807 (5 pages in English).

Chinese Office Action dated Oct. 28, 2016, in counterpart Chinese Application No. 201380079030.X (12 pages in English, 10 pages in Chinese).

GCC Examination Report dated Mar. 23, 2017, in corresponding GCC Patent Application No. 2014-27327 (4 pages, in English).

Chinese Office Action dated Aug. 9, 2017 in corresponding Chinese Patent Application No. 201380079030.X (8 pages in English and 6 pages in Chinese).

Canadian Office Action dated Sep. 26, 2017, in corresponding Canadian Application No. 2,915,807 (3 pages, in English).

Chinese Office Action dated Jan. 17, 2018 in corresponding to Chinese Application 201380079030.X (2 pages in English, 10 pages in Chinese).

* cited by examiner

MODIFIED SULFUR, METHOD FOR PREPARING SAME, APPARATUS FOR PREPARING SAME, AND USE THEREOF

CROSS-REFERENCE TO RELATED APPLICATIONS

This application is a Divisional of U.S. patent application Ser. No. 14/900,102, filed on Dec. 18, 2015, which is a national phase of PCT Application No. PCT/KR2013/005487 having an International filing date of Jun. 21, 2013, which claims the benefit of Korean Patent Application No. 10-2012-0067603 filed on Jun. 22, 2012, Korean Patent Application No. 10-2013-0070552 filed on Jun. 19, 2013, Korean Patent Application No. 10-2013-0070555 file on Jun. 19, 2013, Korean Patent Application No. 10-2013-0070556 filed on Jun. 19, 2013, and Korean Patent Application No. 10-2013-0070559 filed on Jun. 19, 2013. The contents of the above patent applications are incorporated by reference herein their entirety.

BACKGROUND OF THE INVENTION

1. Field

The following disclosure relates to modified sulfur, preparation method thereof, preparation equipment thereof, and uses thereof. Particularly, the disclosure explains preparation equipment that produces modified sulfur having excellent properties with simpler and safer manner than traditional methods and can perform mass production of modified sulfur with serial manner. In addition, the modified sulfur according to the disclosure can be applied to various uses, for example anticorrosive materials, waterproofing materials and asphalt composite.

2. Background

Sulfur is a substance with 207 of flash point and 245 of self-ignition temperature, which can easily combust when being exposed to surface and contact with air and is likely to be generated during desulfurization process of crude oil or natural gas as well as in natural sulfur.

The sulfur in stable solid state has high strength when it has no defect in itself, but solid sulfur formed by cooling and solidification from liquid sulfur coexists as 3 types including orthorhombic, monoclinic and indeterminate form. This solidified sulfur has different coexistence ratio of the 3 type sulfur depending on its cooling condition, is likely to develop a defect in itself, and has brittleness that is easily broken. Thus, application range of pure sulfur is greatly limited.

Especially, sulfur is available in various construction materials but pure sulfur has limited application range due to the above mentioned characteristics. Concretely, for the sulfur material with a characteristic of brittle fracture as plastic deformation hardly develops and all of the force given to the material is used to destruction directly, it is an unstable material with characteristics similar to those of typical Portland concrete which is broken in a moment when power greater than yield strength is given.

In order to improve this disadvantage, various types of sulfur modifying agents are being reviewed. Particularly, dicyclopentadiene (DCPD) is known to have effects such as improvement of brittleness of the sulfur as well as good economic feasibility due to low price (New Uses of Sulfur-., 1978, PP. 68-77, 1978).

However, the reaction between dicyclopentadiene and sulfur is difficult to control the polymerization itself, so has a risk to develop explosive exothermic reaction and its control is also difficult due to rapid increase of temperature and viscosity during the reaction process.

Especially, when the reaction exceeds appropriate polymerization range, a rubber-like phenomenon may occur, which specifically causes a damage of reactor used in the polymerization and is known to make commercial use of the sulfur modifying agent prepared from dicyclopentadiene modifying agent and sulfur remarkably difficult. In addition, the dicyclopentadiene and the sulfur have a lot of inefficient factors in their preparation and utilization due to supercooling after polymerization.

Besides regarding its application as anti-corrosive and waterproofing material, the anticorrosive corrosive treatment is needed for easily rusting or corrosive materials such as metals to play their role stably for long time and the waterproofing treatment is needed to prevent water leak of constructions including buildings from rainfall and a crack or lowering of durability in the construction itself. However, a lot of anti-corrosive and waterproofing materials have some problems to be improved including lower adhesiveness with target materials and complicated coating process.

The modified sulfur prepared by polymerization of sulfur and dicyclopentadiene-based modifier is usually a solid at room temperature and used after melting at over 120. Thus, in order to spray the modified sulfur to structures such as concrete or steel structure with a sprayer as for using it as an anti-corrosive material, there were some inconveniences in construction due to necessity for pretreatment at high temperature for melting it and additional meting device of the modified sulfur, so it has been difficult to use it widely in construction sites.

In addition, there was another considerable inconvenience that the sprayer should be cleaned and reheated for restart the work because the modified sulfur was solidified rapidly even in short term stopping within several minutes. These are very important problems restricting wide usage of anti-corrosive and waterproofing materials using the modified sulfur.

Furthermore regarding its application as a composite of asphalt, its temperature range applicable to asphalt road is very limitative because of problems including plastic deformation at high temperature and crack development at low temperature.

An effort to increase affinity between asphalt and copolymer by adding small amount of sulfur less than 5% to modified asphalt has been attempted and is used as a phase separation stabilizer. However, when using greater amount of sulfur over 10 parts by weight, its viscosity increases sharply from formation of gel, so there is a problem difficult to use it as a binder.

Although there have been a lot of studies on addition of large amount of sulfur to asphalt, they are not used widely because of gelation, a phenomenon of phase separation.

Thus, studies on asphalt composite that does not form gel and improve its property even in addition of large amount of sulfur have been progressed and traditional technologies relating to these are as follows.

U.S. Pat. No. 4,412,019 describes a modified asphalt composition adding 0~20 parts by weight of sulfur to the asphalt in hydrogen treated butadiene-styrene block copolymer for preventing gelation. In addition, U.S. Pat. No. 5,756,566 shows a modified asphalt composition prepared by using 0.1~5 parts by weight of antigelling agent against weight of asphalt in order to prepare asphalt-polymer compound that does not gelate.

In spite of progression of the above studies, there are still further needs for asphalt composition to improve antigelling property dramatically in adding large amount of sulfur to modified asphalt.

Besides for asphalt pavement, breakages of pavement such as plastic deformation and low temperature cracks occurs continuously under the influence of temperature rise in summer, explosive increase of traffic, and increase of congested areas.

In order to solve these problems, United States established and has operated PG (Performance Graded) test of asphalt as a national standard (ASTM D 6373) in 1990 and then has obtained encouraging effects that quality of the asphalt pavement is improved.

Accordingly traditionally small amount of modified sulfur as much as 5 parts by weight against 100 parts by weight of asphalt was added and when using it as over 10 parts by weight, there was a problem that the viscosity was increased sharply by gelation. Thus, it was general to add less than 20 parts by weight of modified sulfur against 100 parts by weight of asphalt and its cost was considerable due to necessity for addition of antigelling agent.

Moreover, the modified sulfur prepared by polymerization of dicyclopentadiene and sulfur according to the traditionally known manner is specifically solidified when left at room temperature, so has a problem that depression occurs during construction process. This becomes a problem particularly in construction process of polymer modified sulfur concrete with large volume not in the scale of laboratory level, which is a phenomenon developed by sharp temperature difference between the central part and the external part of concrete during cooling process of melted liquid sulfur deposited in a cast.

In order to this disadvantage, there have been a lot of studies and development efforts on property improved modified sulfur by adding various materials, there are still disadvantages including that the reaction control is difficult and figuration is impossible due to rapid solidification at room temperature.

Additionally, as damage of the preparing equipment from rubberization is another problem in traditional polymerization of dicyclopentadiene and sulfur, it is needed to develop a method for mass production of modified sulfur as well as property improvement of the modified sulfur for commercial mass production of the modified sulfur used in asphalt composition.

SUMMARY

In an example, it is intended to provide modified sulfur having remarkably excellent adhesiveness and elastic modulus in comparison with existing modified sulfur products, having spinnability or micro-structures, and applicable to various areas, and preparation method thereof. In addition, it is intended also to provide preparation equipment able to manufacture the modified sulfur in continuous manner. Furthermore, it is intended to provide materials with various uses to which the modified sulfur is applicable, such as anti-corrosive, waterproofing, and asphalt composition.

Modified sulfur according to an example of the disclosure includes micro-structures such as fiber, film, or network structure, or has spinnability.

The modified sulfur includes 100 parts by weight of sulfur and 1~300 parts by weight of dicyclopentadiene-based modifier.

The modified sulfur may have 3,000~2,000,000 cP of viscosity at 135.

The modified sulfur may further include 0.1~200 parts by weight of initiator, based on 100 parts by weight of the sulfur.

The initiator may include at least one selected from the group consisting of sulfur, modified sulfur, asphalt, sulfide, polysulfide, hydrocarbon compound, and their combinations.

The initiator may include at least one selected from the group consisting of trans cinnamaldehyde, dimethylaniline, dibuthylphthalate, diiodomethane, isobutylaldehyde, methacylamide, diethylaniline, rongalite, nitroethane, formaldehyde hydrate, phenylacetamide, benzyl acetate, dodecyl benzene sulfonic acid, trioctyl amine, methylmorpholine, morpholine, dimethylaniline, napthalene and their combinations.

For the initiator, 1 type may be used, at least 2 or 3 types of different initiators may be used, and initiators not exemplified in the above may be used with the initiator.

The modified sulfur may include at least one additive selected from the group consisting of surfactant, coupling agent, catalyst, cross-linker, dispersant, and their combinations.

The surfactant may include at least one additive selected from the group consisting of anion surfactant, cation surfactant, non-ionic surfactant, amphoteric surfactant, and their combinations.

The coupling agent may include at least one additive selected from the group consisting of silane-based coupling agent, titanate-based coupling agent, chrome-based coupling agent, aluminate-based coupling agent, and their combinations.

The modified sulfur may be mixed with the additive under solvent.

The solvent may include at least one additive selected from the group consisting of water, amine-based solvent, ester-based solvent, ketone-based solvent, aliphatic or aromatic hydrocarbon-based solvent, ether-based solvent, alcohol-based solvent, polyol solvent, amide solvent, sulfone or sulfoxide solvent, acetate-based solvent, anhydrous inorganic solvent, and their combinations.

The modified sulfur may be hydrophilic or hydrophobic.

A method for preparing modified sulfur according to an example includes: mixing 100 parts by weight of sulfur with 1~300 parts by weight of dicyclopentadiene-based modifier and melting them at 120 or higher to prepare the first mixture; polymerizing the first mixture at 120 or higher to prepare the first reactant; and terminating the polymerization of the first reactant at the end point of the reaction to prepare modified sulfur.

The first mixture may include 100 parts by weight of sulfur and 1~300 parts by weight of dicyclopentadiene-based modifier.

The mixing may be performed at 120 or higher by sonication.

The end point of the reaction may be between the time when the reactant has spinnability and the time when rubberization occurs and the modified sulfur may include micro-structures such as fiber, film, or network structure, or may have spinnability.

The first mixture, the first reactant, and their combinations may further include an initiator.

Description about contents, types, and input time of the above initiator is same to the description of the above modified sulfur according to an example of the disclosure, so omitted.

The end point of the reaction may be a point when viscosity of the first reactant becomes over 10,000 cP or comes to have spinnability. In addition, the end point of polymerization may be a point when fiber- or film-like micro-structures are observed in the first reactant.

The method for preparing modified sulfur may further include ageing the first reactant between the polymerizing and terminating. When including the ageing, the end point of the reaction can be adjusted to just before obtaining of spinnability.

The ageing may be performed at ageing temperature of 40 or higher, or 80~120.

A method for preparing modified sulfur according to another example includes: preparing a mixture comprising 100 parts by weight of sulfur, 1~300 parts by weight of dicyclopentadiene-based modifier, and 0.1~200 parts by weight of initiator; sonicating the mixture with ultrasonic to prepare a reactant; and ageing the reactant at 40 or higher to prepare the modified sulfur.

The mixture may include 100 parts by weight of sulfur, 1~300 parts by weight of dicyclopentadiene-based modifier, and 0.1~200 parts by weight of initiator.

The modified sulfur has 3,000~2,000,000 cP of viscosity. And it may include micro-structures such as fiber, film, or network structure, or has spinnability.

The sulfur may be melted and liquid phase at 120 or higher, or solid phase at 80 or lower.

Description about the above initiator such as types is same to the description of the above modified sulfur according to an example of the disclosure, so omitted.

The sonicating may be performed at 120 or lower.

The reactant in the sonicating may have viscosity of 10 cP or lower.

The modified sulfur may be prepared in continuous manner using continuous type equipment for preparing modified sulfur including a reaction part where the sonicating is performed and an ageing part into which the reactant discharged from the above reaction part is flown.

The preparing may be performed by putting materials including 100 parts by weight of sulfur, 1~300 parts by weight of dicyclopentadiene-based modifier, and 0.1~200 parts by weight of initiator into a material inlet of the equipment for preparing modified sulfur.

The sonicating is performed by putting a mixture comprising the said materials into the reaction part connected with the material inlet and then treating the mixture with ultrasonic generated in an ultrasonic irradiator installed in the reaction part so that a reactant is formed by reacting solid sulfur included in the mixture with the dicyclopentadiene-based modifier by cavitation that minute bubbles are formed and destructed again.

The ageing is performed by ageing the reactant flown into the ageing part from a reactant inlet connected with the reaction part to prepare the modified sulfur, and obtaining the modified sulfur prepared in continuous manner using at least one outlet part located sequentially from the reactant inlet.

Equipment for preparing modified sulfur according to another example includes: a reaction part including the first housing with a material inlet and a reactant outlet, and an ultrasonic generator for sonication in the first housing; and an ageing part including the second housing with a reactant inlet connected with the reactant outlet and a modified sulfur outlet, an ageing container for storing the reactant in the second housing, and a temperature maintenance device for maintaining temperature in the ageing container.

The modified sulfur outlet is formed on at least one side of the ageing container and may include more than 2 outlets located on different distances from the reactant inlet.

The modified sulfur outlet may include a low viscosity outlet, medium viscosity outlet, and high viscosity outlet formed on one side of the ageing container sequentially.

Distance between the low viscosity outlet and the modified sulfur outlet may be shorter than that between the high viscosity outlet and the modified sulfur outlet.

The equipment for preparing modified sulfur may further include a flux controlling part for controlling flux of reactant flown into the ageing part.

The equipment for preparing modified sulfur may further include a low viscosity modified sulfur storing part connected to the low viscosity outlet; a medium viscosity modified sulfur storing part connected to the medium viscosity outlet; and a high viscosity modified sulfur storing part connected to the high viscosity outlet.

The equipment for preparing modified sulfur may further include a material storing part connected to the material inlet, the material storing part may include more than 2 chemical tanks connected to the material inlet respectively, and each of the chemical tanks may store the sulfur and the dicyclopentadiene-based modifier respectively.

Through the material inlet, the mixture comprising the sulfur, the dicyclopentadiene-based modifier, the initiator, or their combinations is put into the first housing in a certain ratio, the ultrasonic generator induces polymerization of the sulfur and the dicyclopentadiene-based modifier by sonicating the mixture with ultrasonic, the temperature maintenance device maintains the temperature in the ageing container as ageing temperature at 120 or lower.

The equipment for preparing modified sulfur may manufacture the modified sulfur in continuous manner.

The equipment for preparing modified sulfur may control viscosity of the prepared modified sulfur by controlling temperature in the ageing container and retention time of the reactant flown into the ageing container.

The ageing part may include an autoclave able to control pressure as well as temperature within the ageing container.

Hydraulic material according to another example of the disclosure includes the above modified sulfur. The hydraulic material may be for road or construction.

In order to achieve the object, anticorrosive material according to an example includes modified sulfur that includes micro-structures such as fiber, film, or network structure, or has spinnability.

The modified sulfur may include 100 parts by weight of sulfur and 1~300 parts by weight of dicyclopentadiene-based modifier and have 3,000~2,000,000 cP of viscosity at 135.

The anticorrosive material may further include diluent, stiffener, and their combinations.

The diluent may include at least one selected from the group consisting of carbon disulfide, ammonia, alcohol-based solvent, di-tert-butyl polysulfide, tert-dodecyl polysulfide, tert-nonyl polysulfide, aniline, benzene, dibutyl phthalate, 2,2'-ethylenebisisothiouronium dibromide, dibromoethane, 1,2-dibromoethane, iodoform, beta-naphthol (2-naphthol), olive oil, phenol, pyridine, quinoline, disulfur dichloride, toluene, m-xylene, p-xylene, and their combinations.

The stiffener may include at least one selected from the group consisting of silica powder, diatomite, wollastonite, clays, chopped glass fiber, dyes, pigments, aluminum sulfate, liquid glass, Ca(OH)$_2$, zinc oxide, naphthalene, Mg(OH)$_2$, CaCl$_2$, Al(OH)$_3$, borax, CaSO$_4$.2H$_2$O, Fe$_2$O$_3$, zeolite, carbon fiber, whisker, Na$_2$SO$_3$, MgSO$_4$.7H$_2$O, fly ash, acrylic emulsion, epoxy, latex, carbon fiber or sheet, steel fiber, liquefied minerals, fiber filling, fibrous particles, flake shaped particles and their combinations.

The modified sulfur may further include 0.1~200 parts by weight of initiator, based on 100 parts by weight of sulfur.

The anticorrosive material may include 100 parts by weight of the modified sulfur, 1~100 parts by weight of the diluent, and 1~100 parts by weight of the stiffener.

The modified sulfur or the anticorrosive material may be liquid phase at 25.

The anticorrosive material may have 1~1,000 cP of RT type viscosity at 25 and 1~10,000 cP of heating type viscosity at 135.

A method for preparing anticorrosive material according to another example includes: mixing 100 parts by weight of sulfur, 1~300 parts by weight of dicyclopentadiene-based modifier and melting them at 120 or higher to prepare the first mixture; polymerizing the first mixture at 120 or higher to prepare the first reactant; and terminating the polymerization of the first reactant at the end point of the reaction to prepare the anticorrosive material comprising modified sulfur.

The end point of the reaction may be between the time when the reactant has spinnability and the time when rubberization occurs and the modified sulfur may include micro-structures such as fiber, film, or network structure, or may have spinnability.

The method for preparing anticorrosive material may further include blending a composition after the terminating. The blending is performed by mixing the modified sulfur and an additive. The additive may include at least one selected from the group consisting of diluent, stiffener, and their combinations.

An initiator may be put into the first mixture or the first reactant, and its input amount may be 0.1~200 parts by weight, based on 100 parts by weight of the sulfur.

The initiator may include at least one selected from the group consisting of trans cinnamaldehyde, dimethylaniline, dibuthylphthalate, diiodomethane, dimethylformamide, morpholine, modified sulfur, and their combinations.

The anticorrosive material may have 1~1,000 cP of RT type viscosity at 25 and 1~10,000 cP of heating type viscosity at 135.

The method for preparing anticorrosive material may further include ageing the first reactant between the said polymerizing and terminating, and the ageing is performed by leaving it at 40 or higher.

A method for preparing anticorrosive material according to another example includes: preparing a mixture comprising 100 parts by weight of sulfur, 1~300 parts by weight of dicyclopentadiene-based modifier, and 0.1~200 parts by weight of initiator; sonicating the mixture with ultrasonic to prepare a reactant; and ageing the reactant at 40 or higher to prepare anticorrosive material comprising modified sulfur.

The modified sulfur may include micro-structures such as fiber, film, or network structure, or have spinnability.

The sonicating may be performed at 120 or lower.

The anticorrosive material may be prepared in continuous manner using continuous type equipment for preparing modified sulfur including a reaction part where the sonicating is performed and an ageing part into which the reactant discharged from the reaction part is flown.

The anticorrosive material is prepared using continuous type equipment for preparing modified sulfur, and the said preparing may be performed by putting materials including 100 parts by weight of sulfur, 1~300 parts by weight of dicyclopentadiene-based modifier, and 0.1~200 parts by weight of initiator into a material inlet of the equipment for preparing modified sulfur.

The said sonicating is performed by putting a mixture comprising the said materials into the reaction part connected with the material inlet and then treating the mixture with ultrasonic generated in an ultrasonic irradiator installed in the reaction part so that a reactant is formed by reacting solid sulfur included in the mixture with the dicyclopentadiene-based modifier by cavitation that minute bubbles are formed and destructed again.

The said ageing is performed by ageing the reactant flown into the ageing part from a reactant inlet connected with the reaction part to prepare the modified sulfur, and obtaining the modified sulfur prepared in continuous manner using at least one outlet part located sequentially from the reactant inlet.

A method for preparing an anticorrosive coating film according to another example is to form an anticorrosive coating by spraying the anticorrosive material prepared by the disclosure to a structure.

A method for preparing an anticorrosive coating film according to another example may be to form an anticorrosive coating by spraying the anticorrosive material prepared by the method for preparing anticorrosive material according to another example of the disclosure.

In order to achieve the objective, waterproofing material according to an example of the disclosure includes modified sulfur that includes micro-structures such as fiber, film, or has network structure, or has spinnability.

The modified sulfur may include 100 parts by weight of sulfur and 1~300 parts by weight of dicyclopentadiene-based modifier and have 3,000~2000,000 cP of viscosity at 135.

The waterproofing material may further include diluent, stiffener, and their combinations.

The diluent may include at least one selected from the group consisting of carbon disulfide, ammonia, alcohol-based solvent, di-tert-butyl polysulfide, tert-dodecyl polysulfide, tert-nonyl polysulfide, aniline, benzene, dibutyl phthalate, 2,2'-ethylenebisisothiouronium dibromide, dibromoethane, 1,2-Dibromoethane, iodoform, beta-naphthol (2-naphthol), olive oil, phenol, pyridine, quinoline, disulfur dichloride, toluene, m-xylene, p-xylene, and their combinations.

The stiffener may include at least one selected from the group consisting of silica powder, diatomite, wollastonite, clays, chopped glass fiber, dyes, pigments, aluminum sulfate, liquid glass, Ca(OH)$_2$, zinc oxide, naphthalene, Mg(OH)$_2$, CaCl$_2$, Al(OH)$_3$, borax, CaSO$_4$.2H$_2$O, Fe$_2$O$_3$, zeolite, carbon fiber, whisker, Na$_2$SO$_3$, MgSO$_4$.7H$_2$O, fly ash, acrylic emulsion, epoxy, latex, carbon fiber or sheet, steel fiber, liquefied minerals, fiber filling, fibrous particles, flake shaped particles and their combinations.

The modified sulfur may further include 0.1~200 parts by weight of initiator on the basis of 100 parts by weight of sulfur.

The waterproofing material may include 100 parts by weight of the modified sulfur, 1~100 parts by weight of the diluent, and 1~100 parts by weight of the stiffener.

The modified sulfur or the waterproofing material may be liquid phase at 25.

The waterproofing material may have 1~1,000 cP of RT type viscosity at 25 and 1~10,000 cP of heating type viscosity at 135.

A method for preparing waterproofing material according to another example of the disclosure includes: mixing 100 parts by weight of sulfur with 1~300 parts by weight of dicyclopentadiene-based modifier and melting them at 120 or higher to prepare the first mixture; polymerizing the first mixture at 120 or higher to prepare the first reactant; and terminating the polymerization of the first reactant at the end of the polymerization to prepare the waterproofing material including modified sulfur.

The end point of the reaction may be between the time when the reactant has spinnability and the time when rubberization occurs, and the modified sulfur may include micro-structures such as fiber, film, or network structure, or may have spinnability.

The method for preparing waterproofing material may further include blending a composition after the terminating. The blending is performed by mixing the modified sulfur and an additive. The additive may include at least one selected from the group consisting of diluent, stiffener, and their combinations.

An initiator may be put into the first mixture or the first reactant and its input amount may be 0.1~200 parts by weight, based on 100 parts by weight of the sulfur.

The initiator may include at least one selected from the group consisting of trans cinnamaldehyde, dimethylaniline, dibuthylphthalate, diiodomethane, dimethylformamide, morpholine, modified sulfur, and their combinations.

The waterproofing material may have 1~1,000 cP of RT type viscosity at 25 and 1~10,000 cP of heating type viscosity at 135.

A method for preparing waterproofing material may also include an ageing the first reactant between the said polymerizing and the terminating, and the ageing is performed by leaving it at 40 or higher.

A method for preparing waterproofing material according to another example of the disclosure includes: preparing a mixture including 100 parts by weight of sulfur, 1~300 parts by weight of dicyclopentadiene-based modifier, and 0.1~200 parts by weight of initiator; sonicating the mixture with ultrasonic to prepare a reactant; and ageing the reactant at 40 or higher to prepare the waterproofing material including modified sulfur.

The modified sulfur may include micro-structures such as fiber, film, or network structure, or have spinnability.

The sonicating may be performed at the reactant temperature of 120 or lower.

The waterproofing material may be prepared in continuous manner using continuous type equipment for preparing modified sulfur including a reaction part where the sonicating is performed and an ageing part into which the reactant discharged from the reaction part is flown.

The waterproofing material is prepared using the continuous type equipment for preparing modified sulfur, and the preparing may be performed by putting materials including 100 parts by weight of sulfur, 1~300 parts by weight of dicyclopentadiene-based modifier, and 0.1~200 parts by weight of initiator into a material inlet of the equipment for preparing modified sulfur.

The sonicating is performed by putting a mixture comprising the said materials into the reaction part connected with the material inlet and then treating the mixture with ultrasonic generated in an ultrasonic irradiator installed in the reaction part so that a reactant is formed by reacting solid sulfur included in the mixture with the dicyclopentadiene-based modifier by cavitation that minute bubbles are formed and destructed again.

The ageing is performed by ageing the reactant flown into the ageing part from a reactant inlet connected with the reaction part to prepare the modified sulfur, and obtaining the modified sulfur prepared in continuous manner using at least one outlet part located sequentially from the reactant inlet.

A method for preparing a waterproofing coating film according to another example of the disclosure is to form a waterproofing coating by spraying the waterproofing material prepared by the disclosure to a structure.

A method for preparing a waterproofing coating film according to another example of the disclosure may be to form a waterproofing coating by spraying the waterproofing material prepared by the method for preparing waterproofing material according to another example of the disclosure.

In order to achieve the objective, asphalt composition according to an example of the disclosure includes modified sulfur; aggregate; and asphalt that includes micro-structures such as fiber, film, or has network structure, or has spinnability.

The modified sulfur may include 100 parts by weight of sulfur and 1~300 parts by weight of dicyclopentadiene-based modifier.

The modified sulfur may include 3,000~2000,000 cP of viscosity at 135.

The modified sulfur may further include 0.1~200 parts by weight of initiator on the basis of 100 parts by weight of sulfur.

The asphalt composition may include at least 30 parts by weight of modified sulfur on the basis of 100 parts by weight of the asphalt.

The asphalt composition may include at least 10~70 parts by weight of the aggregates on the basis of 100 parts by weight of the asphalt.

The asphalt is at least one selected from the group consisting of straight asphalt, diluted asphalt, and their combinations and the diluted asphalt may be prepared by diluting the straight asphalt with at least one fluid selected from the group consisting of paraffin distillate, aromatic distillate, naphtene-based distillate, and their combinations.

The asphalt composition may further include filler and 1~20 parts by weight of the filler may be included on the basis of 100 parts by weight of the asphalt.

The filler may be at least one selected from the group consisting of stone flour, Portland cement, slaked lime, fly ash, retrieved dust, steelmaking dust, stiffener, and their combinations.

An asphalt additive according to another example of the disclosure includes modified sulfur that includes micro-structures such as fiber, film, or has network structure, or has spinnability; and aggregate.

The modified sulfur includes 100 parts by weight of sulfur and 1~300 parts by weight of dicyclopentadiene-based modifier.

The asphalt additive may be a pallet form.

A method for preparing asphalt composition according to another example of the disclosure includes: mixing 100 parts by weight of sulfur and 1~300 parts by weight of dicyclopentadiene-based modifier and melting them at 120 or higher to prepare the first mixture; polymerizing the first mixture at 120 or higher to prepare the first reactant; terminating the polymerization of the first reactant at the end of the polymerization to prepare modified sulfur; and blending the modified sulfur with aggregates to prepare pellets.

The end point of the reaction may be between the time when the reactant has spinnability and the time when rubberization occurs, and the modified sulfur may include micro-structures such as fiber, film, or network structure, or may have spinnability.

The asphalt composition may include 10~70 parts by weight of the aggregates, based on 100 parts by weight of the modified sulfur.

The aggregates may be at least one selected from the group consisting of stone flour, Portland cement, slaked lime, fly ash, retrieved dust, steelmaking dust, stiffener, and their combinations.

The first mixture or the first reactant may further include 0.1~200 parts by weight of initiator, based on 100 parts by weight of sulfur.

The method for preparing asphalt composition may further include ageing the first reactant between the said polymerizing and terminating, and the ageing may be performed by leaving it at 40 or higher.

A method for preparing asphalt composition according to another example of the disclosure includes: preparing mixture including 100 parts by weight of sulfur, 1~300 parts by weight of dicyclopentadiene-based modifier, and 0.1~200 parts by weight of initiator; sonicating the mixture with ultrasonic to prepare a reactant; ageing the reactant at 40 or higher to prepare the modified sulfur; and blending the modified sulfur, aggregates and asphalt.

The modified sulfur may include micro-structures such as fiber, film, or network structure, or have spinnability.

The asphalt composition may include at least 30 parts by weight of modified sulfur, based on 100 parts by weight of the asphalt.

The sonicating may be performed at the reactant temperature of 120 or lower.

The asphalt composition may be prepared in continuous manner using continuous type preparing equipment including a reaction part where the sonicating is performed and an ageing part into which the reactant discharged from the above reaction part is flown.

The asphalt composition is prepared using continuous type equipment for preparing modified sulfur, and the preparing may be performed by putting materials including 100 parts by weight of sulfur, 1~300 parts by weight of dicyclopentadiene-based modifier, and 0.1~200 parts by weight of initiator into a material inlet of the equipment for preparing modified sulfur.

The sonicating is performed by putting a mixture comprising the said materials into the reaction part connected with the material inlet and then treating the mixture with ultrasonic generated in an ultrasonic irradiator installed in the reaction part so that a reactant is formed by reacting solid sulfur included in the mixture with the dicyclopentadiene-based modifier by cavitation that minute bubbles are formed and destructed again.

The ageing is performed by ageing the reactant flown into the ageing part from a reactant inlet connected with the reaction part to prepare the modified sulfur, and obtaining the modified sulfur prepared in continuous manner using at least one outlet part located sequentially from the reactant inlet.

The outlet part of the ageing part may include a low viscosity outlet part, a medium viscosity outlet part, and a high viscosity outlet part located sequentially from the second inlet.

A method for preparing asphalt according to another example of the disclosure includes steps comprising includes a process to prepare asphalt composition by mixing the asphalt additive, an example of the disclosure, with asphalt or is to form asphalt by depositing the asphalt composition prepared by the method for preparing asphalt composition according to another example of the disclosure.

DETAILED DESCRIPTION

Figure 1:
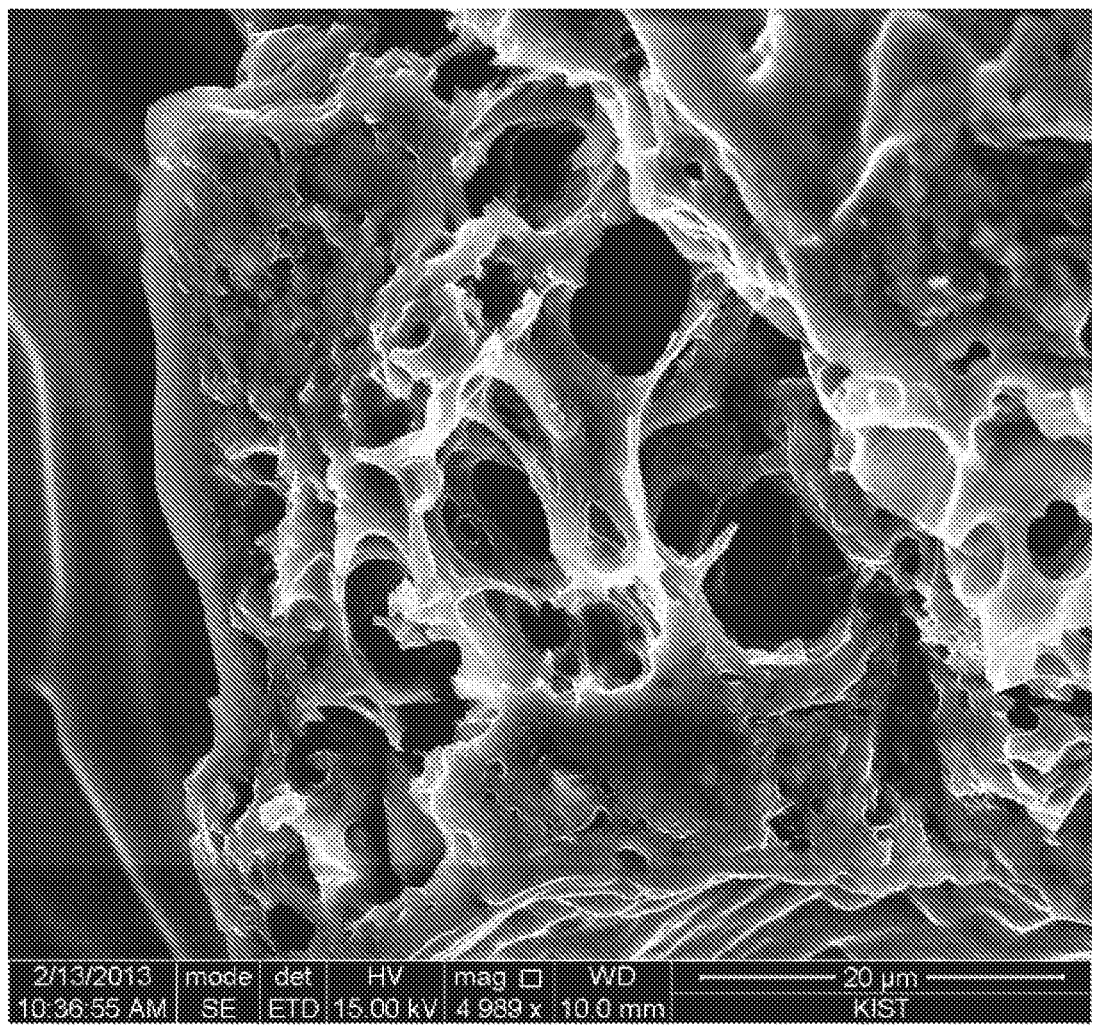
FIG. 1 is a SEM (Scanning Electron Microscope) image showing microstructure of the modified sulfur prepared by preparation example 2-5 among the preparation examples of modified sulfur.

Various modifications and embodiments can be made in the disclosure, and reference will be made in detail to the preferred embodiments of the disclosure, examples of which are illustrated in the accompanying drawings. However, it should also be understood that embodiments are not limited by any of the details of the foregoing description, but rather should be construed broadly within its spirit and scope and it is intended that the disclosure cover modifications and variations of this invention provided they come within the scope of the appended claims and their equivalents.

Though terms including ordinal numbers such as the first, the second, etc. may be used to explain various components, the components are not limited to the terms. The terms are used only for the purpose of distinguishing one component from another component. For example, without departing from the scope of the disclosure, the first component can be named to the second component; similarly the second component can be named to the first component also.

Terms used in the disclosure are to merely explain specific embodiments, thus it is not meant to be limiting. A singular expression includes a plural concept unless there is a contextually distinctive difference therebetween. In the disclosure, a term of "include" or "have" should not be interpreted as if it absolutely includes a plurality of components or steps of the specification. Rather, the term of "include" or "have" may not include some components or some steps, or may further include additional components.

In a case it is mentioned that a certain component is "connected" or "accessed" to another component, it may be understood that the certain component is directly connected or accessed to the another component or that a component is interposed between the components.

Unless stated otherwise in the disclosure, the term of room temperature means 15~25.

The sulfur in the disclosure includes common sulfur element, which includes natural sulfur or sulfur obtained from desulfurization of petroleum or natural gas. As sulfur in the disclosure, solid sulfur can be applied by heating over melting point to facilitate the reaction or liquid sulfur discharged from associated industries such as petrochemistry can be used.

The dicyclopentadiene-based modifier in the disclosure means dicyclopentadiene-based modifier containing cyclopentadiene oligomer. The dicyclopentadiene (DCPD) is a dimer of cyclopentadiene (CPD), which can be generated during pyrolysis process of naphtha and may be included as much as 10~20 parts by weight in C5 fraction and C9+ fraction obtained as byproduct from naphtha cracker, but is not limited thereto. Any commercial product containing dicyclopentadiene can be applied.

As described in Korea Public Patent Notification No. 10-2006-101878, the dicyclopentadiene-based modifier includes dicyclopentadiene (DCPD) as a modifier component. The DCPD can be alone or as a mixture where at least one of cyclopentadiene (CPD), dicyclopentadiene derivatives, CPD derivatives (for example, methylcyclopentadiene (MCP) or methyl-dicyclopentadiene (MDCP) is added to the DCPD. In addition, the dicyclopentadiene-based modifier can be used as a mixture with olefin compounds such as depentene, vinyl toluene, styrene monomer, and dicyclopentene.

In the Korea Public Patent Notification No. 10-2005-26021, at least one two sulfur modifier selected from the group consisting of dicyclopentadiene (DCPD), tetrahydroindene (THI), cyclopentadiene and its oligomer (dimer~pentamer mixture), or olefin compounds such as dipentene, vinyl toluene, and dicyclopentene. The DCPD includes a mixture comprising DCPD element, CPD element, and dimer~pentamer, which indicates a mixture containing at least 70 parts by weight of DCPD (refers to "70% of purity"). Thus, for the dicyclopentadiene-based modifier in the disclosure most commercial products called as dicyclopentadiene can be used and the THI includes THI element or a mixture consisting of THI and one or at least two types selected from the group consisting of cyclopentadiene element, polymer of cyclopentadiene and butadiene, and dimer pentamer of cyclopentadiene.

The spinnability of the disclosure can be expressed as spinning property, which is determined by glass stick test to put it into and remove it from liquid state mixture or reactant and a case that a part of the mixture or the reactant in liquid state is connected to the glass stick and pulled out like a thread (at least 1 cm) is defined as the mixture or the reactant has spinnability.

Modified Sulfur

Modified sulfur according to an example of the disclosure includes sulfur and dicyclopentadiene-based modifier. The modified sulfur means to have a form of modified sulfur polymer.

The modified sulfur may include 0.1~1000 parts by weight of dicyclopentadiene-based modifier on the basis of 100 parts by weight of sulfur, particularly 0.1~300 parts by weight of dicyclopentadiene-based modifier.

The modified sulfur may include 1~10 million cP of viscosity at 135, particularly 3,000~2 million cP. The viscosity of the modified sulfur, which was measured after termination of polymerization between sulfur and dicyclopentadiene-based modifier, means viscosity after termination of reaction.

When the modified sulfur includes 100 parts by weight of sulfur and 1~300 parts by weight of 0.1~300 parts by weight of dicyclopentadiene-based modifier, it is possible to prepare economic modified sulfur by applying appropriate content of the dicyclopentadiene-based modifier with higher price. When using over 100 parts by weight of the dicyclopentadiene-based modifier, it is possible to obtain the modified sulfur in liquid phase at room temperature.

When the polymerization completed modified sulfur has 3,000~2 million cP of viscosity at 135, it may have remarkably excellent elasticity and adhesiveness. The modified sulfur can have far superior property in adhesiveness and elasticity in comparison with traditional modified sulfur.

The modified sulfur may include another initiator in addition to the dicyclopentadiene-based modifier. When the modified sulfur includes the initiator also, development of microstructure in the modified structure can be accomplished further favorably, in particular micro-structure like network can be formed. This property is far superior in adhesiveness and elasticity than those of other working examples.

In addition, when including the initiator also, it is possible to prepare modified sulfur, controlling the polymerization stably through reacting and ageing process at lower temperature 120 or lower rather than polymerization process at high temperature 120 or higher. Moreover, the reaction at low temperature can be done with ultrasonication. However, as it is possible to apply this method at 120 or higher in order to progress the polymerization more rapidly, the reaction temperature must not be limited to 120 or lower.

The properties of modified sulfur can be adjusted by changing types, input amount, input timing, and reaction condition of the modifier to be applied.

The modified sulfur may include 0.1~200 parts by weight of initiator on the basis of 100 parts by weight of the sulfur.

The initiator includes at least one selected from the group consisting of sulfur, modified sulfur, asphalt, sulfide, polysulfide, hydrocarbon compound, and their combinations and can be added simultaneously with the dicyclopentadiene-based modifier or separately during the reaction. In case that sulfur is used as the initiator, it can play a role as the initiator when it is added during the reaction.

The sulfur as the initiator may include at least one selected from the group consisting of elemental sulfur, crystalline sulfur, non-crystallized sulfur, colloidal sulfur, and their mixtures. In addition, the sulfur may include at least one selected from the group consisting of α-sulfur (rhombic sulfur), β-sulfur (monoclinic sulfur), γ-sulfur and their combinations. The asphalt means straight asphalt or modified asphalt and the sulfide is a compound containing sulfur, which can illustrate carbon disulfide, but is not limited thereto. The polysulfide can illustrate polysulfide-transformed epoxy resin, but is not limited thereto. The hydrocarbon compound means a compound composed of carbon and hydrogen and includes straight chained, branched, cyclic, and aromatic hydrocarbon compound. The initiator may be modified sulfur polymerized in advance and is not limited in modified sulfur prepared by specific preparing method.

The initiator may include at least one selected from the group consisting of trans cinnamaldehyde, dimethylaniline, dibuthylphthalate, diiodomethane, isobutylaldehyde, methacylamide, diethylaniline, rongalite, nitroethane, formaldehyde hydrate, phenylacetamide, benzyl acetate, dodecyl benzene sulfonic acid, trioctyl amine, methylmorpholine, morpholine, dimethylaniline, napthalene and their combinations.

The initiator can be used with straight asphalt, modified asphalt, poly isoprene, SBS (styrene butadiene styrene block copolymer), poly butylene, styrene, waste tire chip, dimethyl (acetylacetonate)gold-3, N-methylpyrrolidine, urea, epoxy resin, phenol-formaldehyde, phenol and polyester resin, phenol resin, urea resin, melamine resin, and thermosetting resins, but is not limited thereto.

The initiator can be used alone or in a mixture of two or higher kinds thereof.

The initiator can play a role in promoting or controlling polymerization between the dicyclopentadiene-based modifier and the sulfur. When applying modified sulfur as the initiator, it is possible to obtain far superior modified sulfur in adhesiveness and elastic modulus than the case without the initiator.

The modified sulfur in the disclosure shows quite different features in microstructure or appearance of completed modified sulfur from modified sulfur prepared by traditional methods. In other words, modified sulfur according to an example of the disclosure may include micro-structures such as fiber, film, or network structure, or have spinnability.

When the modified sulfur of the disclosure includes an initiator and no surfactant, it is possible to prepare modified sulfur with rubber-like or rigid, but great visco-elasticity.

Figure 12:
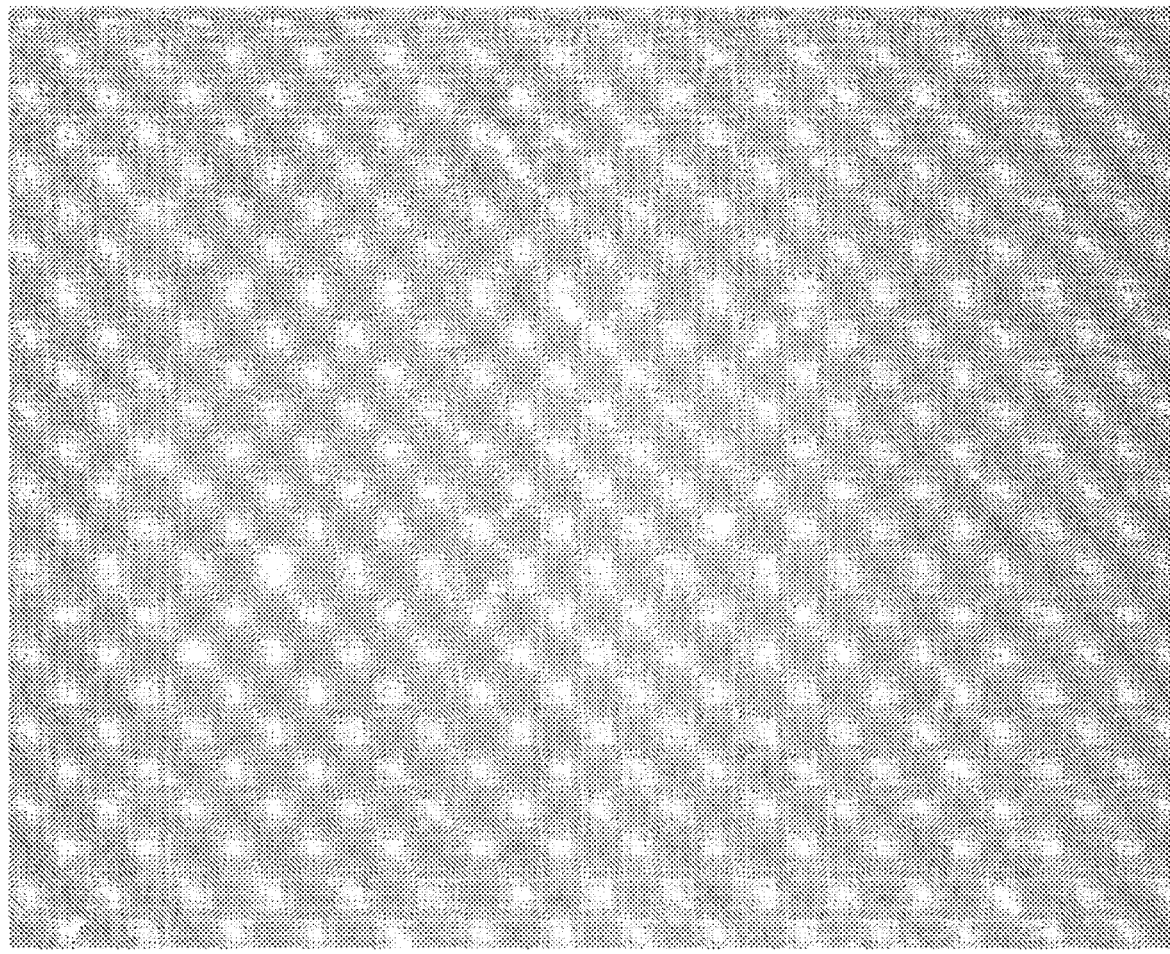
FIG. 12 is a microstructure image (×650) of the modified sulfur terminating the reaction earlier than the termination when the reactant was changed to yellow after progressing the reaction until the polymerization according to the method for preparing modified sulfur according to an example of the disclosure.
Figure 13:
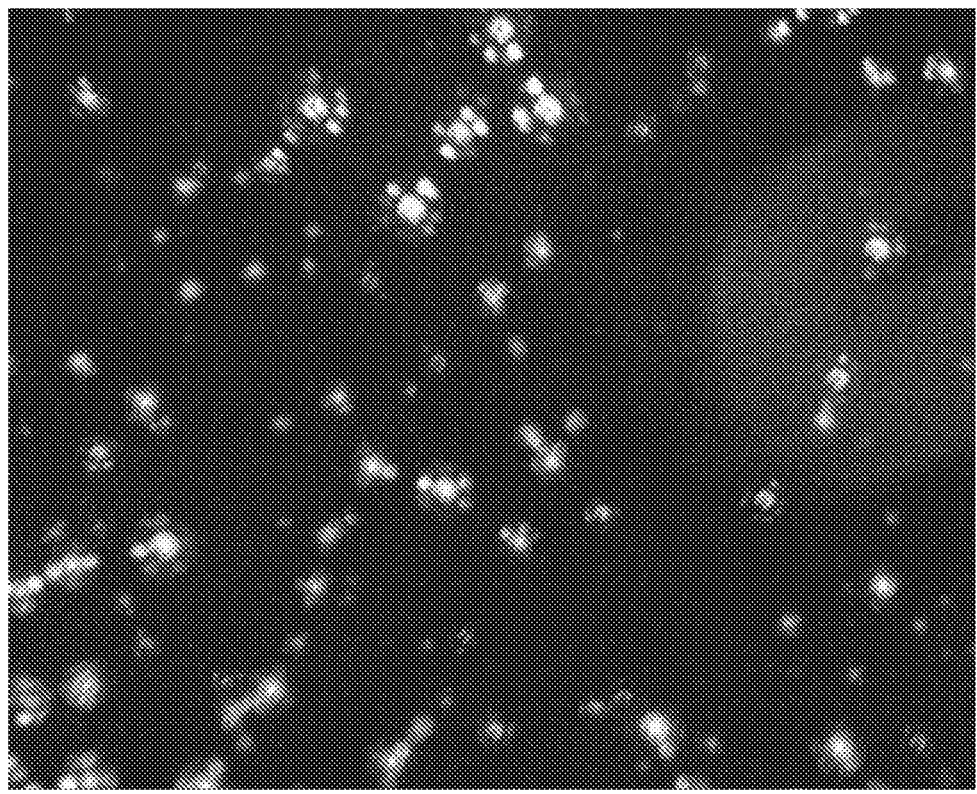
FIG. 13 is a microstructure image (×650) of the modified sulfur terminating the reaction earlier than the termination when the reactant was changed to dark brown after progressing the reaction until the polymerization according to the method for preparing modified sulfur according to an example of the disclosure.
Figure 14:
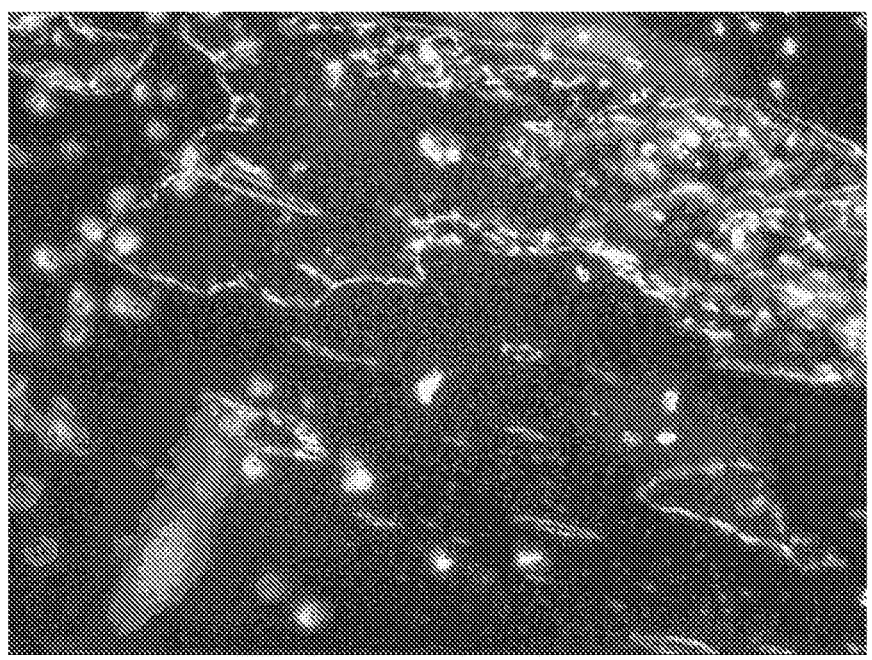
FIG. 14 is a microstructure image (×650) of the modified sulfur prepared by an example of the disclosure that includes film shaped microstructure in the modified sulfur.
Figure 15:
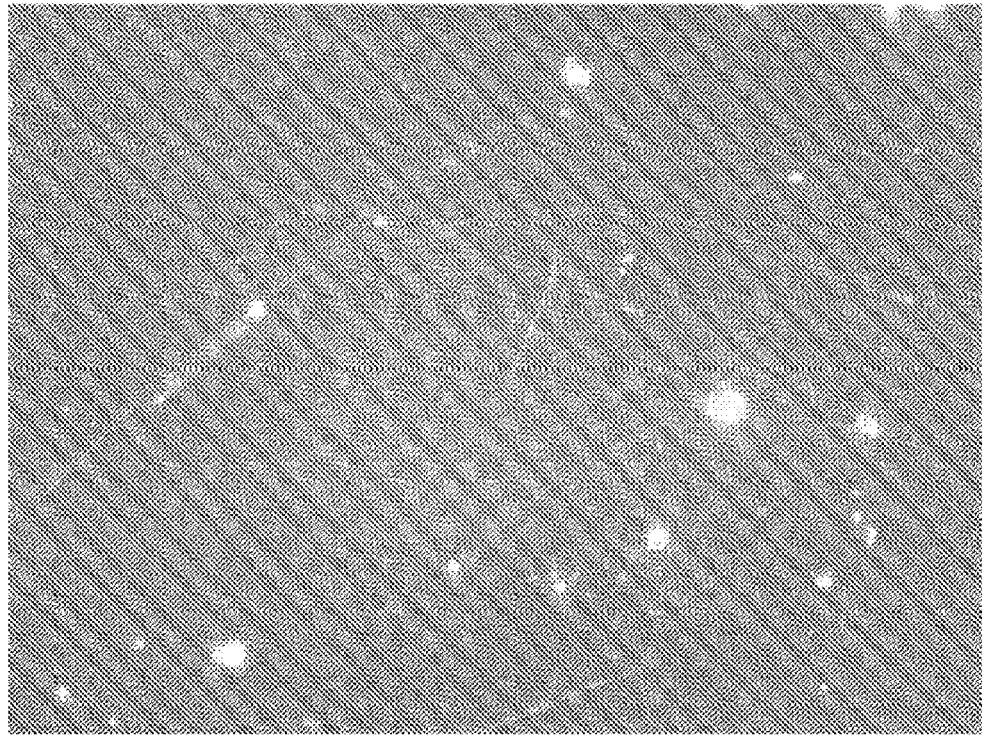
FIG. 15 is a microstructure image (×650) of the modified sulfur prepared by an example of the disclosure that includes fiber shaped microstructure in the modified sulfur.

FIG. 12 and FIG. 13 are microstructure images (×650) of the modified sulfur terminating the reaction earlier than the reaction completion step of the disclosure, FIG. 14 is a microstructure image (×650) of the modified sulfur prepared by an example of the disclosure that includes film type microstructure shape in the modified sulfur, and FIG. 15 is a microstructure image (×650) of the modified sulfur prepared by an example of the disclosure that includes fiber-like microstructure in the modified sulfur.

Referring to the FIG. 12 and FIG. 13, the modified sulfur in FIG. 12 and FIG. 12 was prepared by progressing polymerization of mixture including sulfur melted at about 140 and dicyclopentadiene-based modifier under control of temperature change according to the traditional method, where color of the mixture was changed from transparent, yellow, wine, red, semitransparent dark brown, to opaque black depending on progression degree of the reaction. FIG. 12 is a microstructure image (×650) of the modified sulfur terminating the reaction when the mixture was yellow and FIG. 13 is a microstructure image (×650) of the modified sulfur terminating the reaction when the mixture was dark brown.

In the above FIG. 12 and FIG. 13, it was found that in the microstructure images of the modified sulfur terminating the reaction when the mixture was yellow or dark brown, unreacted brittle sulfur was scattered. As this unreacted sulfur makes the modified sulfur exist as solid during leaving or cooling it at room temperature (usually, 15~25) after completion of polymerization between sulfur and dicyclopentadiene-based modifier, and progresses the reaction of the modified sulfur again during re-melting of the solid modified sulfur to mix it with materials such as concrete or asphalt, increases viscosity of cement mortar mixture as well as viscosity of the modified sulfur, reduces slump of the concrete, and finally decreases fluidity of the mixture, it becomes impossible to meet the original purpose to use the modified sulfur as a property improving additive.

In addition, because in the environments such as concrete or asphalt site, precise temperature controlling is difficult and the modified sulfur is re-melted by simple heating, the modified sulfur may be carbonized by rapid heating, so both adhesiveness and strength may disappear.

Moreover, as it exists as uniform of solid, it also has a demerit that blending or reaction with hydraulic materials is difficult.

On the other hand, the images of FIG. 14 and FIG. 15 showing images of microstructure according to an example of the disclosure demonstrate microstructure characteristics contrast to the images of FIG. 12 and FIG. 13.

The modified sulfur in FIG. 14 was prepared by progressing polymerization of mixture including sulfur melted at about 140 and dicyclopentadiene-based modifier under control of temperature change according to the traditional method, where color of the mixture was changed from transparent, yellow, wine, red, semitransparent dark brown, to opaque black depending on progression degree of the reaction. The modified sulfur was obtained by progressing the reaction further until the time point when it obtains elasticity just before rubber-like state, exceeding the time point when it comes to have spinnability.

As shown in the image of FIG. 14, it was identified that film-like microstructure was developed in the modified sulfur according to an example of the disclosure, different from the images of FIG. 12 and FIG. 13.

FIG. 15 is an image of the modified sulfur that was prepared with same method to the example of FIG. 14, but terminated the reaction when the spinnability was developed. Referring to the image of FIG. 14, it was identified that fiber-like microstructure was developed in the modified sulfur according to an example of the disclosure.

Figure 2:
FIG. 2 is a SEM image showing microstructure of the modified sulfur prepared by preparation example 3-1 among the preparation examples of modified sulfur.
Figure 3:
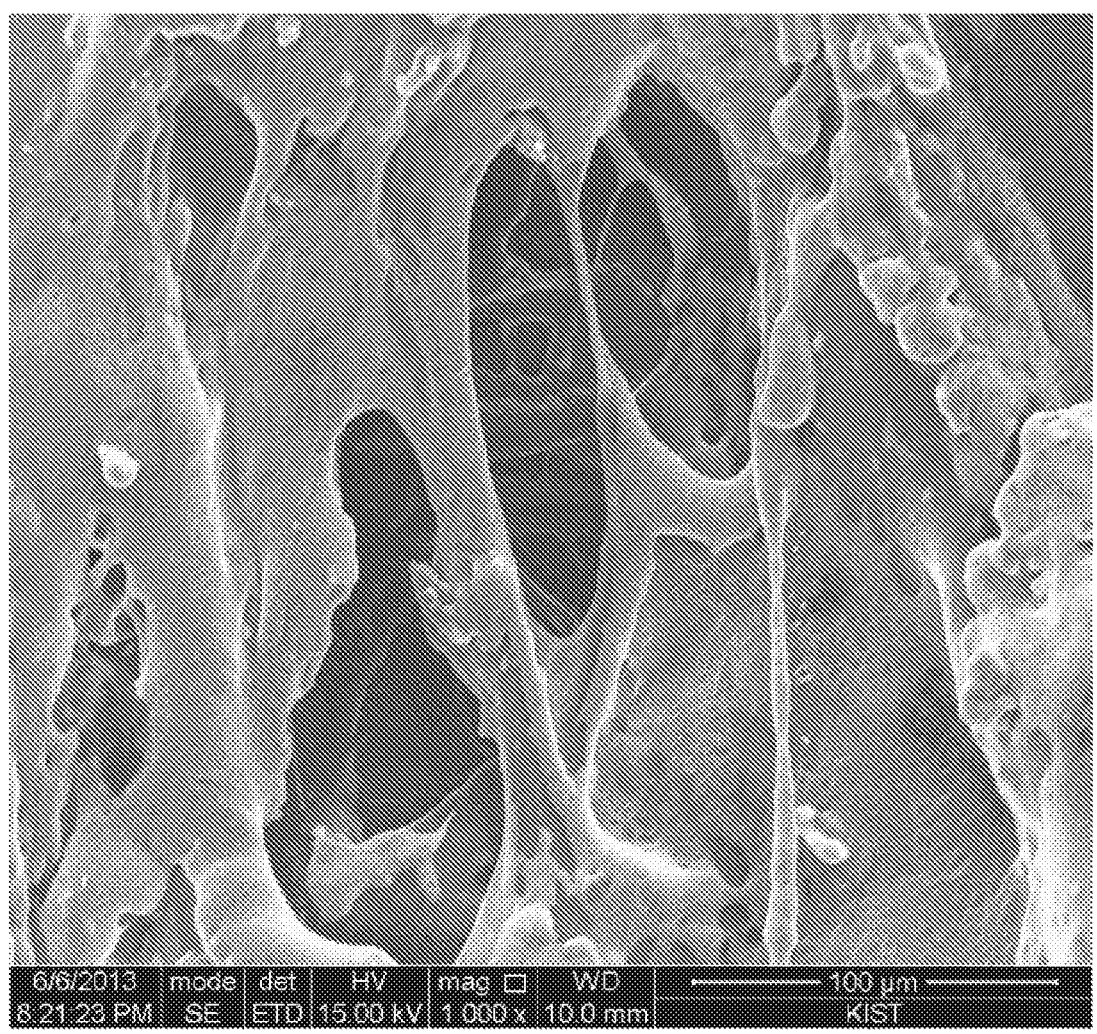
FIG. 3 is a SEM image showing microstructure of the modified sulfur prepared by preparation example 3-2 among the preparation examples of modified sulfur of the disclosure.

Referring to the SEM images in FIG. 1~FIG. 3 showing microstructure of the modified sulfur according to an example of the disclosure, it was identified that network-like microstructure was developed.

One of differences between microstructure of the modified sulfur in the disclosure and the modified sulfur in the prior art is that there is absolutely no or few unreacted sulfur particles which had been observed in traditional modified sulfur and the modified sulfur in the disclosure includes micro-structures such as fiber, film, or network structure or has spinnability.

The modified sulfur may have spinnability.

Figure 5:
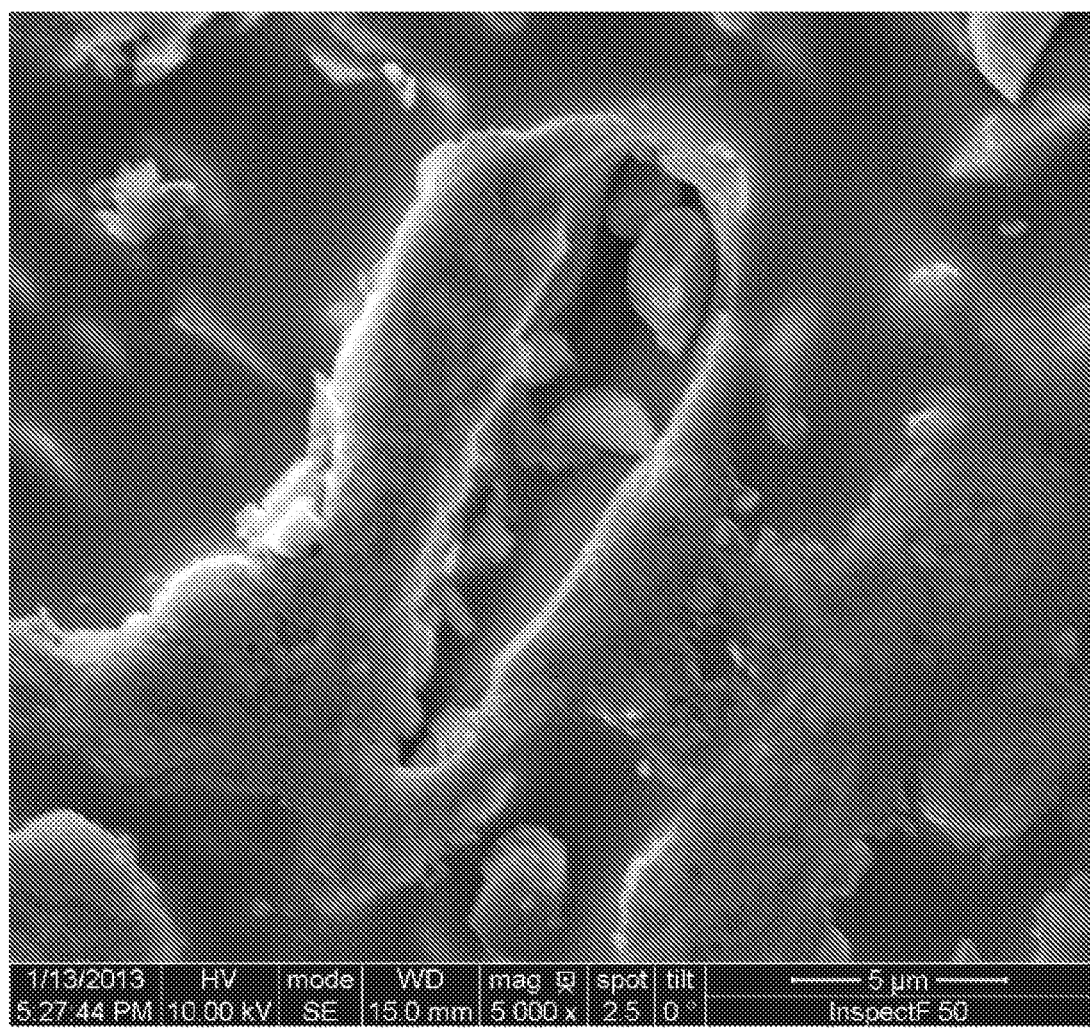
FIG. 5 is a SEM image showing microstructure of the modified sulfur in comparative example 2 of experimental example 1.

As shown in FIG. 5 showing an example of modified sulfur prepared by the method of prior art, it was found that the modified sulfur prepared by the method of prior art had different form from the microstructure specified in the disclosure. The difference is confirmed also in the microstructure between the modified sulfur prepared by the method of prior art and the sample (additional working example) according to an example of the disclosure that was made to have spinnability through ageing process. When comparing the modified sulfur (FIG. 25) prepared by the method of prior art, there is a remarkable difference that in the modified sulfur having spinnability (FIG. 26), no unreacted sulfur particle is observed.

The modified sulfur may include at least one additive selected from the group consisting of surfactant, coupling agent, catalyst, cross-linker, dispersant and their combinations.

For the surfactant, the coupling agent, the catalyst, the cross-linker, and the dispersant, materials usually classified as the above names can be applied and are not limited particularly. The additives can improve dispersion degree of the modified sulfur or form hydrophilic or hydrophobic reaction group and can play a role in inhibiting or promoting cross link between polymers included in the modified sulfur generated by polymerization.

The surfactant may include at least one selected from the group consisting of anion surfactant, cation surfactant, non-ionic surfactant, amphiprotic surfactant and their combinations.

The anion surfactant includes sulfate-based anion surfactant, sulfonate-based anion surfactant, and other anion surfactants.

The sulfate-based anion surfactant may include alkyl sulfate, alkyl-ester-sulfate, alkyl ether sulfate, alkyl-ethoxy-ether-sulfate, sulfated alkanolamide) and glyceride sulfate.

The sulfunate-based anion surfactant may include dodecyl benzene sulfonate including ABS (alkyl benzene sulfonate) and LAS (linear alkyl benzene sulfonate), hydrotropes, short tail alkyl-benzene sulfonate, alpha-olefin sulfonate; lignosulfonate; sulfo-carboxylic compound including sodium lauryl sulfoacetate.

The other anion surfactant may include organo phosphored surfactant, alkyl amino acid including lauryl sarcosinate, and sarcosine.

The cation surfactant may include linear alkyl-amine including fatty amine, linear alkyl-ammonium including quaternary alkyl ammonium, linear diamine, n-dodecyl pyridinium chloride, imidazole, and morpholine compound.

The non-ionic surfactant may include ethoxylated alcohol, alkylphenol, fatty acid ester, and nitrogenated non-ionic surfactant.

The non-ionic surfactants such as ethoxylated alcohols and alkylphenols may include ethoxylated linear alcohol, ethoxylated alkyl phenol, ethoxylated thiol, nonyl phenol, and octyl phenol.

The fatty acid ester non-ionic surfactant may include polyethoxy ester, glycerol ester, hexitol, and cyclic anhydrohexitol ester.

The nitrogenerated nonionic surfactant may include ethoxylated amine, imidazole (cyclic alkyl-diamine), ethoxylated alkyl-amide, and tertiary amine oxide.

The amphiprotic surfactant may include amino propionic acid, imino propionic acid, and quaternized compound and the quaternized compound includes sulfobetaine-based surfactant.

When applying the surfactant as the additive, it is possible to modify non-hydrophilic modified sulfur and prepare hydrophilic modified sulfur.

The coupling agent may include at least one selected from the group consisting of silane-based coupling agent, titanate-based coupling agent, chrome-based coupling agent, and aluminate-based coupling agent and their combinations.

The silane coupling agent may include at least one selected from the group consisting of sulfide-based silane compound, mercapto-based silane compound, vinyl-based silane compound, chloro-based silane compound, metacryl-based silane compound, and their combinations.

The titanate-based coupling agent may include at least one selected from the group consisting of isopropyl triisostearyl titanate, isopropyl tridodecyl benzene sulfoneyl titanate, isopropyl tri(dioctyl pyrophosphite)titanate, tetraisopropyl di(tridencylphosphite)titanate, tetraisopropyldi(dioctylphosphite)titanate, tetraoctyl oxytitinium(ditridencyl phosphite) and their combinations.

The aluminate-based coupling agent may include at least one selected from the group consisting of aluminum isopropylate, mono-sec-butoxyaluminum isopropylate, aluminum-sec-butylate, aluminum tri(ethylacetacetate), aluminum diisopropyloxide(monooleylacetacetate) and their combinations.

When applying the coupling agents as the additives also, it is possible to improve interfacial adhesiveness of the modified sulfur, particularly it is possible to improve adhesiveness with different materials when applying them by mixing with different materials and make complex material formation favorable.

The cross-linker may include metallic oxide such as sulfur-based cross-linker, organic peroxide, resin cross-linker, and magnesium oxide. The sulfur-based cross-linker includes inorganic cross-linkers such as flour sulfur, insoluble sulfur, precipitate sulfur, and colloid sulfur, and organic cross-linkers such as tetramethylthiuram disulfide (TMTD), tetraethyltriuram disulfide (TETD), and dithiodimorpholine. The sulfur-based cross-linker includes concretely elemental sulfur, vulcanizing agents to generate sulfur such as amine disulfide, and sulfur polymer. The organic peroxide may include at least one selected from the group consisting of benzoyl peroxide, dicumyl peroxide, di-t-butylperoxide, t-butylcumylperoxide, methylethylketone peroxide, cumene hydroperoxide, 2,5-dimethyl-2,5-di(t-butylperoxy)hexane, 2,5-dimethyl-2,5-di(benzoylperoxy)hexane, 2,5-dimethyl-2,5-di(t-butylperoxy)hexane, 1,3-bis(t-butylperoxipropyl)benzene, di-t-butylperoxy-diisopropylbenzene, t-butylperoxybenzene, 2,4-dichlorobenzoylperoxide, 1,1-dibutylperoxy-3,3,5-trimethyl siloxane, n-butyl-4,4-di-t-butylperoxy valelate and their combinations.

The dispersant can be used to improve miscibility when mixing the modified sulfur and the surfactant, the modified sulfur and the coupling agent, or the modified sulfur and the stiffener. For the dispersant, anything able to improve dispersion degree in mixing the modified sulfur and the surfactant, the coupling agent, and the stiffener can be applied and the surfactant can also play a role as a dispersant when it only plays a role in improving dispersion degree in the above mixing.

The dispersant may include at least one selected from the group consisting of polyvinylpyrrolidone, polyethyleneimine, polyacrylic acid, carboxymethylcellulose, polyacrylamide, polyvinylalcohol, polyethyleneoxide, starch, gelatin and their combinations, but is not limited thereto.

At least one additive selected from the group consisting of the surfactant, the coupling agent, the cross-linker, the dispersant, and their combinations can be used as 0.1~200 parts by weight, particularly 0.1~50 parts by weight on the basis of 100 parts by weight of the sulfur. Use amount of the additive can be changed and used properly considering uses and application range of the modified sulfur and is not limited to the above mentioned contents.

At least one additive selected from the group consisting of surfactant, coupling agent, catalyst, cross-linker, dispersant and their combinations and the modified sulfur may be mixed under solvent.

For the solvent, common solvents that help mixing of the modified sulfur and the additive and do not inhibit polymerization of the modified sulfur can be applied.

The solvent may include at least one selected from the group consisting of water, amine-based solvent, ester-based solvent, ketone-based solvent, aliphatic or aromatic hydrocarbon-based solvent, ether-based solvent, alcohol-based solvent, polyol solvent, amide solvent, sulfone or sulfoxide solvent, acetate-based solvent, anhydrous inorganic solvent, and their combinations.

For the amine-based solvent, at least one selected from the group consisting of primary amines such as propyl amine, n-butyl amine, hexyl amine, and octyl amine, secondary amines such as di-isopropylamine and di(n-butyl)amine, tertiary amines such as trioctylamine and tri-n-butyl amine, alkyl amines such as ethyl amine, propyl amine, butyl amine, hexyl amine, octyl amine, and tri octylamine, cyclic amine, aromatic amine and their combinations can be used.

The ester-based solvent may include at least one selected from the group consisting of PEGMEA, acetic acid ethyl, acetic acid n-butyl, γ-butyrolactone, 2,2,4 trimethylpentandiol-1,3 mono isobutyrate, butyl cabitol acetate, butyl oxalate, dibutyl pthalate, dibutyl benzoate, butyl cellosolve acetate, ethylene glycol diacetate, ethylene glycol diacetate and their combinations.

The ketone-based solvent may include at least one selected from the group consisting of acetone, methylethyl ketone, methyl isobutyl ketone, 1-methyl-2-pyrrolidinone, cyclohexanone and their combinations.

The aliphatic or aromatic hydrocarbon solvent may include at least one selected from the group consisting of toluene, xylene, aromasol, chlorobenzene, hexane, heptane, octane, dodecane, cyclohexane, decane, tetradecane, hexadecane, octadecane, octadecene, nitrobenzene, o-nitrotoluene, anisole, mesitylene and their combinations.

The ether-based solvent may include at least one selected from the group consisting of diethyl ether, dipropyl ether, dibutyl ether, dioxane, tetrahydrofuran, diisobutyl ether, isopropyl ether, octyl ether, tri(ethylene glycol), dimethyl ether and their combinations.

The alcohol-based solvent may include at least one selected from the group consisting of methanol, ethanol, 1-propanol, 2-propanol, 1-butanol, 2-butanol, isobutanol, hexanol, isopropyl alcohol, ethoxy ethanol, ethyl lactate, octanol isopropyl alcohol, ethylene glycol mono methylether, benzyl alcohol, 4-hydroxy-3-methoxy benzaldehyde, isodeconol, butylcabitol, terpineol, alpha-terpineol, beta-terpineol, cineol and their combinations.

The polyol solvent may include at least one selected from the group consisting of glycerol, glycol, ethylene glycol, diethylene glycol, triethylene glycol, tetraethylene glycol, propylene glycol, dipropylene glycol, butanediol, hexylenediol glycol, 1,2-pentadiol, 1,2-hexadiol, glycerin, polyethylene glycol, polypropylene glycol, ethylene glycol monomethyl ether (methyl cellosolve), ethylene glycol monoethylether (ethyl cellosolve), ethylene glycol monobutyl ether (butyl cellosolve), diethylene glycol monoethyl ether and their combinations.

The amide-based solvent may include at least one selected from the group consisting of N-methyl-2-pyrrolidone (NMP), 2-pyrrolidone, N,N-dimethyl acetamide and their combinations.

The sulfone or sulfoxide solvent may include at least one selected from the group consisting of diethyl sulfone, tetra methylene sufone, dimethyl sulfoxide, diethyl sulfoxide and their combinations.

The acetate-based solvent may include at least one selected from the group consisting of ethyl acetate, butyl acetate, propylene glycol methyl ether acetate and their combinations.

The anhydrous inorganic solvent includes carbon disulfide and liquid ammonia, but is not limited thereto.

For the solvent, preferably water, alcohol solvent, ketone solvent, styrene, toluene, benzene, xylene, quinoline, pyrrole, dibutyl phthalate, $CS_2$, chloroform and their combinations can be applied.

In the mixing of the additive and the modified sulfur, known means capable of mixing and dispersion can be applied.

The modified sulfur may include liquid, solid, or rubber-like one and their combinations. When the modified sulfur is liquid, especially miscibility and dispersion with materials can be improved, necessity of additional heating process in mixing with hydraulic materials can be removed, and excellent modifying effect can be obtained with application of only small amount. In addition, when the modified sulfur is solid or rubber-like re-melting may be required to apply it to materials for road or construction and the re-melted modified sulfur in the disclosure may have 1,000~100,000 cP of viscosity at 135 and can show good property of matter with excellent adhesiveness and elasticity.

The modified sulfur may be hydrophilic or hydrophobic. The hydrophobic modified sulfur may be superior in spinnability, elastic recovery, elongation, and flame resistance and the hydrophilic modifier can be applied excellently as a substitute of sulfur modifier to be applied to hydration of concrete and hydrophilic polymer for concrete polymer complex.

The modified sulfur can be included in compositions such as anticorrosive coating, waterproof coating, asphalt repairing material, concrete tank surface repairing material, and shotcrete and shows excellent performance in various features such as waterproofing, corrosion control, bending stiffness, rapid drying, miscibility, and dispersion.

In case of applying the modified sulfur applicable to various uses to construction sites, it can be used as follows to meet construction method and property of matter required in the sites, but is not limited thereto.

When the modified sulfur is used as anticorrosive and waterproofing material, stiffener means an additive that can improve strength of anticorrosive coating film when the coating is formed.

The anticorrosive and waterproofing material may be room temperature (RT) spraying type, RT plastering type, or heating plastering type anticorrosive and waterproofing material, which has superior hardening, salt spray resistance, weldability, and adhesiveness. The RT spray type material is a type to spray the modified sulfur alone or as mixture with the stiffener using a sprayer without heating, which can be used by including diluent or stiffener and the RT plaster type has same installation method other than finishing the coating surface using tools and machines. The heating spraying type and the heating plastering type indicate types to spray and plaster the modified sulfur alone or as mixture with the stiffener after heating and melting the modified sulfur or the mixture.

The stiffener, for example, may include at least one selected from the group consisting of silica powder, diatomite, wollastonite, clays, chopped glass fiber, dyes, pigments, aluminum sulfate, liquid glass, $Ca(OH)_2$, zinc oxide, naphthalene, $Mg(OH)_2$, $CaCl_2$, $Al(OH)_3$, borax, $CaSO_4.2H_2O$, $Fe_2O_3$, zeolite, carbon fiber, whisker, $Na_2SO_3$, $MgSO_4.7H_2O$, fly ash, acrylic emulsion, epoxy, latex, carbon fiber or sheet, steel fiber, liquefied minerals, fiber filling, fibrous particles, flake shaped particles and their combinations. In addition, the stiffener may be powder or liquid type depending on ingredients of its raw material.

Moreover, because the sulfur and the dicyclopentadiene-based modifier used for preparing the modified sulfur in the disclosure are low priced materials discharged as byproducts in petrochemical industry, it is possible to show ultra-rapid hardening, high strength, salt tolerance, non-shrink, and cracking resistance with remarkably lower cost comparing it with traditional concrete additives, improve matter properties of modified sulfur and products using it by controlling existence and content of initiator and additive, reaction condition and time properly, and apply it to production of secondary concrete products such as cement mortar for high strength centrifugal pole and ultra-rapid hardening non-shrink crosstie.

Method for Preparing Modified Sulfur

A method for preparing modified sulfur according to another example of the disclosure includes mixing (the first mixture preparing step), polymerizing the mixture (the first polymerization step), and terminating the polymerization (a reaction completion step).

The mixing includes the first mixture preparing step to prepare the first mixture by mixing sulfur and dicyclopentadiene-based modifier, and melting them at 120 or higher.

Concrete explanation about the above sulfur and dicyclopentadiene-based modifier and their content is same to the description of the modified sulfur according to an example of the disclosure, so omitted.

The polymerizing includes polymerization of the first mixture at 120 or higher to prepare the first reactant. The polymerizing may be performed at 120 or higher of a reaction temperature for reaction time, wherein the reaction temperature may be 120~200, particularly 130~160.

In case that the reaction temperature is 120 or lower, the polymerization between sulfur and dicyclopentadiene-based modifier is insignificant or not accomplished. In case that the reaction temperature exceeds 200, it may be difficult to control explosive reaction, materials under the reaction process may erupt, and explosion or carbonation of the modified sulfur may occur. 130~160 of the reaction temperature is the most preferable in terms of reaction control or productivity.

During the polymerizing process, the sulfur and the dicyclopentadiene-based modifier react each other, passing through mixing, evaporation, and liquefaction and color of the mixture changes in order of transparency, yellow, wine, red, semitransparent dark brown and opaque black.

The method for preparing modified sulfur includes the terminating which is the reaction completion step to prepare the modified sulfur by continuing polymerization of the first reactant with attention to sharp exothermic reaction from the polymerization and then terminating the polymerization at the end point of the reaction when the first reactant obtains spinnability.

The modified sulfur passing through the terminating may include micro-structures such as fiber, film, or network structure, which can be controlled by reaction conditions such as the end point of the reaction and reaction temperature.

The end point of the reaction may be between the time when the first reactant obtains spinnability and the time when rubberization of the first reactant occurs.

For example, when terminating the polymerization at the time when the first reactant obtains spinnability, it is possible to obtain modified sulfur with film-like micro-structures and prepare modified sulfur with far superior adhesiveness and elastic modulus.

For example, it is possible also to continue the reaction further after the time when the first reactant obtains spinnability and terminates it before the time when the first reactant obtains elasticity and changes to rubber-like form. In this case, modified sulfur with fiber-like or network-like microstructure form can be obtained.

In addition, the end point of the reaction may be the time when viscosity of the first reactant is more 10,000 cP, particularly 10,000 cP~1 million cP.

The terminating can be performed including cooling to RT process to cool the first reaction, prepared modified sulfur, to RT (15~25), changing the condition of reaction temperature.

The cooling to RT process means a process to cool the first reactant at the time of reaction completion, to which ageing/curing method to leave it at RT or cool it to RT after maintaining it at a certain temperature 120 or lower or quenching method to terminate reaction by putting the first reactant or the modified sulfur into RT or cold water can be applied.

The manner of the ageing can be performed by maintaining the ageing temperature to 40~120. When maintaining higher ageing temperature for longer time, it is possible to obtain modified sulfur with higher viscosity. In addition, the manner of the ageing can be done in a general tank or storage container, not in an agitator installed reactor and has a merit that the modified sulfur can be prepared without concern about damage of reactor from the modified sulfur's high viscosity or sudden reaction to rubber-like form, increasing the viscosity to intended level.

For the modified sulfur cooled down to RT, it is possible to obtain modified sulfur including micro-structures such as fiber, film, and network structure or having spinnability according to reaction condition such as reaction temperature and reaction time.

The first mixture, the first reactant, and their combinations may include an initiator also. Concrete explanation about types, contents, and effects of the initiator is overlapped with description of the modifier in an example of the disclosure, so omitted.

Especially, the initiator can be added in one of the mixing, the polymerization, and the termination or repeatedly in these processes and its addition time can be controlled according to characteristics of desired modified sulfur.

Concretely, the initiator can be added at any time between the mixing to prepare the first mixture by melting and mixing and the time that color of the first mixture changes from yellow, wine, red, semitransparent dark brown and opaque black during polymerization. In addition, the initiator can be added and applied at a time just before termination of reaction.

At least one additive selected from the group consisting of surfactant, coupling agent and their combinations can be included also in the first mixture, the first reactant or the modified sulfur. The one additive selected from the group consisting of surfactant, coupling agent and their combinations can be mixed and dispersed with a dispersant and another additive including a dispersant under solvent. To the mixing and dispersion, known means can be applied, but preferably sonication treatment can be used to obtain strong and homogeneous dispersion effect.

Concrete explanation about types, contents, and effects of the additive is overlapped with description of the modified sulfur in an example of the disclosure, so omitted.

Description about viscosity, form, and re-melting condition of the completed modified sulfur is overlapped with description of the modified sulfur in an example of the disclosure, so omitted.

In case of preparing the modified sulfur by including the initiator also, it is possible to show superior effect in adhesiveness and elasticity of the prepared modified sulfur than the case without the initiator. In addition, it is also possible to control characteristics of modified sulfur by controlling addition point, type, and amount of the initiator.

Moreover, the method for preparing modified sulfur can reduce generation of toxic order recognized as a demerit in traditional methods to prepare modified sulfur. Therefore, when applying the method for preparing modified sulfur of the disclosure it is possible to work without deodorant and improve convenience in manufacturing process.

A method for preparing modified sulfur according to another example of the disclosure includes: preparing (a preparing step) a mixture including sulfur, dicyclopentadiene-based modifier, and an initiator; sonicating (sonication step) the mixture with ultrasonic to prepare a reactant; and ageing (an ageing step) the reactant at 40 or higher to prepare modified sulfur.

The mixture may include 100 parts by weight of sulfur, 1~300 parts by weight of dicyclopentadiene-based modifier, and 0.1~200 parts by weight of initiator. In concrete description about characteristics of prepared modified sulfur, ingredients added for preparation, their types and contents, the contents overlapped with the above description is omitted.

The sulfur in the preparing may be powder or melted one at 120 or higher. The mixture in the preparing may have less than 10 cP of viscosity.

For the sonication, for example, 20 kHz~1 MHz frequency range of ultrasonic can be used but is not limited thereto. Although the sonication time depends on output of ultrasonic, amount of reactant, and size of reactor, for instance, the sonicating may be performed at least 10 min or higher than 30 min.

The sonicating may be done at 120 or lower of reactor temperature or RT. By the sonication, a process that pores appear and disappear repeatedly in the mixture may occur and environment with high temperature and high pressure is formed instantly. Accordingly, even if unmelted sulfur is included in the mixture, reaction of the sulfur and the dicyclopentadiene-based modifier can be accomplished. The reactant in the ultrasonication may have less than 10 cP of viscosity.

Although in the sonicating, the mixture of sulfur and dicyclopentadiene-based modifier is required to perform the reaction by sonication in the reactor, it does not mean to exclude that additional materials other than the sulfur, the dicyclopentadiene-based modifier, and the initiator are included in the reaction of the mixture. However, there is no need for the mixture or the reactant to include water during their preparation process through sonication.

The sonicating has merits including superior stirring effect at lower polymerization temperature and improved reaction speed of the modified sulfur due to cavitation of ultrasonic. This can result in reduction of total polymerization time of the modified sulfur and shorten production time of the modified sulfur even by using less energy, so is considered as ecofriendly manner with production cost saving effect.

When treating the modified sulfur mixture with ultrasonic, bubbles developed in the mixture pass through serial processes comprising creation, growth, and destruction repeatedly. By cavitation developed in this process, sound energy of the ultrasonic is converted to chemical energy and when internal and external condition of bubbles developed in their destruction reaches high temperature (<2,000~5,000 K) and high pressure (<500~1,000 atm), the reactant is flown into the bubbles and pyrolyzed by the high temperature and the high pressure, so polymerization of the modified sulfur is accomplished.

Because the dicyclopentadiene, the initiator, and solvent (when added) are liquid at RT or 120 or lower in this ultrasonication, when performing polymerization through ultrasonic manner after simply immersion of powder sulfur in liquid solvent at RT, it is possible to modify the elemental sulfur gradually with partial temperature increase of the modified sulfur reactant within short time.

Different from the manner progressing polymerization at 120 or higher by mixing the modifier after melting sulfur at 120 or higher, the melting point of the above mentioned elemental sulfur, a manner using ultrasonic has a merit that polymerization of modified sulfur can be induced only with a simple manner to mix the elemental sulfur into the above mentioned liquid solvent at RT without melting of it.

In addition, the above manner using ultrasonic (sonicating) has also another merit able to be converted easily to continuous type modified sulfur preparation equipment when applying ageing manner (ageing) to cylindrical in-line mix type manufacturing equipment.

Namely, when preparing modified sulfur by using the continuous type equipment for preparing modified sulfur, it is possible to prepare modified sulfur continuously at RT or below 100, not at higher temperature of 120 or higher and in addition, it is possible also to product modified sulfur products for multiple uses homogeneously and continuously from randomly set outlet line by differentiating polymerization degree (viscosity) of the modified sulfur moving very slowly. In other words, by differentiating property of viscosity rising gradually with progression of ageing, the modified sulfur with low viscosity can be used as anticorrosive material or for alkali resistant concrete repairing and reinforcing to be used through spray manner; the modified sulfur with more increased viscosity can be used for shotcrete and waterproofing and the modified sulfur with high viscosity can be used for asphalt.

However because this manner can be applied to the melted state by heating the elemental sulfur at 100 or higher to progress polymerization more rapidly by necessity, the preparing temperature must not be limited to below 100.

The modified sulfur may be prepared in continuous manner using continuous type equipment for preparing modified sulfur including a reaction part where the sonicating is done and an ageing part into which the reactant discharged from the above reaction part is flown.

Concretely, the said preparing may be performed by putting materials including 100 parts by weight of sulfur, 1~300 parts by weight of dicyclopentadiene-based modifier, and 0.1~200 parts by weight of initiator into a material inlet of the equipment for preparing modified sulfur, and the said sonicating is performed by putting a mixture comprising the said materials into the reaction part connected with the material inlet and then sonicating the mixture with ultrasonic generated in an ultrasonic irradiator installed in the reaction part so that a reactant is formed by reacting solid sulfur included in the mixture with the dicyclopentadiene-based modifier by cavitation that minute bubbles are formed and destructed again. The said ageing is performed by ageing the reactant flown into the ageing part from a reactant inlet connected with the reaction part to prepare the modified sulfur, and obtaining the modified sulfur prepared in continuous manner using at least one outlet part located sequentially from the reactant inlet.

The method for preparing modified sulfur can prepare modified sulfur with excellent property of matter by controlling reaction control time properly and particularly, when applying two methods of sonicating and ageing selectively or sequentially, it is possible to prepare modified sulfur with intended property of matter without risk of explosive reaction at high temperature. In addition, in case of preparing the modified sulfur through the ageing process, there is no concern about damage of reactor from the traditional method and gradual reaction can be induced, so it was further facilitated to prepare modified sulfur with intended property of matter.

Moreover, when preparing the modified sulfur continuously by using preparing equipment where input and mixing of composition, sonicating, and ageing are connected totally using continuous type reaction, it is possible to control characteristics of the modified sulfur by controlling conditions of each step and prepared modified sulfur with different viscosity concurrently by preparing multiple outlets along with the route where the modified sulfur moves in the reactor.

Equipment for Preparing Modified Sulfur

Figure 16:
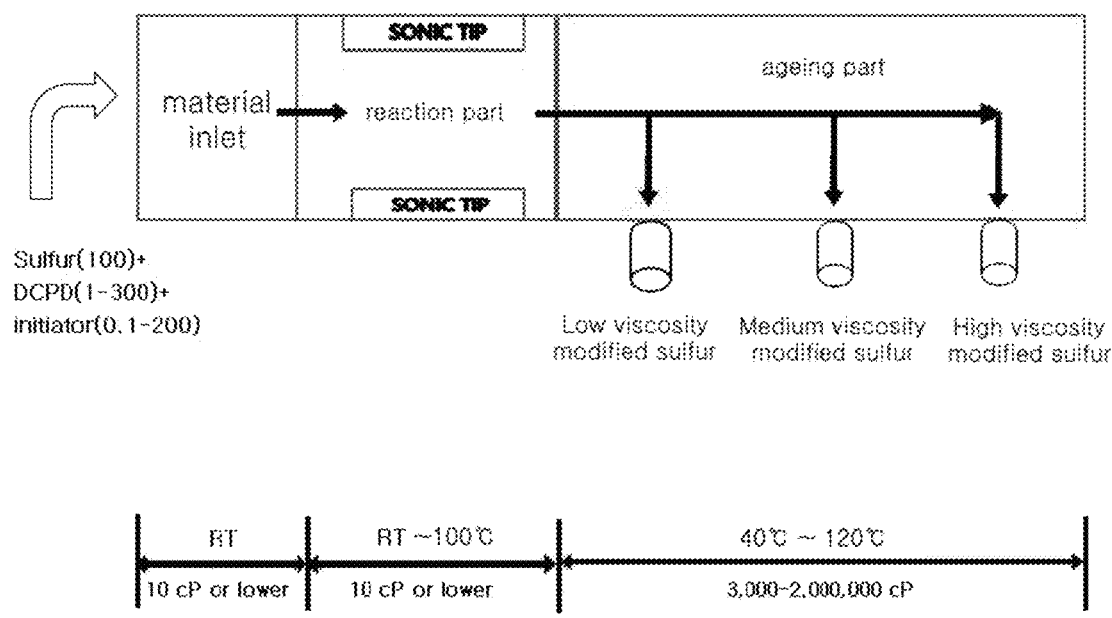
FIG. 16 is a conceptual drawing showing the concept of method for preparing modified sulfur according to an example of the disclosure.
Figure 17:
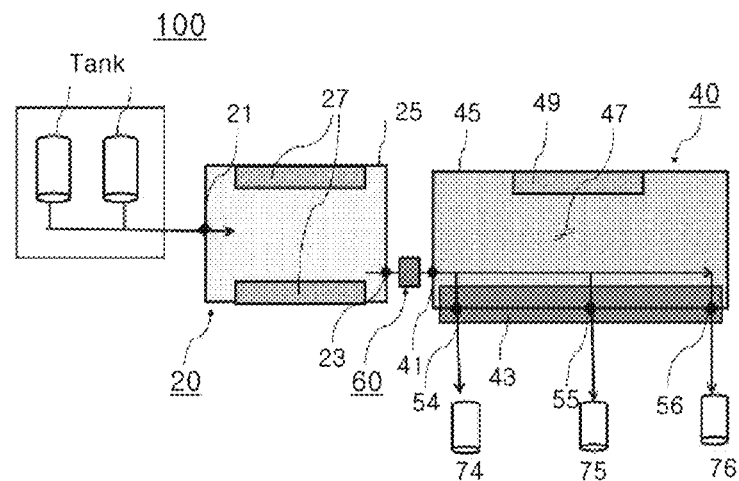
FIG. 17 is a conceptual drawing showing equipment for preparing modified sulfur according to an example of the disclosure.

FIG. 16 is a conceptual drawing showing the concept of method for preparing modified sulfur according to an example of the disclosure and FIG. 17 is a conceptual drawing of equipment for preparing modified sulfur according to an example of the disclosure. Referring to FIG. 16 and FIG. 17, equipment for preparing modified sulfur, an example of the disclosure is described.

The equipment for preparing modified sulfur (100) includes: a reaction part (20) comprising the first housing (25) with a material inlet (21) and a reactant outlet (23) and an ultrasonic generator (27) for sonication in the first housing; and an ageing part (40) comprising the second housing (45) with a reactant inlet (41) connected with the above reactant outlet (23) and a modified sulfur outlet (43), an ageing container (47) to store the reactant in the second housing (45), a temperature maintenance device (49) to maintain temperature in the ageing container (47).

The modified sulfur outlet (43) is formed on at least one side of the ageing container (47) and may include at least 2 outlets located on different distance from the reactant inlet (41).

The modified sulfur outlet (43) may include low viscosity outlet (54), medium viscosity outlet (55), and high viscosity outlet (56) formed on one side of the ageing container (47) sequentially.

Distance between the low viscosity outlet (54) and the modified sulfur outlet (43) may be shorter than that between the high viscosity outlet (56) and the modified sulfur outlet (43).

A flux controlling part (60) to control flux of reactant flown into the ageing part (40) may be included also between the reaction part (20) and the ageing part (40).

The equipment for preparing modified sulfur (100) may also include a low viscosity modified sulfur storing part (74) connected to the low viscosity outlet (54); a medium viscosity modified sulfur storing part (75) connected to the medium viscosity outlet (55); and a high viscosity modified sulfur storing part (76) connected to the high viscosity outlet (56).

The above material inlet (21) play a role in putting the mixture containing the sulfur, the dicyclopentadiene-based modifier, the initiator, or their combinations into the first housing (25) in a certain ratio, the ultrasonic generator (27) induces polymerization of the sulfur and the dicyclopentadiene-based modifier by sonicating the mixture with ultrasonic, and the temperature maintenance device (49) maintains the temperature in the ageing container (47) to ageing temperature at 120 or lower.

The equipment for preparing modified sulfur (100) prepares the modified sulfur in continuous manner and can control viscosity of the prepared modified sulfur by controlling temperature in the ageing container (47) and retention time of the reactant flown into the ageing container (47).

When using the equipment for preparing modified sulfur, the modified sulfur according to the method for preparing modified sulfur of the disclosure can be reacted in batch or continuous manner and in case of using it as a preparing equipment for continuous reaction, it is possible to prepare the modified sulfur continuously by using preparing equipment where input and mixing of composition, sonication, and ageing are totally connected.

For instances, in the modified sulfur prepared by using the equipment for preparing modified sulfur continuously, the sulfur, the dicyclopentadiene-based modifier, and the initiator added through the material inlet are reacted to form a reactant during passing through a space for sonication and the reactant is transferred to the ageing container sequentially to prepare the modified sulfur passing through ageing process during moving in the environment in the ageing container maintained to ageing temperature. Wherein, the modified sulfur has lower viscosity in closer site from the reactant inlet and higher viscosity in more distant site from the reactant inlet. This is because when the time that the modified sulfur is maintained in the ageing part at ageing temperature during passing through the ageing part is longer, the modified sulfur has further aged condition. At this time, when forming multiple outlets in the ageing part along with flow direction of the modified sulfur, it is possible to obtain the modified sulfur with desired viscosity range continuously according to location of the outlet within the continuous ageing process and prepare the modified sulfur continuously in one equipment for preparing modified sulfur, enabling the modified sulfur to have intended viscosity range for desired purpose.

When preparing the modified sulfur by using the equipment for preparing modified sulfur, controlling the conditions of each step explained the method for preparing modified sulfur according to an example of the disclosure, it is possible to control features of the modified sulfur according to necessity and also prepare modified sulfur with different viscosity concurrently by preparing multiple outlets along with the moving route of modified sulfur.

Shotcrete Composition

Shotcrete composition according to another example of the disclosure includes the modified sulfur as described above and aggregate. Description of the modified sulfur is overlapped with the above description, so omitted.

The aggregates may be at least one selected from the group consisting of recycled industrial waste, river sand, crushed stone, fly ash, sea sand, silica sand, gravel, silica, quartz powder, lightweight aggregate, clay mineral, glass powder and their combinations.

The recycled industrial waste, for instance, is waste stone flour sludge made by precipitating stone flour generated in crushing aggregates with sodium acrylate copolymer polymer coagulant, which means waste having difficulties in its landfill, but any industrial waste available as the aggregates can be applied as the recycled industrial waste and it is not limited to the waste stone flour sludge.

The aggregates can be included in the shotcrete composition as proper amount, particularly as 10~70 parts by weight on the basis of 100 parts by weight of the modified sulfur.

When applying fine aggregates with 1~10 mm of grain size, mortar can be applied and when applying coarse aggregates with 10~18 mm of grain size together with the fine aggregate, concrete can be applied.

The shotcrete composition may also include at least one stiffener selected from the group consisting of carbon fibers, iron bar, steel fiber, fiber-like filling, fiber-like particle, flake-like particle and their combinations. The stiffener may be included as 0.1~20 parts by weight on the basis of 100 parts by weight of the modified sulfur.

The shotcrete used as major tunnel support is a construction method to secure stability of tunnel by inhibiting rock relaxation immediately after blasting and excavation of the tunnel. Steel fiber shotcrete applied currently improves tensile strength, bending strength, and cracking resistance by dispersing discontinuous short steel fibers in concrete homogeneously, but has slower curing time and higher rebound rate failing to be attached to the rock in spite of use of higher priced additives such as accelerating agent, superplasticizer, and admixture as well as the steel fiber.

The shotcrete composition has a merit to enhance workability remarkably than traditional method, as it has effects able to demonstrate rapid curing time, strong adhesive power able to reduce the rebound rate, elasticity, and high strength by differentiating viscosity and rheology features with control of reaction termination time and ageing method.

Modified Sulfur Composition for Repairing and Reinforcing Acid/Alkali-Proof Concrete A modified sulfur composition for repairing and reinforcing acid/alkali-proof concrete according to another example of the disclosure includes the modified sulfur according to an example of the disclosure and inorganic materials and has acid and alkali tolerance. Description of the modified sulfur is overlapped with the above description, so omitted.

The inorganic material may be at least one selected from the group consisting of silica powder, diatomite, wollastonite, chopped glass fiber, Kevlar fiber, carbon fiber or sheet and their combinations. In addition, the inorganic material may be powder or liquid type depending on ingredients of its raw material.

The inorganic material can be used as 10~200 parts by weight on the basis of 100 parts by weight of the modified sulfur and for repairing concrete in manner of spraying or plastering it to a structure after mixing or melting and mixing it with the modified sulfur.

Modified Sulfur Composition for Bridge Deck Waterproof Coating

A modified sulfur composition for bridge deck waterproof coating according to an example of the disclosure includes the modified sulfur and the stiffener according to an example of the disclosure and has superior resistance against deicing agent, flying salt and salt damage on the seashore and rapid workability. Description of the modified sulfur is overlapped with the above description, so omitted.

As the modified sulfur has superior resistance to salt damage, is capable of rapid work due to fast hardening property, and has excellent adhesive strength with concrete and asphalt in paving bridge deck, it can be applied by including it to the composition for bridge deck waterproof coating.

The stiffener, for example, may include at least one selected from the group consisting of silica powder, diatomite, wollastonite, clays, chopped glass fiber, dyes, pigments, aluminum sulfate, liquid glass, $Ca(OH)_2$, zinc oxide, naphthalene, $Mg(OH)_2$, $CaCl_2$, $Al(OH)_3$, borax, $CaSO_4.2H_2O$, $Fe_2O_3$, zeolite, carbon fiber, whisker, $Na_2SO_3$, $MgSO_4.7H_2O$, fly ash, acrylic emulsion, epoxy, latex, carbon fiber or sheet, steel fiber, liquefied minerals, fiber filling, fibrous particles, flake shaped particles and their combinations. In addition, the stiffener may be powder or liquid type depending on ingredients of its raw material.

The modified sulfur composition for bridge deck waterproof coating comprising mixed or melted and mixed the stiffener and the modified sulfur can be applied as a manner of spraying or plastering it to a structure for bridge deck. The stiffener may use as 10~200 parts by weight on the basis of 100 parts by weight of the modified sulfur.

As thick waterproof coating is required in bridge deck construction site, it is difficult to meet the required coating thickness with the spraying manner. Thus plastering manner has been used traditionally, but the composition for bridge deck waterproof coating in the disclosure can be applied also with spraying manner by using high pressure sprayer, because it includes the modified sulfur having viscosity increased safely through ageing method.

In addition, the composition for bridge deck waterproof coating can play a role as waterproofing material between concrete structure and asphalt structure. Due to superior and elasticity modulus of the modified sulfur of the modified sulfur, the composition for bridge deck waterproof coating including the modified sulfur can be applied for multiple uses other than asphalt or concrete and has also suitable property of matter for bridge deck waterproof coating.

Application to Civil Engineering and Construction Materials

The modified sulfur can be applied as various civil engineering and construction material due to the above mentioned superior property of matter. The modified sulfur can be applied to modified sulfur for road or construction, modified sulfur for repairing and reinforcing, and modified sulfur for secondary product of concrete, but is not limited thereto.

In general, the concrete needs complementation for long term durability because of demerits such as long hardening time, small tensile strength, large dry shrinkage, and weak chemical resistance. In order to complement these demerits, additives such as various resins can be applied and the modified sulfur in the disclosure can be applied as one of these concrete additives.

The resins applied to the concrete can be divided into 2 types according to preparing method of concrete polymer complex. The first method is to apply non-hydrophilic thermosetting resin such as epoxy, polyurethane, and phenol, tar-modified resin such as tar-urethane and tar-epoxy, asphalt, vinyl monomer such as methyl methacrylate (MMA resin) and styrene, and unsaturated polyester as binding materials without use of cement and water and the second method is to apply various hydrophilic polymers SBR, PAE, and EVA in emulsion manner or use monomer low viscosity compound such as methyl methacrylate or styrene in form of impregnated polymer material by mixing it with various reinforcing fibers such as alkaline glass fiber, steel fiber, polyamide fiber, polypropylene fiber, polyethylene fiber and carbon fiber.

In order to improve property of the concrete polymer complex, the modified sulfur of the disclosure can be applied and it is desirable to use hydrophobic modified sulfur for applying it to the first method or hydrophilic modified sulfur for applying it to the second method.

The hydrophobic modified sulfur can display superior property of matter in spinnability, elastic recovery, elongation percentage, and flame retardancy and can also show excellent effect in terms of adhesiveness. Especially in case of the concrete polymer complex applied with the traditional first method, it was combustible and could be applied only to special places such as sewer pipe and underwater because of concerns about toxic gas and smell in combustion or dramatic strength reduction or destruction that may occur in combustion. However, when preparing concrete polymer complex using the hydrophobic modified sulfur in the disclosure, the concrete polymer complex itself has flame retardancy by the flame retardant feature of the material itself, toxic gas or smell is reduced remarkably, and it can show flame retardancy feature that even when it was ignited, it can be extinguished by itself.

In order to modify the concrete polymer complex in the second method, the modified sulfur in the disclosure can be applied and it is preferable to apply hydrophilic modified sulfur to apply it to the second method. The hydrophilic modified sulfur may have excellent features to be used for substitution of hydrophilic polymer for hydraulic and hardening type concrete polymer complex.

The modified sulfur for road building, which is applied to concrete or mortar to be used for road building or construction as a modifier, can be applied to hydraulic modified sulfur material composite, concrete polymer complex, geopolymer concrete, asphalt concrete, and complementary concrete weather concrete as a modifier The modified sulfur can be mixed with hydraulic materials, water, fine aggregate, aggregates to compose hydraulic modified sulfur composition and the hydraulic modified sulfur composition can be applied to materials for road building or construction. The above construction material may be mortar or concrete.

The hydraulic materials may include at least one selected from the group consisting of fly ash, blast-furnace slag, silica-fume, meta kaolin, calcium sulfate, cement and their combinations and the cement may include at least one selected from the group consisting of blast-furnace slags cement, air-entraining hydraulic cement, sulfate resisting Portland cement, magnesia cement (sorel cement), masonry cement, white Portland cement, ordinary Portland cement, hydraulic cement, slag cement, high alumina cement, high-early-strength Portland cement, moderate heat Portland cement, natural cement, expansive hydraulic cement and their combinations.

The Portland cement means Portland cement by the standard of KS L 5201, which includes cement defined by standard terms of hydraulic cement area defined by KS L 0005 standard.

In applying the modified sulfur to the hydraulic modified sulfur material composition, it can be applied as 0.1~10 parts by weight range on the basis of 100 parts by weight of the hydraulic material to obtain proper modifying effects in the economic range, but is not limited thereto.

The aggregates may include at least one selected from the group consisting of recycled industrial waste, river sand, crushed stone, fly ash, sea sand, silica sand, gravel, silica, quartz powder, lightweight aggregate, clay mineral, clay powder and their combinations and can be included as proper amount in the material for road building or construction, particularly 100~800 parts by weight on the basis of 100 parts by weight of the hydraulic material. When applying fine aggregates with 1~10 mm of grain size, mortar can be applied and when applying coarse aggregates with 10~18 mm of grain size together with the fine aggregate, concrete can be applied.

The hydraulic modified sulfur material composition may also include at least one stiffener selected from the group consisting of iron bar, steel fiber, fiber-like filling, fiber-like particle, flake-like particle and their combinations.

When the hydraulic modified sulfur material composition includes the modified sulfur in the disclosure, it is possible to improve its property of matter in spite of smaller amount of the modified sulfur.

The concrete polymer complex includes polymer cement concrete, polymer concrete, and polymer immersion concrete. Methods to apply the modified sulfur in the disclosure as a modifier of the concrete polymer complex includes a method to use hydrophobic modified sulfur of the disclosure as a binding material instead of hydraulic materials such as the above mentioned cement and a method to apply hydrophilic modified sulfur as an additive for a method to use hydraulic materials such as cement with water.

The geopolymer concrete refers to a method for preparing concrete by using environmental raw materials with potential hydraulic feature such as slag and fly ash as its main materials, instead of cement with large $CO_2$ development and using alkali activating agent such as liquid glass. The modified sulfur in the disclosure can show a feature to be cured by reacting with water and proceed with hardening process by reacting with potential hydraulic materials, thus it can be applied as a modifier of the geopolymer concrete.

Because the modified sulfur in the disclosure can demonstrate far superior elasticity, bending, and adhesiveness as well as hydration and hardening feature, it can be applied as a substitution of plywood, finishing material, and artificial wood material with appropriate stiffener (fibers or fillers). In addition, it is possible to manufacture nonflammable products when using it by mixing with hydraulic and potential hydraulic materials.

The asphalt concrete includes straight asphalt, blown asphalt [asphalt improving thermosensitivity and adhesiveness to road surface by blowing air to straight asphalt and increasing its viscosity], SBS(Styrene butadiene styrene block copolymer) polymer modified asphalt [asphalt able to keep its elasticity and flexibility regardless of temperature change by modifying it with SBS], CRM rubberized asphalt [asphalt to improve low temperature elongation and elevate softening point by modifying it with rubber], non-hydrophilic (solvent type) asphalt such as cutback asphalt, and emulsified asphalt [asphalt emulsified with cation system (RSC, MSC) or anion system (RSA, MSA)].

In order to apply the modified sulfur in the disclosure to the above solvent type non-hydrophilic asphalt, it is possible to apply the non-hydrophilic modified sulfur alone or as a mixture by adding and mixing a certain amount of the modified sulfur into asphalt. In addition, in order to apply the modified sulfur in the disclosure to the above emulsified asphalt, it is preferable to apply hydrophilic modified sulfur.

For the concrete for substituting weather concrete, as a cold damage may occur in preparing general concrete in cold condition at below −4, ultra rapid hardening special cement is being used for construction, but the modified sulfur in the disclosure can provide ultra-rapid hardening, highly intensive modified sulfur concrete by substitution a part or whole of the ultra-rapid hardening special cement.

When differentiating matter property of the modified sulfur for repairing and reinforcing, it can be applied to substitution for repairing high priced modified asphalt (blown asphalt); SBS modified asphalt, rubberized asphalt) and concrete (LMC bridge deck pavement, epoxy injection, ultra rapid hardening cement); substitution for epoxy, iron bar anticorrosive material, substitution for epoxy hardener using epoxy as main material and modified sulfur as a hardener; substitution for epoxy used in sea water channel of nuclear power plant or oil storage tank of oil refinery to which salt resistance, high adhesiveness, and high waterproofing property are applicable; substitution for anticorrosive material used in water tank or waste water disposal plant; substitution for underground bunker and structure concrete; substitution for ultra-rapid hardening airstrip concrete, substitution for extension joint and shoe requiring no-shrinkage and high strength; and substitution for waterproofing construction.

The substitution for waterproofing construction can be applied to substitution for epoxy and urethane waterproof coating which are exposed types, substitution for tar urethane which is unexposed type, substitution for tar urethane sheet, and dry/wet primer, and substitution for foaming urethane, ARC, 2 liquid type urethane which are injection type waterproof agent for water leak.

Especially, the modified sulfur of the disclosure can be applied to substitution for hardening body with very strong and highly adhesive property comparable to epoxy or urethane with superior elasticity and softness by differentiating types and content of initiator, polymerization degree, addition time, and reaction terminating time during preparation process. The modified sulfur of the disclosure can be applied alone or as a mixture with other materials.

Especially, the modified sulfur of the disclosure demonstrates excellent adhesiveness to maintain strong adhesiveness in direct coating on target surface without pretreatment with primer, so can be used by substituting for existing products in the above uses.

The secondary concrete product is a precasting product manufactured and used to demonstrate 500~800 kg/cm² of high strength within several or several tens of hours by using high temperature and high pressure in a concrete plant, not by curing after depositing in general construction sites or road building sites and can be applied to acid-resistant sewer pipe, centrifugal telephone pole for high strength, cement mortar for ultra-rapid hardening non-shrink crosstie, artificial fish reef with excellent salt damage resistance against seawater, vegetation seawall block, tetrapod, and bricks, blocks, pavements, and manhole used in the downtown area.

The modified sulfur acid-resistant sewer pipe which has few fire hazards and is used under strong acid environment at home and abroad often develops breakage from collision of its joint parts during installation work in underground space in spite of its higher selling price. It is considered that the present commercial modified sulfur sewer pipe contains modified sulfur that has not only excellent high strength feature but also brittle feature with weak impact resistance. However, the modified sulfur of the disclosure can demonstrate softness and elasticity with superior impact resistance simultaneously in addition to high strength feature and can complement the weak brittle feature of existing commercial modified sulfur acid-resistant sewer pipe.

Besides the waste stone flour sludge made by precipitating stone flour generated in crushing aggregates with sodium acrylate copolymer polymer coagulant, is considered as waste and has difficulties in its landfill. However when using chemical resistance, high strength, and ultra-rapid hardening of the modified sulfur in the disclosure, it can be applied to the secondary concrete products including artificial fish reef with excellent salt damage resistance against seawater, vegetation seawall block, tetrapod, and bricks, blocks, pavements, and manhole used in the downtown area.

Furthermore for mortar used for construction, various types such as cement mortar, non-shrink mortar, loess mortar, resin mortar, horizontal mortar, insulation mortar, epoxy resin mortar, and dry mortar are being sold and recently, demand of loess mortar increases sharply with increase of preference for ecofriendly products. Loess is an eco-friendly material produced naturally from underground and applied to loess powder, natural loess, loess board, loess stone, loess coat, loess putty, loess paint, loess ball, and loess brick. Loess mortar includes products for plastering, laying, floor, and finishing and its application methods includes a method to plaster loess paste made by mixing only loess product and water with a trowel or a plastering knife and a method to coast loess mixture to the wall using a sprayer. Although the plastering thickness is 1~10 mm, the plastering thickness on the cement finishing wall is 5~10 mm. Dry time is 1~4 days and required properties are no cracking, excellent strength, and eco-friendly product.

The loess is soil in natural state comprising silica containing hydrous iron oxide and anhydrous iron oxide and can be obtained from the whole of Korea, so loess mortar products using it has some advantages in aspect of price and eco-friendly features compared with cement mortar. However, while the cement mortar displays its unique strong adhesiveness and strength, the loess is likely to develop cracks as time passes after construction due to its own weak hardening feature. In order to prevent this, the loess is practically used by mixing it with small amount or cement or organic binder.

Because the modified sulfur in the disclosure has its specific antibiosis, ultra rapid hardening, high elasticity, strong adhesiveness and low shrinkage, it can be applied as eco-friendly binder-based on these properties. For application type of eco-friendly, highly functional modified sulfur used in loess mortar, a method to mix powder type modified sulfur and loess in advance and sell it can be applied and liquid type modified sulfur can be also applied to mix it with loess.

Besides, the clay brick manufactured by plastic work of clay raw material at over 1200 of high temperature is used in many sites due to its no flammability and high strength, but has problems that because of requirement of heat treatment at high temperature cost for gas or electricity accounts for too large ratio in production cost and product quality may decrease from drying shrinkage of the loess.

The modified sulfur in the disclosure can manufacture bricks displaying low shrinkage without plastic work in a manner to use it in combination with an additive able to display thermosetting feature in addition to its specific features such as antibiosis, ultra rapid hardening, high elasticity, strong adhesiveness and low shrinkage, so can be used as an energy saving type binder-based on this. The energy saving type modified sulfur used in a nonplastic brick may be applied in a manner to manufacture the bricks in a heating type press or extruder maintain temperature within about 200 after mixing minimum amount of the modified sulfur modified to thermosetting type applicable as a binder, 5~20 parts by weight to 100 w % of inorganic brick materials, but is not limited thereto.

Anti-Corrosive Material and Preparation Method Thereof

Anticorrosive material according to an example of the disclosure includes modified sulfur that includes microstructures such as fiber, film, or network structure, or has spinnability.

The anticorrosive material may comprise modified sulfur and include also additional additive in addition to the modified sulfur.

The modified sulfur may include 100 parts by weight of sulfur and 1~300 parts by weight of dicyclopentadiene-based modifier and have 3,000~2000,000 cP of viscosity at 135. It may include also 0.1~200 parts by weight of initiator on the basis of 100 parts by weight of sulfur. In addition, it may be liquid or solid type, but liquid type is preferred for convenience sake of work. However, because solid modified sulfur can be applied to liquid anticorrosive material depending on additives or coating film forming condition (for example, temperature), the modified sulfur is not limited to liquid type at RT.

The modified sulfur may have spinnability or microstructure at RT or 135 and when it has these property, it can have far superior improved property of matter in adhesiveness as well as good hardening, salt water spray resistance, weldability, and work convenience of the anti-corrosive material.

Concrete explanation about the modified sulfur is overlapped with description of the modified sulfur in an example of the disclosure, so omitted.

The anticorrosive material may also include diluent, stiffener, and their combinations.

For the diluent, a product able to dilute its viscosity or grant quick drying property can be applied, but it is not limited thereto. Anything able to melt or disperse the modified sulfur can be used as the diluent.

The above diluent, for example, may include at least one selected from the group consisting of carbon disulfide, ammonia, alcohol-based solvent, di-tert-butyl polysulfide, tert-dodecyl polysulfide, tert-nonyl polysulfide, aniline, benzene, dibutyl phthalate, 2,2'-ethylenebisisothiouronium dibromide, dibromoethane, 1,2-Dibromoethane, iodoform, beta-naphthol (2-naphthol), olive oil, phenol, pyridine, quinoline, disulfur dichloride, toluene, m-xylene, p-xylene, and their combinations.

The diluent may be used with solvent and the above solvent may include at least one selected from the group consisting of water, amine-based solvent, ester-based solvent, ketone-based solvent, aliphatic or aromatic hydrocarbon-based solvent, ether-based solvent, alcohol-based solvent, polyol solvent, amide solvent, sulfone or sulfoxide solvent, acetate-based solvent, anhydrous inorganic solvent, and their combinations.

For the diluent, an amount to make viscosity of the anticorrosive material including the modified sulfur 1~1000 cP can be used and 1~100 parts by weight of diluent on the basis of 100 parts by weight of the modified sulfur can be used.

For the diluent, it is preferable to use eco-friendly diluent harmless to human or ecosystem.

The stiffener means an additive able to improve strength of formed anti-corrosive coating film and for example, may include at least one selected from the group consisting of silica powder, diatomite, wollastonite, clays, chopped glass fiber, dyes, pigments, aluminum sulfate, liquid glass, $Ca(OH)_2$, zinc oxide, naphthalene, $Mg(OH)_2$, $CaCl_2$, $Al(OH)_3$, borax, $CaSO_4.2H_2O$, $Fe_2O_3$, zeolite, carbon fiber, whisker, $Na_2SO_3$, $MgSO_4.7H_2O$, fly ash, acrylic emulsion, epoxy, latex, carbon fiber or sheet, steel fiber, liquefied minerals, fiber filling, fibrous particles, flake shaped particles and their combinations. In addition, the stiffener may be powder or liquid type depending on ingredients of its raw material.

The anticorrosive material including the stiffener also can improve further strength of the anticorrosive coating film and types and content of the stiffener in the anticorrosive material may be different considering work convenience, miscibility with the modified sulfur and target structure to be coated with the anticorrosive material, but preferably may include 1~100 parts by weight of the stiffener on the basis of 100 parts by weight of the modified sulfur.

The anticorrosive material may be room temperature (RT) spraying type, RT plastering type, or heating plastering type anticorrosive material, which has superior hardening, salt spray resistance, weldability, and adhesiveness. The RT spray type material is a type to spray the modified sulfur alone or as a mixture with the stiffener using a sprayer without heating, which can be used by including diluent or stiffener and the RT plaster type has same installation method other than finishing the coating surface using tools and machines. The heating spraying type and the heating plastering type indicate types to spray and plaster the modified sulfur alone or as a mixture with the stiffener after heating and melting the modified sulfur or the mixture.

The modified sulfur or the anticorrosive material may be liquid at 25 and the anticorrosive material may have 1~1,000 cP of RT type viscosity at 25 and 1~10,000 cP of heating type viscosity at 135.

A method for preparing anticorrosive material according to another example of the disclosure includes: mixing 100 parts by weight of sulfur, 1~300 parts by weight of dicyclopentadiene-based modifier and melting them at 120 or higher to prepare the first mixture (the first mixture preparing step); polymerizing the first mixture at 120 or higher to prepare the first reactant (the first polymerization step); and terminating the polymerization of the first reactant at the end point of the reaction to prepare anticorrosive material including the modified sulfur prepared (a reaction completion step).

The end point of the reaction may be between the time when the first reactant obtains spinnability and the time when rubberization of the first reactant occurs. However, in case of terminating the polymerization earlier than the time when the first reactant obtains spinnability, there may be additional ageing step. The ageing step is described later.

Description about the anticorrosive material and the modified sulfur is same to the above mentioned description, so omitted.

The method for preparing anticorrosive material may further include blending a composition after the said terminating.

The blending means a process to mix the modified sulfur and an additive.

The additive may include at least one selected from the group consisting of diluent, stiffener, and their combinations.

Concrete description about types and content of the additive is overlapped with the above mentioned explanation, so omitted.

In addition, in the explanation about the method for preparing anticorrosive material, contents overlapped with the description of the modified sulfur are omitted.

A method for preparing anticorrosive material according to another example of the disclosure includes: preparing a mixture including 100 parts by weight of sulfur, 1~300 parts by weight of dicyclopentadiene-based modifier, and 0.1~200 parts by weight of initiator (a preparing step); sonicating the mixture with ultrasonic to prepare a reactant (a sonication step); and ageing the reactant at over 40 to prepare an anticorrosive material including modified sulfur prepared (an ageing step).

Description about the anticorrosive material and the modified sulfur is same to the above mentioned description, so omitted.

The sonicating may be treated by 20 kHz~1 MHz of ultrasonic to the reactant.

The sonicating may be done at 120 or lower of the reactant temperature and at 40 or higher.

In addition, in the explanation about the method for preparing anticorrosive material, contents overlapped with the description of the modified sulfur are omitted.

A method for preparing anticorrosive material according to another example of the disclosure includes a step to spray the anticorrosive material to structure.

The structure means a structure with surface requiring the anticorrosive feature like metal and concrete and anything that needs anticorrosive effect and the anticorrosive coating film can be formed corresponds to the structure. Concrete contents about the anticorrosive material are same to the above description.

A method for preparing an anticorrosive coating film according to another example of the disclosure includes a step to form the anticorrosive coating film by spraying the anticorrosive material prepared with the method for preparing anticorrosive material to structure.

The structure means a structure with surface requiring the anticorrosive feature like metal and concrete and anything that needs anticorrosive effect and the anticorrosive coating film can be formed corresponds to the structure. Concrete contents about the anticorrosive material are same to the above description.

Waterproofing Material and Preparation Method Thereof

Waterproofing material according to an example of the disclosure includes modified sulfur that includes microstructures such as fiber, film, or network structure, or has spinnability.

The waterproofing material may comprise modified sulfur and include also additional additive in addition to the modified sulfur.

The modified sulfur may include 100 parts by weight of sulfur and 1~300 parts by weight of dicyclopentadiene-based modifier and have 3,000~2000,000 cP of viscosity at 135. It may include also 0.1~200 parts by weight of initiator on the basis of 100 parts by weight of sulfur. In addition, it may be liquid or solid type, but liquid type is preferred for convenience sake of work. However, because solid modified sulfur can be applied to liquid waterproofing material depending on additives or coating film forming condition (for example, temperature), the modified sulfur is not limited to liquid type at RT.

The modified sulfur may have spinnability or microstructure at RT or 135 and when it has these property, it can have far superior improved property of matter in adhesiveness as well as good hardening, salt water spray resistance, weldability, and work convenience of the waterproofing material.

Concrete explanation about the modified sulfur is overlapped with description of the modified sulfur in an example of the disclosure, so omitted.

The waterproofing material may also include diluent, stiffener, and their combinations.

For the diluent, a product able to dilute its viscosity or grant quick drying property can be applied, but it is not limited thereto. Anything able to melt or disperse the modified sulfur can be used as the diluent.

The diluent, for example, may include at least one selected from the group consisting of carbon disulfide, ammonia, alcohol-based solvent, di-tert-butyl polysulfide, tert-dodecyl polysulfide, tert-nonyl polysulfide, aniline, benzene, dibutyl phthalate, 2,2'-ethylenebisisothiouronium dibromide, dibromoethane, 1,2-Dibromoethane, iodoform, beta-naphthol (2-naphthol), olive oil, phenol, pyridine, quinoline, disulfur dichloride, toluene, m-xylene, p-xylene, and their combinations.

The diluent may be used with solvent and the above solvent may include at least one selected from the group consisting of water, amine-based solvent, ester-based solvent, ketone-based solvent, aliphatic or aromatic hydrocarbon-based solvent, ether-based solvent, alcohol-based solvent, polyol solvent, amide solvent, sulfone or sulfoxide solvent, acetate-based solvent, anhydrous inorganic solvent, and their combinations.

For the diluent, an amount to make viscosity of the waterproofing material including the modified sulfur 1~1000 cP can be used and 1~100 parts by weight of diluent on the basis of 100 parts by weight of the modified sulfur can be used.

For the diluent, it is preferable to use an eco-friendly diluent harmless to human or ecosystem.

The stiffener means an additive able to improve strength of formed waterproof coating film and for example, may include at least one selected from the group consisting of silica powder, diatomite, wollastonite, clays, chopped glass fiber, dyes, pigments, aluminum sulfate, liquid glass, $Ca(OH)_2$, zinc oxide, naphthalene, $Mg(OH)_2$, $CaCl_2$, $Al(OH)_3$, borax, $CaSO_4.2H_2O$, $Fe_2O_3$, zeolite, carbon fiber, whisker, $Na_2SO_3$, $MgSO_4.7H_2O$, fly ash, acrylic emulsion, epoxy, latex, carbon fiber or sheet, steel fiber, liquefied minerals, fiber filling, fibrous particles, flake shaped particles and their combinations. In addition, the stiffener may be powder or liquid type depending on ingredients of its raw material.

The waterproofing material including the stiffener also can improve further strength of the waterproofing coating film and types and content of the stiffener in the waterproofing material may be different considering work convenience, miscibility with the modified sulfur and target structure to be coated with the waterproofing material, but preferably may include 1~100 parts by weight of the stiffener on the basis of 100 parts by weight of the modified sulfur.

The waterproofing material may be room temperature (RT) spraying type, RT plastering type, or heating plastering type waterproofing material, which has superior hardening, salt spray resistance, weldability, and adhesiveness. The RT spray type material is a type to spray the modified sulfur alone or as a mixture with the stiffener using a sprayer without heating, which can be used by including diluent or stiffener and the RT plaster type has same installation method other than finishing the coating surface using tools and machines. The heating spraying type and the heating plastering type indicate types to spray and plaster the modified sulfur alone or as a mixture with the stiffener after heating and melting the modified sulfur or the mixture.

The modified sulfur or the waterproofing material may be liquid at 25 and the waterproofing material may have 1~1,000 cP of RT type viscosity at 25 and 1~10,000 cP of heating type viscosity at 135.

A method for preparing waterproofing material according to another example of the disclosure includes: mixing 100 parts by weight of sulfur, 1~300 parts by weight of dicyclopentadiene-based modifier and melting them at 120 or higher to prepare the first mixture (the first mixture preparing step); polymerizing the first mixture at 120 or higher to prepare the first reactant (the first polymerization step); and terminating the polymerization of the first reactant at the end point of the reaction to prepare anticorrosive material including the modified sulfur prepared (a reaction completion step).

The end point of the reaction may be between the time when the first reactant obtains spinnability and the time when rubberization of the first reactant occurs. However, in case of terminating the polymerization earlier than the time when the first reactant obtains spinnability, there may be additional ageing step. The ageing step is described later.

Description about the waterproofing material and the modified sulfur is same to the above mentioned description, so omitted.

The method for preparing waterproofing material may further include blending a composition after the terminating. The blending means a step to mix the modified sulfur and an additive. The additive may include at least one selected from the group consisting of diluent, stiffener, and their combinations.

Concrete description about types and content of the additive is overlapped with the above mentioned explanation, so omitted.

In addition, in the explanation about the method for preparing waterproofing material, contents overlapped with the description of the modified sulfur are omitted.

A method for preparing waterproofing material according to another example of the disclosure includes: preparing a mixture including 100 parts by weight of sulfur, 1~300 parts by weight of dicyclopentadiene-based modifier, and 0.1~200 parts by weight of initiator (a preparing step); sonicating the mixture with ultrasonic to prepare a reactant (a sonication step); and ageing the reactant at over 40 to prepare an anticorrosive material including modified sulfur prepared (an ageing step).

Description about the waterproofing material and the modified sulfur is same to the above mentioned description, so omitted.

The sonicating may be treated by 20 kHz~1 MHz of ultrasonic to the reactant.

The sonicating may be done at 120 or lower of the reactant temperature and at 40 or higher.

In addition, in the explanation about the method for preparing waterproofing material, contents overlapped with the description of the modified sulfur are omitted.

A method for preparing waterproofing material according to another example of the disclosure includes a step to spray the waterproofing material to structure.

The structure means a structure with surface requiring the waterproofing feature like metal and concrete and anything that needs waterproofing effect and the waterproof coating film can be formed corresponds to the structure. Concrete contents about the waterproofing material are same to the above description.

A method for preparing a waterproofing coating film according to another example of the disclosure includes a step to form the waterproof coating film by spraying the waterproofing material prepared with the method for preparing waterproofing material to structure.

The structure means a structure with surface requiring the waterproofing feature like metal and concrete and anything that needs waterproofing effect and the waterproof coating film can be formed corresponds to the structure. Concrete contents about the waterproofing material are same to the above description.

Asphalt Composition and Preparation Method Thereof

Asphalt composition according to an example of the disclosure includes modified sulfur that includes microstructures such as fiber, film, or network structure, or has spinnability.

The asphalt composition may include modified sulfur and asphalt and include also aggregates and the mixture of modified sulfur and inorganic materials shaped to form of pellet may be included in the asphalt composition in form of an asphalt additive.

The modified sulfur may include 100 parts by weight of sulfur and 1~300 parts by weight of dicyclopentadiene-based modifier and have 3,000~2000,000 cP of viscosity at 135. It may include also 0.1~200 parts by weight of initiator on the basis of 100 parts by weight of sulfur. In addition, it may be liquid or solid type, but liquid type is preferred for convenience sake of work. However, the solid type modified sulfur can be included in the asphalt composition depending on condition of construction or application of other additives.

The modified sulfur may have spinnability or microstructure at RT or 135 and when it has these property, it is possible to improve its property of matter such as tensile strength and bending strength as well as RT work stability and prevent gelation that may occur in mixing of the asphalt composite and depression that may occurs during deposition process. In addition, it is possible to modified sulfur asphalt composition able to minimize pavement breakage and cracking in construction such as road pavement by increasing plastic deformation resistance, because of containing greater amount of modified sulfur in comparison with asphalt.

Concrete explanation about the modified sulfur is overlapped with description of the modified sulfur in an example of the disclosure, so omitted.

The asphalt composition may include at least 30 parts by weight of modified sulfur on the basis of 100 parts by weight of the asphalt, particularly 30~100 parts by weight of modified sulfur.

The asphalt composition may include at least 10~70 parts by weight of aggregates on the basis of 100 parts by weight of the asphalt.

The asphalt is at least one selected from the group consisting of straight asphalt, diluted asphalt, and their combinations and the diluted asphalt may be prepared by diluting the straight asphalt with at least one fluid selected from the group consisting of paraffin distillate, aromatic distillate, naphtene-based distillate, and their combinations.

The asphalt concrete may include straight asphalt, blown asphalt [asphalt improving thermosensitivity and adhesiveness to road surface by blowing air to straight asphalt and increasing its viscosity], SBS(Styrene butadiene styrene block copolymer) polymer modified asphalt [asphalt able to keep its elasticity and flexibility regardless of temperature change by modifying it with SBS], CRM rubberized asphalt [asphalt to improve low temperature elongation and elevate softening point by modifying it with rubber], non-hydrophilic (solvent type) asphalt such as cutback asphalt, and emulsified asphalt [asphalt emulsified with cation system (RSC, MSC) or anion system (RSA, MSA)], but is not limited thereto.

In order to apply the modified sulfur to the asphalt, nonhydrophilic modified sulfur may be applied alone or as a mixture containing a certain amount of the modified sulfur and in order to apply the modified sulfur to the asphalt, hydrophilic modified sulfur may be applied.

Relating to this, the asphalt composition may be a composition substituting the modified sulfur partially for the general asphalt in the existing asphalt composition.

When applying traditionally used modified sulfur instead of the modified sulfur according to an example of the disclosure, too small content of the modified sulfur in the asphalt composition may be led to lower performance of asphalt such as plastic deformation resistance and content of the modified sulfur exceeding a certain level may show rigid concrete behavior similar to general concrete, so is not suitable for asphalt.

However, the modified sulfur included in the above mentioned asphalt composition may be at least 30 parts by weight on the basis of 100 parts by weight of asphalt. This is due to excellent properties of the modified sulfur applied in the disclosure, while the traditional modified sulfur could be used only less than 20 parts by weight on the basis of 100 parts by weight of asphalt. However, because the modified sulfur used in an example of the disclosure includes microstructure like network and has unique feature to display spinnability, even though over 30 parts by weight of the modified sulfur on the basis of 100 parts by weight of asphalt is used, there no problem in plastic deformation resistance and phase separation and can demonstrate same to or higher property in comparison with traditional products.

For the aggregate, coarse aggregates and fine aggregates may be used representatively. It is known that the quality and grain size of the aggregates affect performance of pavement and has different physio-chemical features according to its production site.

The coarse aggregates may mean aggregates remaining on 2.5 mm (No. 8) of sieve and fine aggregates may mean aggregates passing through 2.5 mm (No. 8) of sieve and remaining on 0.08 mm (No. 200) of sieve.

The quality and grain size of the aggregates follows KS F 2357 standard prescribing coarse and fine aggregates for bituminous pavement. The KS F 2357 standard is a Korean industrial standard for Aggregates for Bituminous Pavement Mixture which prescribes quality of the aggregates and grain size of the coarse and fine aggregates. According to the KS F 2357 standard, the coarse aggregates may be crushed aggregate, crushed slag, and crushed gravel and the fine aggregates may be crushed sand obtained during crushing rocks and gravels (screenings), natural sand, or their mixture. It is preferable for both the coarse and fine aggregates not to contain harmful substances such as dust, clay, silt, and organic matters.

The aggregates ingredients may be selected and used appropriately according to concrete use of the asphalt composition, manufacturer, production site and appearance of the aggregate.

The asphalt composition may also include filler and 1~5 parts by weight of the filler may be included on the basis of 100 parts by weight of the asphalt.

The filler may be at least one selected from the group consisting of stone flour, Portland cement, slaked lime, fly ash, retrieved dust, steelmaking dust, stiffener, and their combinations. The above stiffener, for example, may include at least one selected from the group consisting of silica powder, diatomite, wollastonite, clays, chopped glass fiber, dyes, pigments, aluminum sulfate, liquid glass, $Ca(OH)_2$, zinc oxide, naphthalene, $Mg(OH)_2$, $CaCl_2$, $Al(OH)_3$, borax, $CaSO_4.2H_2O$, $Fe_2O_3$, zeolite, carbon fiber, whisker, $Na_2SO_3$, $MgSO_4.7H_2O$, fly ash, acrylic emulsion, epoxy, latex, carbon fiber or sheet, steel fiber, liquefied minerals, fiber filling, fibrous particles, flake shaped particles and their combinations. In addition, the stiffener may be powder or liquid type depending on ingredients of its raw material.

The asphalt composition may also include an additive used in asphalt composition other than above mentioned things and for example, may include also anti-stripping agent, fiber crystalloid stiffener, freezing inhibitor, and additive for recycling if necessary.

The asphalt composition described in the above does not develop gelation and depression, can minimize breakage and cracking by increasing plastic deformation resistance and enhancing bending strength and tensile strength, and can prepare asphalt meeting requirements of PG test.

An asphalt additive according to another example of the disclosure includes modified sulfur and aggregates. The asphalt additive including inorganic matters such as the modified sulfur and the aggregates and prepared in pellet-like form not only includes the above mentioned features of asphalt composition intactly but also can improve convenience in delivery, storage, and work further.

Detailed description about the modified sulfur, the aggregates, and the other additives included in the asphalt additive is overlapped with the above mentioned description, so omitted.

The content of aggregate in the asphalt additive may be 10~70 parts by weight on the basis of 100 parts by weight of the modified sulfur, wherein it is possible to obtain an advantageous effect to improve strength by closed packed action of aggregates for the modified sulfur.

The asphalt additive may be pellet-like form and there is no limitation in size or shape or the pellet. In case that the asphalt additive is pellet-like form, preferably inorganic matters can be applied as the aggregate and the inorganic matters may be silica powder, diatomite, wollastonite, clays, and chopped glass fiber, but are not limited thereto.

A method for preparing pellet form is to shape it during the modified sulfur preparation process or by mixing the organic matter to the prepared modified sulfur and the pellet form can be made by ageing process to cool down to RT or rapid cooling manner.

In other words, the pellet form is prepared by mixing 1~50 parts by weight of the inorganic matter to 100 parts by weight of the modified sulfur, using traditional shaping methods such as extruder or press shaping method.

A method for preparing asphalt composition according to another example of the disclosure includes: mixing 100 parts by weight of sulfur, 1~300 parts by weight of dicyclopentadiene-based modifier and melting them at 120 or higher to prepare the first mixture (the first mixture preparing step); polymerizing the first mixture at 120 or higher to prepare the first reactant (the first polymerization step); terminating the polymerization of the first reactant at the end point of the reaction to prepare anticorrosive material including the modified sulfur prepared (a reaction completion step); and blending the modified sulfur and the aggregates to prepare pellets.

Detailed description about the modified sulfur and the modified sulfur composition is overlapped with the above mentioned description, so omitted.

Detailed description about the method for preparing modified sulfur is overlapped with the above mentioned description in the method for preparing modified sulfur, so omitted.

A method for preparing asphalt composition according to another example of the disclosure includes: preparing a mixture including 100 parts by weight of sulfur, 1~300 parts by weight of dicyclopentadiene-based modifier, and 0.1~200 parts by weight of initiator (a preparing step); sonicating the mixture with ultrasonic to prepare a reactant (a sonication step); and ageing the reactant at over 40 to prepare an anticorrosive material including modified sulfur prepared (an ageing step).

Detailed description about the modified sulfur and the asphalt composition is overlapped with the above mentioned description in the method for preparing modified sulfur, so omitted.

Detailed description about the method for preparing modified sulfur is overlapped with the above mentioned description in the method for preparing modified sulfur, so omitted.

In the above mention 2 different types of method for preparing asphalt composition, it is possible to prepare the above mentioned asphalt additive, when preparing the modified sulfur and the aggregate in form of pellet excluding the asphalt.

A method for preparing asphalt according to another example of the disclosure includes a process to prepare asphalt composition by mixing the asphalt additive and the asphalt.

A method for preparing asphalt according to another example of the disclosure includes a process to build asphalt by depositing the asphalt composition prepared by using the method for preparing asphalt composition.

| Explanation of Symbol | |
|---|---|
| 100: Equipment for preparing modified sulfur | 20: Reaction part |
| 40: Ageing part | 60: Flux controlling part |
| 21: Material inlet | 23: Reactant outlet |
| 25: The first housing | 27: Ultrasonic generator |
| 41: Reactant inlet | 43: Modified sulfur outlet |
| 45: The second housing | 47: Ageing container |
| 49: Temperature maintenance device | 54: Low viscosity outlet |
| 55: Medium viscosity outlet | 56: High viscosity outlet |
| 74: Low viscosity modified sulfur storing part | |
| 75: Medium viscosity modified sulfur storing part | |
| 76: High viscosity modified sulfur storing part | |

Effects

The above described modified sulfur has far superior adhesiveness and elastic modulus, includes micro-structures such as fiber, film, and network structure in the prepared modified sulfur, or has spinnability, which can provide modified sulfur with excellent waterproof, anti-corrosiveness, strength, adhesiveness, and elastic modulus. In addition, its preparation method is provided and preparation method and preparing equipment applicable in continuous manner is provided also.

In addition, the above mentioned anticorrosive or waterproofing material can be applied without heating process just before application and has excellent properties in hardening, salt spray resistance and weldability as well as good workability. Furthermore, it is possible to form anticorrosive or waterproofing coating film displaying very strong adhesiveness to target structure, so the anticorrosive or waterproofing coating film can be maintained in spite of structure deformation and their drying can be accomplished in rapid time from several seconds to several minutes.

Additionally, the asphalt prepared by using the above mentioned asphalt composition has enough goo properties of matter to meet requirement of PG test, minimizes gelation and depression which were developed in mixing traditional modified sulfur and large amount of asphalt, can provide asphalt with improved RT work stability, bending strength, and tensile strength. In addition, it is possible also to minimize breakage and cracking of pavement by increasing plastic deformation resistance due to large amount of the modified sulfur included in the asphalt.

EXAMPLES

The foregoing embodiments and advantages are merely exemplary and are not to be construed as limiting the present disclosure. The present teachings can be readily applied to other types of apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

Preparation Example of Modified Sulfur

1) Preparation Example 1

Preparation of Modified Sulfur Not Using an Initiator

After melting 100 g of industrial sulfur in a 500 ml 3-neck glass flask at 140, add 10 g of dicyclopentadiene and stir them. Modified sulfur of the preparation example 1 was prepared by terminating the reaction at the time when spinnability occurred by spinnability test using a glass stick after polymerization for 4 hr maintaining the temperature.

The reaction terminating time point is the time when spinnability occurs, which is based on the time when a part of reactant is attached to the glass stick and elongated more than 1 cm like thread in a process putting the glass stick into the reactant and removing it from the reactant and at this time, the modified sulfur has at least 10,000 cP of viscosity.

2) Preparation Example 2-1

Preparation of Modified Sulfur Using an Initiator

After melting 100 g of industrial sulfur in a 500 ml 3-neck glass flask at 140, add 10 g of dicyclopentadiene and stir them. Then the modified sulfur of the preparation example 2-1 was prepared by terminating the reaction at the time when spinnability occurred by spinnability test using a glass stick after polymerization for 1~6 hr by adding 5 g of dibutyl-phthalate additionally.

3) Preparation Example 2-2

Preparation of Modified Sulfur Using an Initiator

Excluding using NN-dimethylaniline instead of dibutyl-phthalate, the modified sulfur of the preparation example 2-2 was prepared with same method to the preparation example 2-1.

4) Preparation Example 2-3

Preparation of Modified Sulfur Using an Initiator

Excluding using trans-cinnamaldehyde instead of dibutyl-phthalate, the modified sulfur of the preparation example 2-3 was prepared with same method to the preparation example 2-1.

5) Preparation Example 2-4

Preparation of Modified Sulfur Using an Initiator

Excluding using diiodomethane instead of dibutyl-phthalate, the modified sulfur of the preparation example 2-4 was prepared with same method to the preparation example 2-1.

6) Preparation Example 2-5

Preparation of Modified Sulfur Using an Initiator

Excluding using 5 g of methacrylamide instead of dibutyl-phthalate, the modified sulfur of the preparation example 2-5 was prepared with same method to the preparation example 2-1.

7) Preparation Example 3-1

Preparation of Modified Sulfur Using 2 Initiators

After melting 100 g of industrial sulfur in a 500 ml 3-neck glass flask at 140, add 5 g of dicyclopentadiene and stir them. Then the modified sulfur of the preparation example 3-1 was prepared by terminating the reaction at the time when spinnability occurred after polymerization for 1~6 hr by adding 5 g of trans cinnamaldehyde and 3 g of dimethylaniline additionally.

8) Preparation Example 3-2

Preparation of Modified Sulfur Using 3 Initiators

After melting 100 g of industrial sulfur in a 500 ml 3-neck glass flask at 140, add 5 g of dicyclopentadiene and stir them. Then the modified sulfur of the preparation example 3-2 was prepared by terminating the reaction at the time when spinnability occurred after polymerization for 1~6 hr by adding 5 g of trans cinnamaldehyde, 3 g of dimethylaniline, and 5 g of SBS(Styrene butadiene styrene block copolymer) additionally.

9) Preparation Example 4

Preparation of Modified Sulfur Using Modified Sulfur as an Initiator

After melting 100 g of industrial sulfur in a 500 ml 3-neck glass flask at 140, add 10 g of dicyclopentadiene and stir them. Then the modified sulfur of the preparation example 4 was prepared by terminating the reaction at the time when spinnability occurred after polymerization for 1~6 hr by adding 5 g of the modified sulfur prepared in advance (prepared with 100 g of sulfur and 125 g of dicyclopentadiene-based modifier) additionally.

10) Preparation Example 5

Preparation of Modified Sulfur Using Ageing Process

After melting 100 g of industrial sulfur in a 500 ml 3-neck glass flask at 140, add 20 g of dicyclopentadiene and stir them. Then, after preparing precursor in the mixture through polymerization for about 60 min by adding 5 g of dimethylaniline and 80 g of morpholine, the modified sulfur of the preparation example 5 was prepared by terminating the reaction at the time when reaching each polymerization degree of modified sulfur for each use by reacting (ageing) the precursor without stirring at 40.

11) Preparation Example 6

Preparation of Modified Sulfur Using Ageing Process

After melting 100 g of industrial sulfur in a 500 ml 3-neck glass flask at 140, add 20 g of dicyclopentadiene and stir them. Then, after preparing precursor in the mixture through polymerization for about 30 min by adding 40 g of modified sulfur prepared in advance (prepared by 100 g of sulfur and 125 g of dicyclopentadiene), the modified sulfur of the preparation example 6 was prepared by terminating the reaction at the time when reaching each polymerization degree of modified sulfur for each use by reacting (ageing) the precursor without stirring at 80.

12) Preparation Example 7-1

Preparation of Modified Sulfur Using Sonication Method

After mixing 100 g of industrial sulfur (powder type elemental sulfur) with 100 g of liquid type dicyclopentadiene and 1 g of liquid type NN-dimethylaniline in a 500 ml 3-neck glass flask at 140, react them using a sonicator at RT without heating. Temperature of the reactant rises to 80~90 by heat generated by the sonic high pressure energy and the reaction was performed for 2~7 hr. Then, after preparing precursor in the modified sulfur reactant, the modified sulfur of the preparation example 7-1 was prepared by terminating the reaction at the time when reaching each polymerization degree of modified sulfur for each use by reacting (ageing) the precursor without stirring at 60~120 of ageing temperature.

In the above mentioned process, Ultrasonicator of Sonics Inc. (Model VCX 750 W) was used as the sonicator and the ultrasonic was generated in a manner to generate pulse for 3 sec and stop the pulse for 1 sec repeatedly.

In addition, the ultrasonic was irradiated without use of water in generation of the modified sulfur.

13) Preparation Example 7-2

Preparation of Modified Sulfur Using Sonication Method

After melting 100 g of industrial sulfur in a 500 ml 3-neck glass flask at 140, add 10 g of dicyclopentadiene and 5 g of diiodomethane and react them using a sonicator. Then, modified sulfur of preparation example 7-2 was generated through same process to that of the above preparation example 7-1.

Experimental Example 1

Property Measurement of Modified Sulfur

1) Microstructure Analysis of Modified Sulfur Using SEM Image

Microstructure images of preparation example 2-5, 3-1, and 3-2 of modified sulfur were shown in FIG. 1~FIG. 3 and microstructure images of elemental sulfur as comparative example 1 for working example 1 and US type modified sulfur (modified sulfur prepared with 100 parts by weight of sulfur and 5 parts by weight of dicyclopentadiene-based modifier according to U.S. Pat. No. 4,311,826 (hereinafter, used with an abbreviated name, US modified sulfur) as comparative example 2 were shown in FIG. 4 and FIG. 5.

As shown in FIG. 1~FIG. 5, it was identified that there were network-like structure commonly in the modified sulfur prepared by the method of disclosure, while it was not shown in the modified sulfur of comparative example 2 and the elemental sulfur.

As described in the above, it is considered that the ageing which is a characteristic of the disclosure reduces brittleness, increases elasticity and adhesiveness, and finally results in improvement of the own strength of the material, increasing polymerization degree of the modified sulfur gradually.

Therefore, it is expected that the modified sulfur prepared by the method of the disclosure demonstrate superior properties in comparison with traditional method, when mixing same materials such as straight asphalt and silica powder filler used additionally to produce final products by uses.

Experimental Example 2

Observation of Time and Features of Precursor Formation

In order to prepare modified sulfur using the ageing, it is preferable to form precursor in the first reactant or the reactant prior to application of ageing. To identify proper formation time and features of the precursor, below experiment were performed.

Sample 2 was prepared by mixing the sample 1 of the experimental example 2 which is elemental sulfur, 20 parts by weight of dicyclopentadiene-based modifier, and 100 parts by weight of sulfur and reacting them at 140 for 10 min and sample 3 was prepared by same method to that of the sample 2, but reacting the mixture for 30 min, instead of 10 min.

Figure 6:
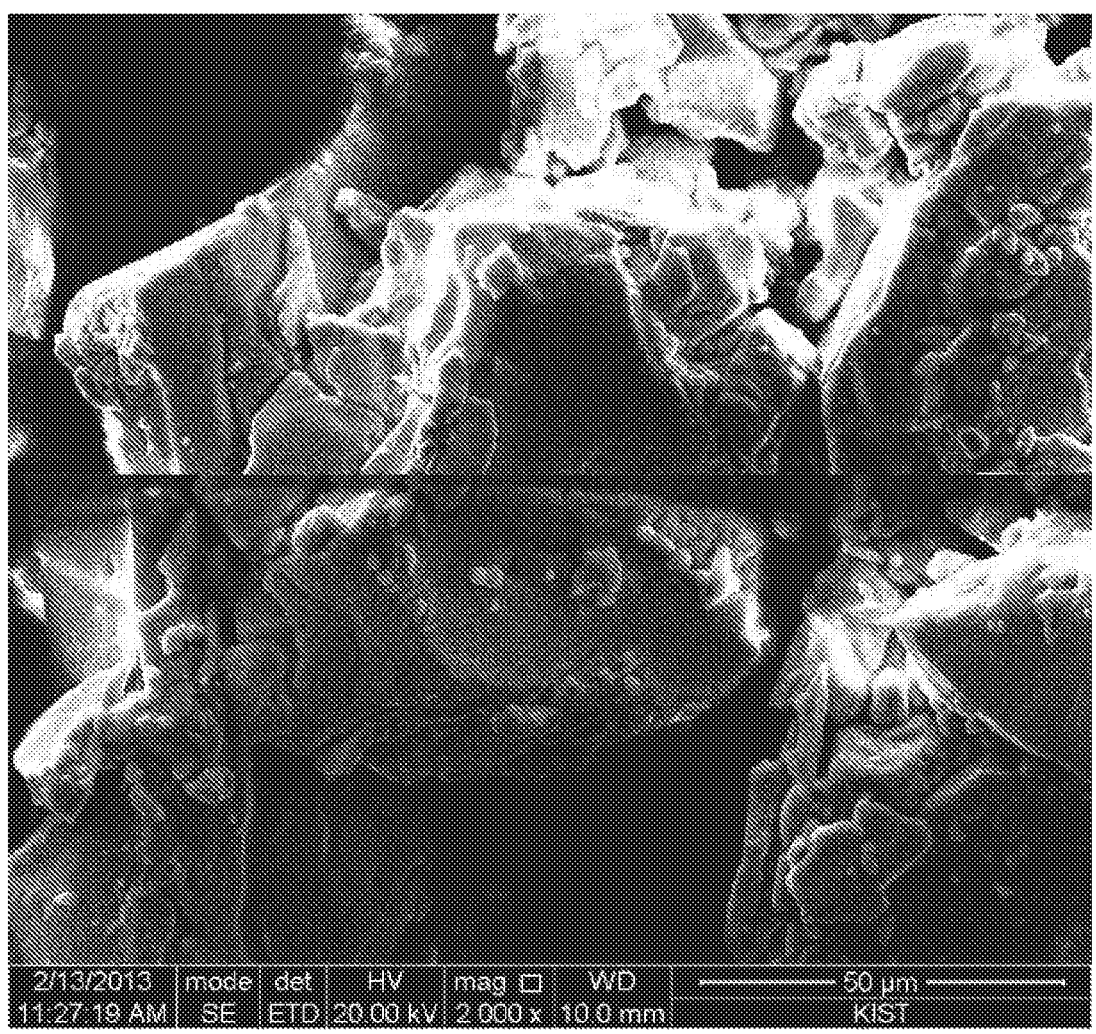
FIG. 6 is a SEM image of sample 2 in experimental example 2.
Figure 7:
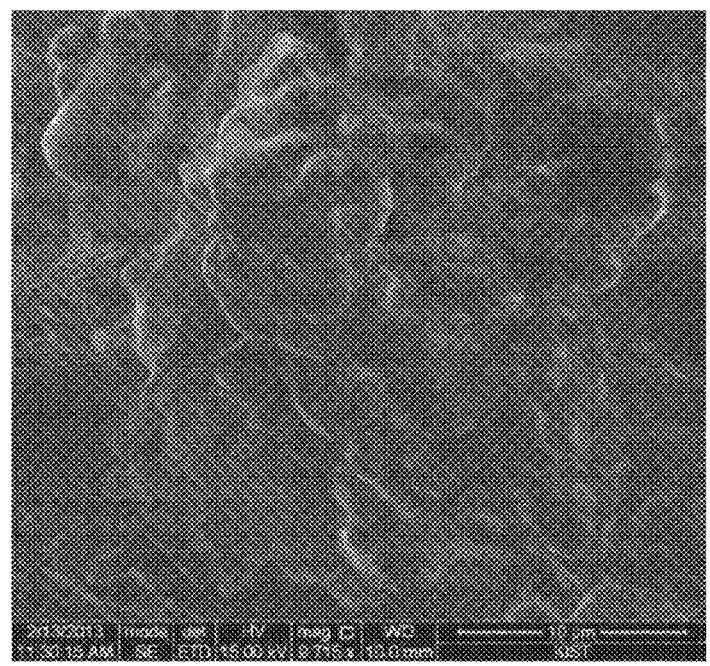
FIG. 7 is a SEM image of sample 3 in experimental example 2.
Figure 8:
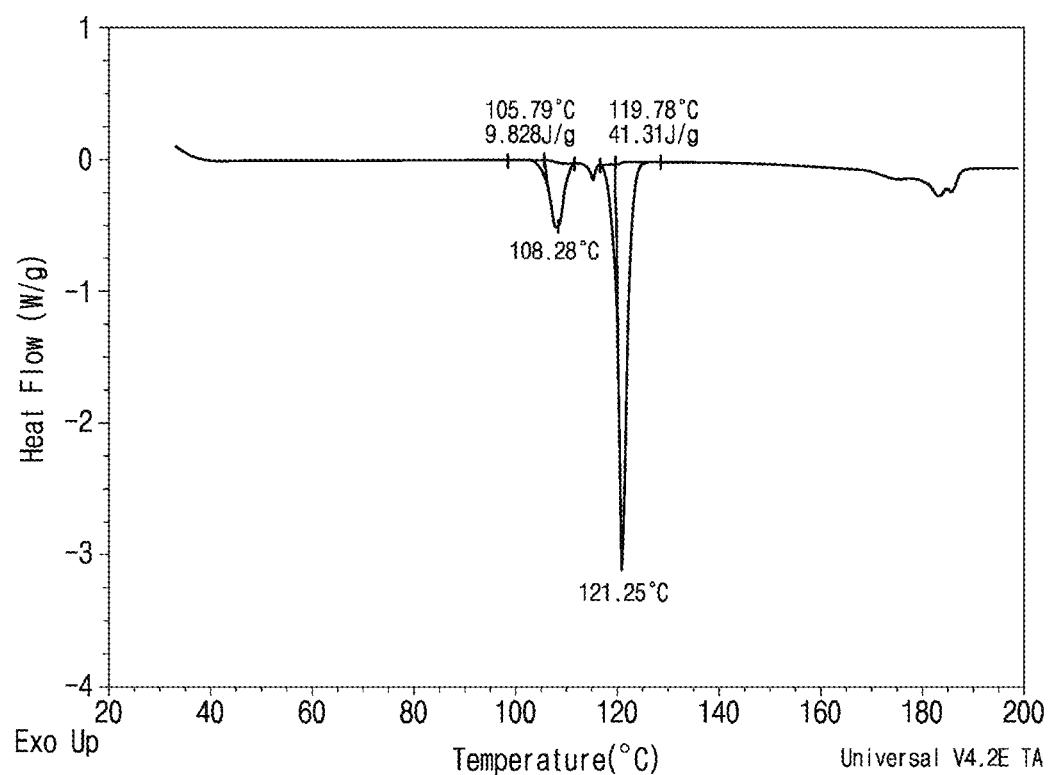
FIG. 8 is a graph showing results of differential scanning calorimetry (DSC) of sample 1 in experimental example 2.
Figure 9:
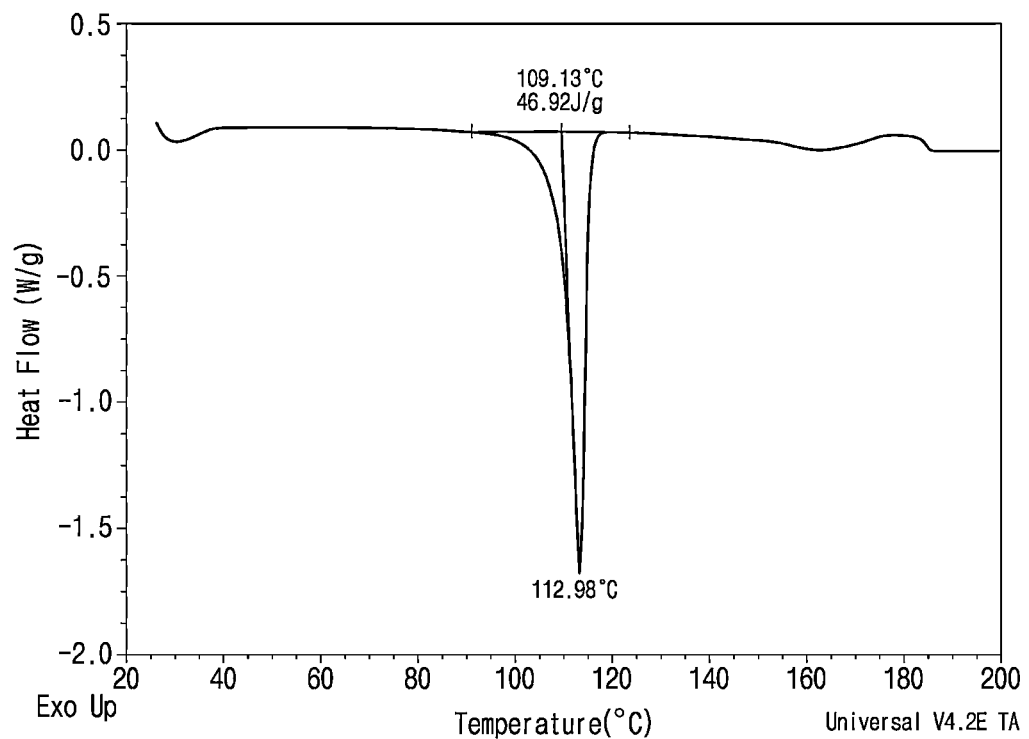
FIG. 9 is a graph showing DSC results of sample 2 in experimental example 2.
Figure 10:
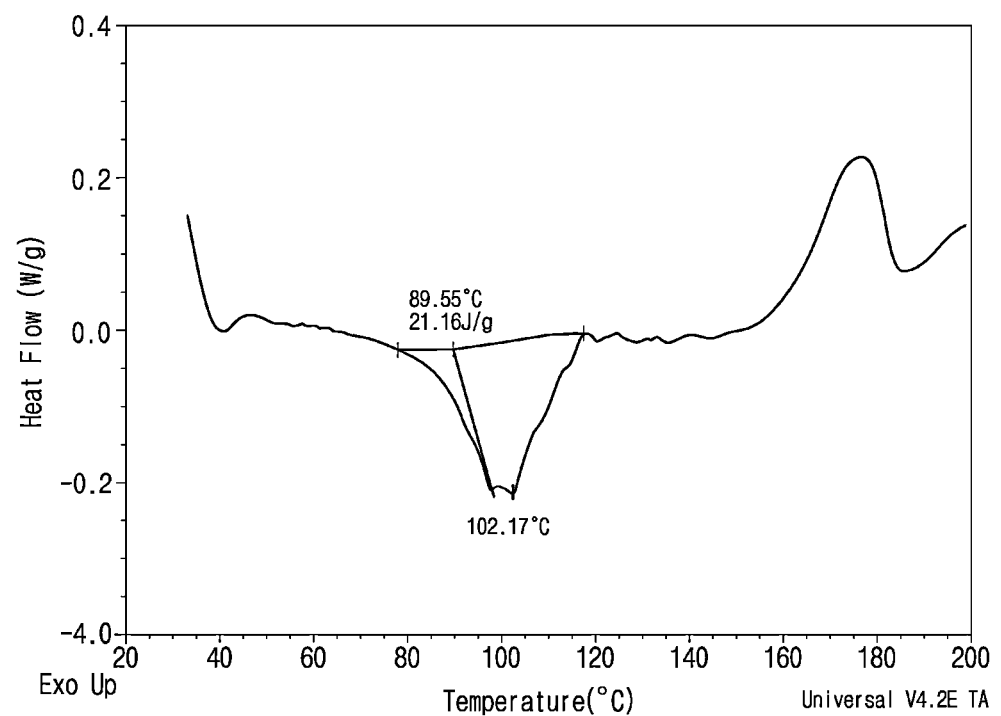
FIG. 10 is a graph showing DSC results of sample 3 in experimental example 2.

SEM images of the sample 2 and the sample 3 were shown in FIG. 6 and FIG. 7 and DSC measurement results of each sample were shown in FIG. 8~FIG. 10. SEM image of the sample 1 was shown in FIG. 4.

Figure 4:
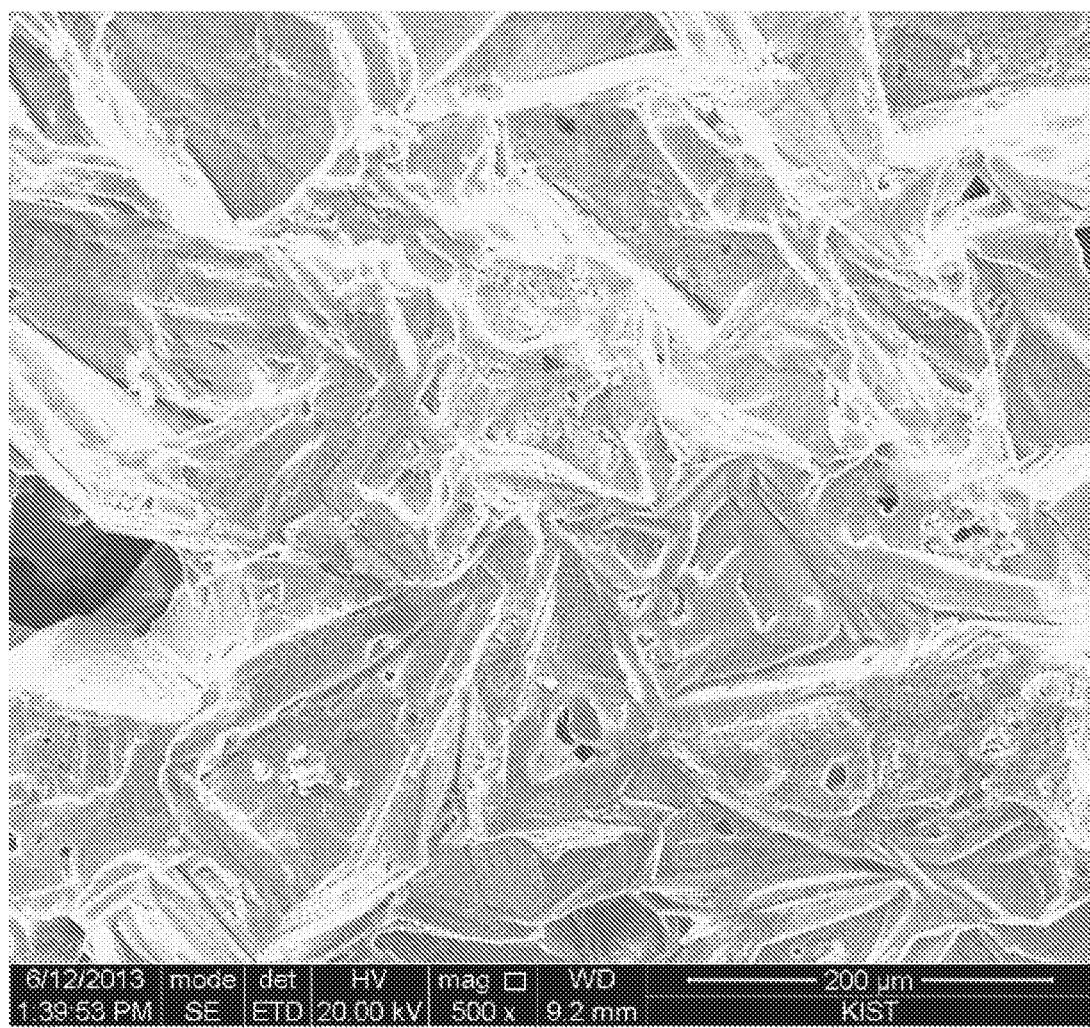
FIG. 4 is a SEM image showing microstructure of the elemental sulfur in comparative example 1 of experimental example 1.

As shown in the FIG. 4, FIG. 6 and FIG. 7, it was found that there were some differences in precursor formation time of modified sulfur depending on content of dicyclopentadiene used in preparation of the modified sulfur. However, as results of observing SEM image in case of using 20 parts by weight of dicyclopentadiene, it was found that only sulfur crystal grains with few or no soft crystal form were observed after 10 min of polymerization, but a lot of rubber-like soft crystal form, a characteristic of modified sulfur, were observed after 30 min of polymerization. In addition referring to FIG. 8~FIG. 10 showing DSC results, it was found that although there was few or no characteristics such as endothermic and exothermic reaction which would appear in formation of the precursor after 10 min of polymerization, there was apparent endothermic and exothermic zone after 30 min of polymerization. It was considered that due to chemical changes from the polymerization, different properties of matter were shown. Accordingly, —based on the consistent analysis results in the above SEM image results and the DSC results, it was identified that even if proceeding ageing process at specific time point, it was possible to prepare precursor able to continue the reaction and in the preparation example 1, the experiment was conducted setting the precursor formation time to 30 min.

Experimental Example 3

Bending Strength Results of Modified Sulfur Binder Applying Ageing Method

In order to analyze property improving effects for the method using ageing, which is one of characteristics of the disclosure, a bending strength test piece specimen was prepared by using modified sulfur prepared by sulfur and dicyclopentadiene in traditional composition ratio to measure bending strength in same condition.

In the experimental example 3, the modified sulfur used as sample 1 is modified sulfur with only polymerization and sample 2 is a result of adding ageing method to the above sample 1. The sample 2 was prepared by transferring the modified sulfur of sample 1 to an ageing container at and ageing it in condition of only maintaining the temperature for 2~8 hr.

Composition ratio of the samples was 4 types including 1, 5, 10, 20 parts by weight of dicyclopentadiene-based modifier on the basis of 100 parts by weight of sulfur, the polymerization temperature was same as 140 in all samples, and the polymerization was terminated just before development of spinnability in modified sulfur.

The polymerization terminating time (spinnability developing time) is the time that modified sulfur shifts to rubberization, which means maximum reaction time capable of reaction in batch type with stirring without damage of reactor. When using 1, 5, 10, and 20 parts by weight of dicyclopentadiene on the basis of 100 parts by weight of sulfur, the reaction was terminated after 7, 5, 2, and 1 hr respectively.

In termination of the reaction, viscosity of the modified sulfur was about 10,000 cP, which is a time capable of measuring bending strength with a strength meter and after this time, the measurement may be impossible due to increase of elasticity of modified sulfur.

Bending strength test piece specimen samples were prepared by natural cooling and solidifying the reaction completed modified sulfur at RT after pouring it into a rectangular bending strength mold with dimension such as 5 in width, 5 in height, and 50 mm in length and matter property results were shown in below Table 1 and FIG. 11.

TABLE 1

|  | Dicyclopentadiene Content (On the basis of 100 parts by weight of sulfur) | | | |
| --- | --- | --- | --- | --- |
|  | 1 parts by weight | 5 parts by weight | 10 parts by weight | 20 parts by weight |
| Bending strength of sample 1 (kgf) | 1.3 | 1.7 | 2.5 | 0.5 |
| Bending strength of sample 2 (kgf) | 2.2 | 5.4 | 5.7 | 10.5 |

In the experimental example 3, in order to compare unique features of the modified sulfur binder, only modified sulfur was used without mixing of fine aggregates and the bending strength measurement was performed with an universal tester (Intron, Model 4465) under condition of road: 1 KN and speed: 0.5 mm/sec.

Figure 11:
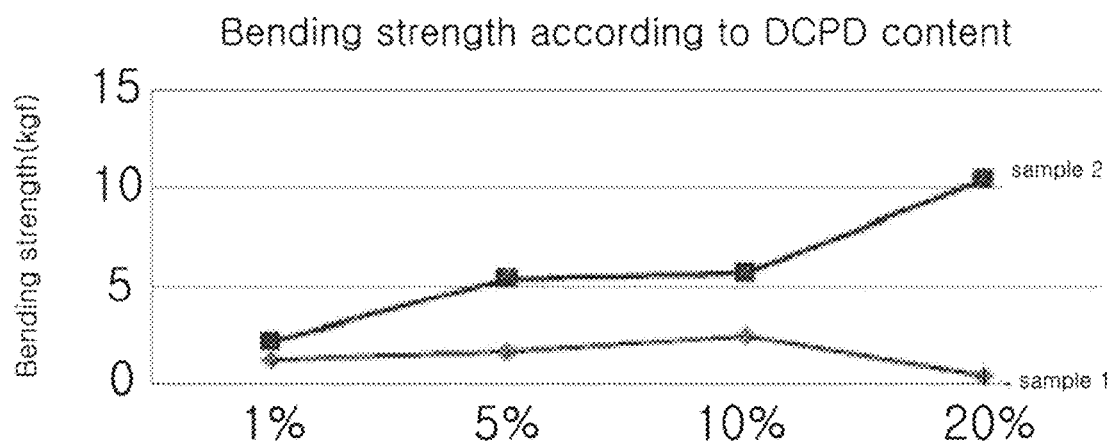
FIG. 11 is a graph showing results of bending strength measurement of samples in the experimental example 3 of the disclosure.

As shown in the FIG. 11 and Table 1, it was identified that the bending strength of modified sulfur in the sample 2 was improved remarkably compared with the sample 1 and the difference was more remarkable when the content of dicyclopentadiene increased.

As mentioned above, as the test piece specimen was prepared with only modified sulfur without filler such as fine aggregates to compare the own property of modified sulfur, the results of matter property in the working example and the comparative example were smaller than that of general modified sulfur concrete, which was only comparison between case with and without ageing, applying same preparing method and measuring method.

As described in the above, it is considered that the ageing, a characteristic of the disclosure, reduces brittleness, increases elasticity and adhesiveness, and finally results in improvement of the own strength property of the material, increasing polymerization degree of the modified sulfur gradually.

Therefore, it was identified that the modified sulfur prepared through ageing could display superior properties than the case without ageing.

Experimental Example 4

Bending Strength Results of Modified Sulfur Binder Using an Initiator

In order to analyze matter property of the modified sulfur prepared by using an initiator, bending strength results of comparative example 2 of the experimental example 1, sample 2 of the experimental example 2, and bending strength test piece specimen using modified sulfur prepared in the preparation example 2-3 were shown in below Table 2.

TABLE 2

|  | dicyclopentadiene Content (On the basis of 100 parts by weight of sulfur) | | | |
| --- | --- | --- | --- | --- |
|  | 1 parts by weight | 5 parts by weight | 10 parts by weight | 20 parts by weight |
| Example 2 of the experimental example 1 | 1.3 | 1.7 | 2.5 | 0.5 |
| Sample 2 of the experimental example 2 (applying ageing method) | 2.2 | 5.4 | 5.7 | 10.5 |
| Preparation example 2-3 (Using an initiator, applying ageing method) | — | 27 | — | — |

As shown in the results of Table 2, it was identified that the sample 2 of the experimental example 2 applying ageing method showed 2-3 time improved strength compared with the comparative example 2 of the experimental example 1 regardless of dicyclopentadiene content and the preparation example 2-3 also showed far superior results.

Preparation Example of Modified Sulfur 2

1) Preparation Example 10

Preparation of Modified Sulfur Not Using an Initiator

Add 20~500 g of dicyclopentadiene-based modifier after melting 100 g of sulfur at 140. Polymerization was performed, maintaining the temperature and modified sulfur of the preparation example 10 was prepared by terminating the reaction at the time point when spinnability occurred. The time point when spinnability occurred was tested with a glass stick.

2) Preparation Example 20

Preparation of Modified Sulfur Using an Initiator

Add 20~500 g of dicyclopentadiene-based modifier after melting 100 g of sulfur at 140. The reaction was continued by using the modified sulfur prepared in advance (prepared with 100 g 0f sulfur and 125 g of dicyclopentadiene-based modifier) as an initiator and modified sulfur of the preparation example 20 was prepared by terminating the reaction at the time point when spinnability occurred.

Experimental Example 5

Spray and Plastering Experiment for Repairing and Reinforcing of Concrete Water Tank Surface Requiring Acid/Alkali Resistance The composition for repairing and reinforcing of concrete water tank requiring acid/alkali resistance by mixing and dispersing 50 parts by weight of silica with 0.5~1.2 mm of grain size to 100 parts by weight of modified sulfur of the preparation example 2-1 heated and melted at 120 without use of solvent was sprayed to a glass plate and an iron plate which were smooth surface with few or no surface roughness concurrently.

Figure 18:
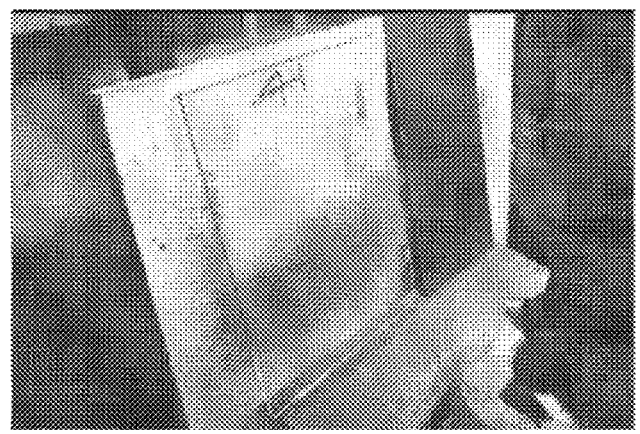
FIG. 18 is an image of glass plate to which acid- and alkali-proof modified sulfur composition for repairing and reinforcing is sprayed in experimental example 5.
Figure 19:
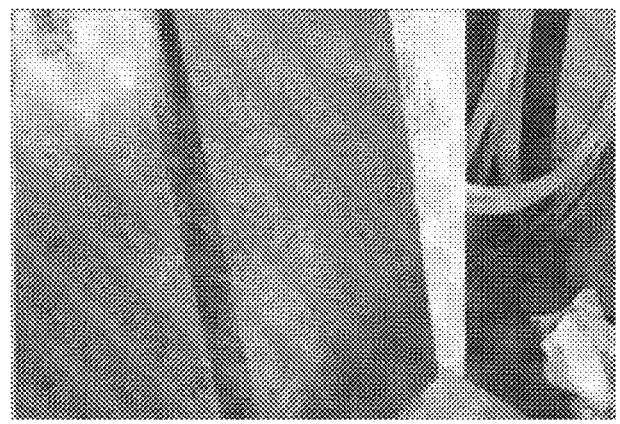
FIG. 19 is an image of iron plate to which acid- and alkali-proof modified sulfur composition for repairing and reinforcing is sprayed in experimental example 5.

The appurtenance of glass plate and iron plate sprayed by using a commercial mortar gun for cement mortar method was shown in FIG. 18 and FIG. 19.

As shown in the FIG. 18 and FIG. 19, it was identified that the modified sulfur mixture prepared by the working example of the disclosure could improve crack repairing, waterproof and anticorrosive performance of preformed concrete structure, because it was hardened to rigid state rapidly within few seconds after spraying and had excellent adhesiveness with concrete, because it was attached well to the glass and iron plate, smooth surfaces with far smaller surface roughness.

In addition, the plastering work was done as 5~20 mm of thickness using a trowel and because the plastering work should be done at RT, a composition mixing modified sulfur of the preparation example 1-11 and preparation example 6 able to be liquid phase at RT and the inorganic materials. As the result, it was identified also that it could improve crack repairing, waterproof and anticorrosive performance of preformed concrete structure, because it was hardened to rigid state.

Experimental Example 6

Spray and Plastering Experiment for Bridge Deck Waterproof Coating Material

The composition for bridge deck waterproof coating by mixing and dispersing 50 parts by weight of silica with 0.5~1.2 mm of grain size to 100 parts by weight of modified sulfur of the preparation example 2-1 heated and melted at 120 without use of solvent was plastered and hardened to concrete structure primarily. Asphalt was plastered and hardened secondarily to the solidified concrete structure.

As the bridge deck construction requires considerably thick coating, it is difficult to meet the required thick with spray method, so plastering method was used and because the composition for bridge deck waterproof coating should play a role as waterproof material between the concrete structure and the asphalt structure, the experiment was performed for concrete and asphalt.

Figure 20:
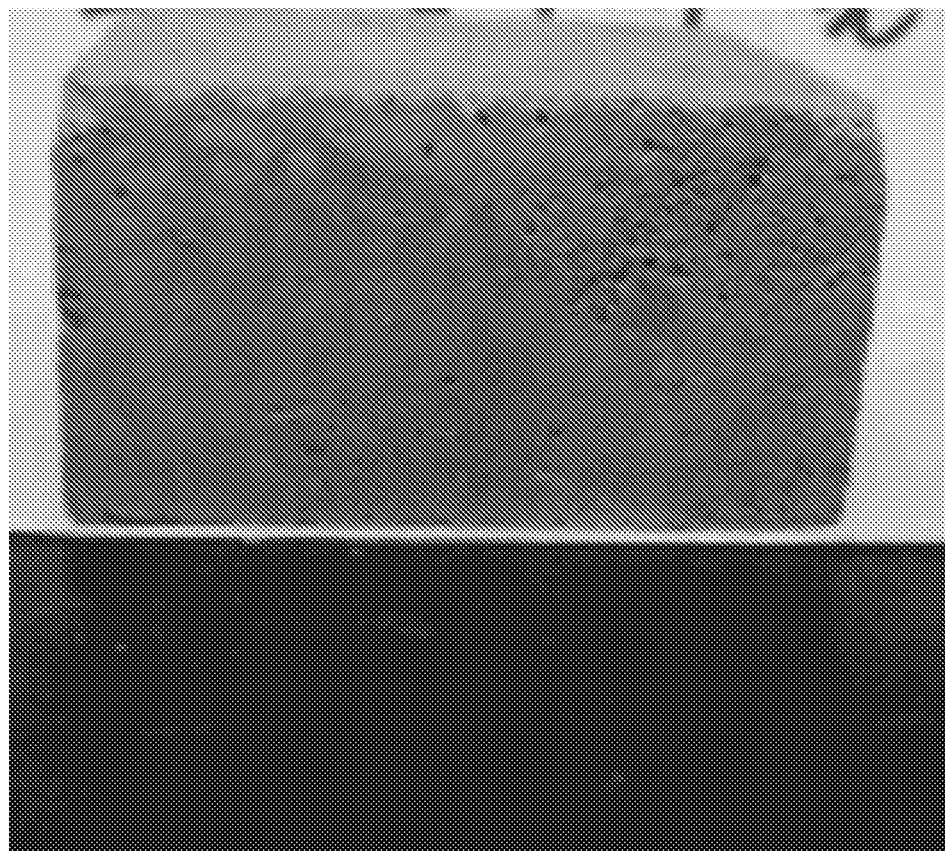
FIG. 20 is a photo showing a concrete structure prior to liquid applied membrane waterproofing with composition for bridge deck waterproofing material in experimental example 6.
Figure 21:
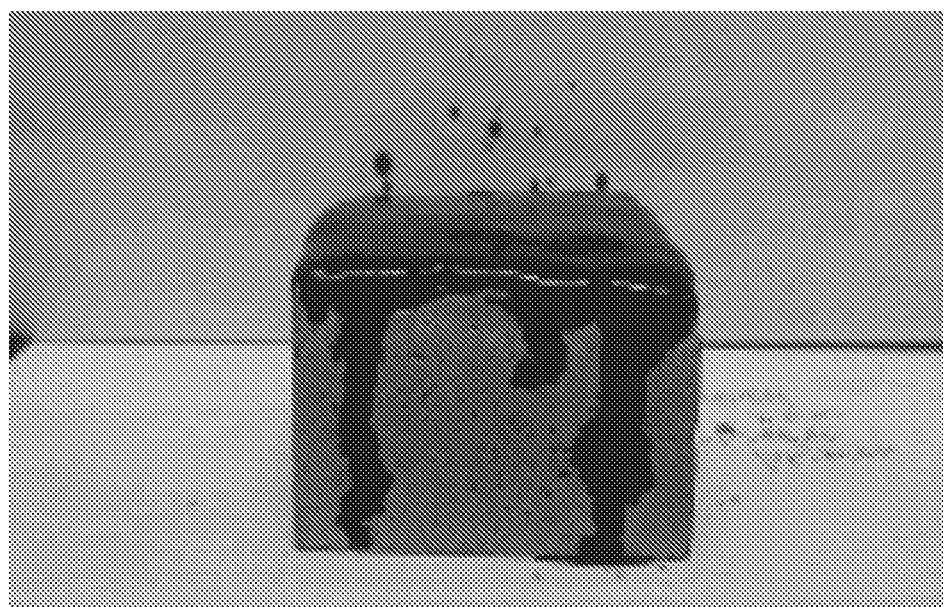
FIG. 21 is a photo showing a concrete structure prior to liquid applied membrane waterproofing with composition for bridge deck waterproofing material in experimental example 6.
Figure 22:
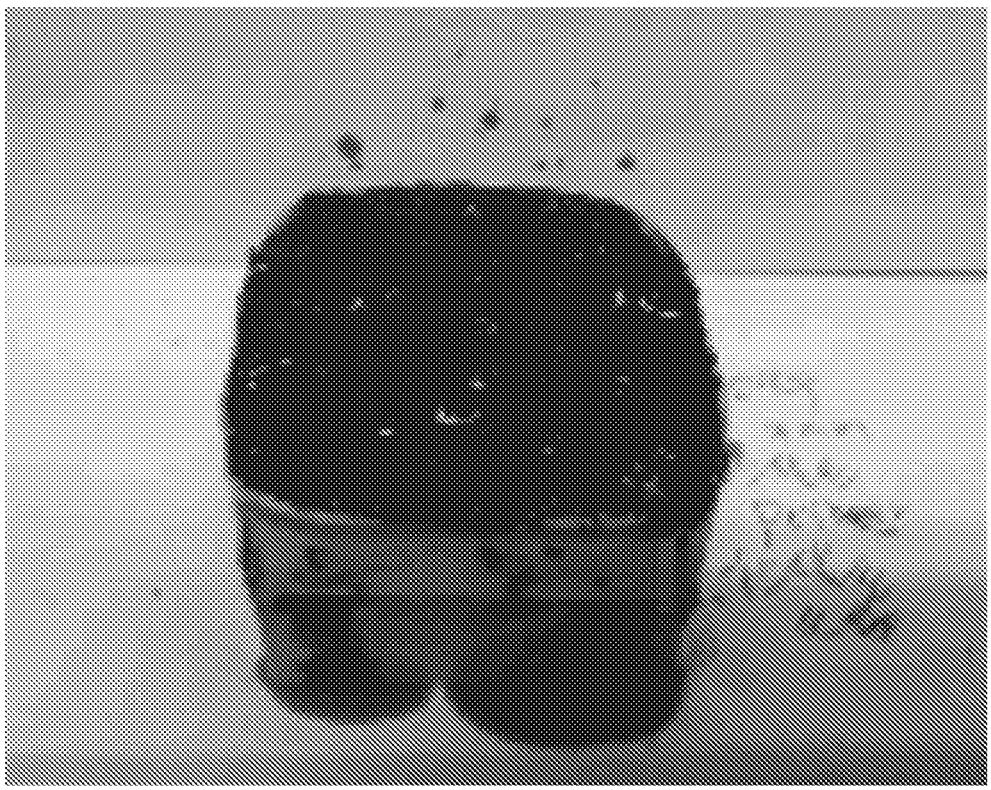
FIG. 22 is a photo showing a concrete structure paved secondarily with asphalt in experimental example 6.

Images of the concrete structure prior to waterproof coating, the structure after primary waterproof coating, and the structure after secondary asphalt pavement through plastering were shown in FIG. 20~FIG. 22.

As shown in FIG. 20~FIG. 22, it was identified that the modified sulfur mixture prepared by working examples of the disclosure was used for forming bridge deck waterproof coating by plastering work after spraying, could be applied as bridge deck waterproof coating material.

Experimental Example 7

Shotcrete Composition Spray Test

The shotcrete composition prepared by mixing and dispersing 50 parts by weight of silica with 0.5~1.2 mm of grain size and 1 parts by weight of chopped glass fiber to 100 parts by weight of modified sulfur of the preparation example 2-2 heated and melted at 120 without use of solvent was sprayed to the concrete surface.

Figure 23:
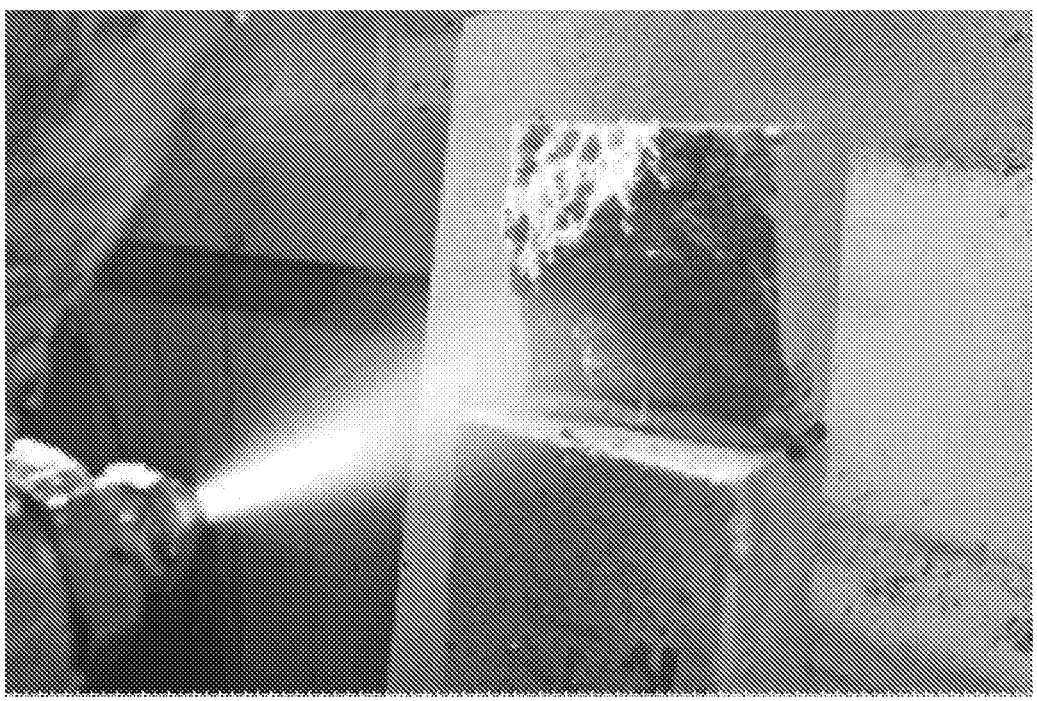
FIG. 23 is a photo showing a concrete structure when the modified sulfur composition for shotcrete starts to be sprayed in experimental example 7.
Figure 24:
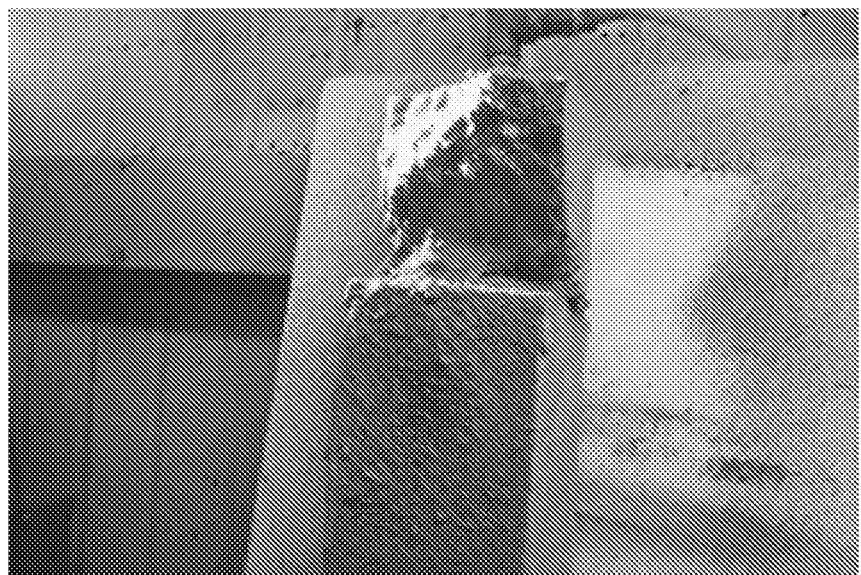
FIG. 24 is a photo showing a concrete structure after the modified sulfur composition for shotcrete is sprayed in experimental example 7.

The approaches starting or completing spraying by using a commercial mortar gun for cement mortar method were shown in FIG. 23 and FIG. 24.

As shown in the FIG. 23 and FIG. 24, it was identified that the modified sulfur mixture prepared by the working examples of the disclosure could improve crack repairing, waterproof and anticorrosive performance of preformed concrete structure, because it was hardened to rigid state rapidly within few seconds after spraying.

The above shotcrete composition has a merit to enhance workability remarkably than traditional method, as it has effects able to demonstrate rapid curing time, strong adhesive power able to reduce the rebound rate, elasticity, and high strength by differentiating viscosity and rheology features with control of reaction termination time and ageing method.

Additional Working Example

Effect of Modified Sulfur Prepared by Traditional Method but Passing Through Ageing Process In order to identify change of features such as microstructure of the polymerized modified sulfur depending on difference of reaction termination time, the comparative example prepared by traditional method and passing through ageing process in the disclosure was observed for its microstructure as the sample of additional working example.

Figure 25:
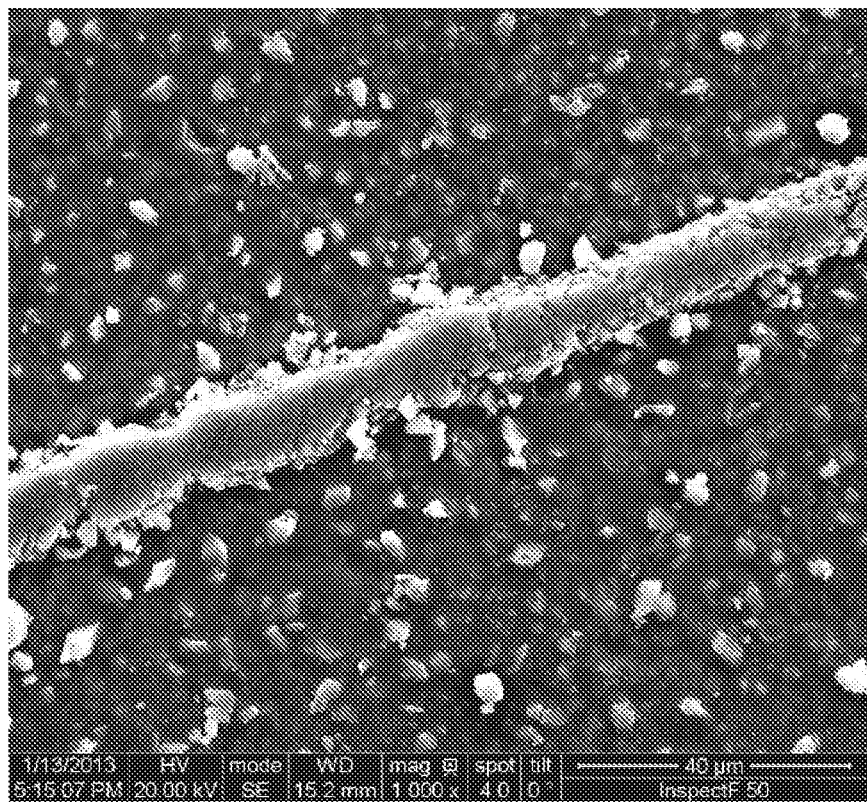
FIG. 25 is a photo showing microstructure of the modified sulfur in comparative example 2 of experimental example 1 identical to the FIG. 5.
Figure 26:
FIG. 26 is a photo showing microstructure of the modified sulfur sample in comparative example 2 of experimental example 1 after progressing ageing process additionally.
Figure 27:
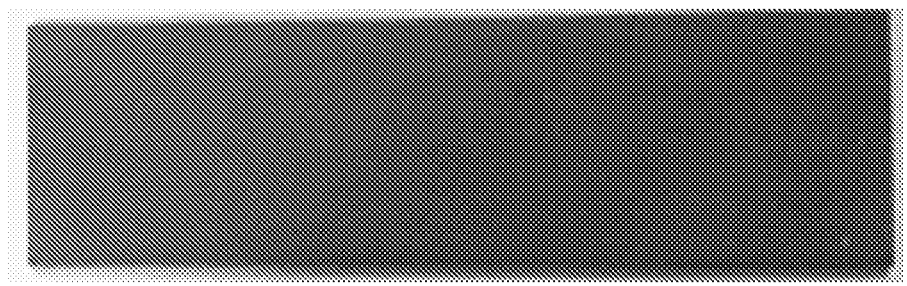
FIG. 27 and FIG. 28 are photos before and after welding in working example of welding experiment (experimental example 9).
Figure 28:
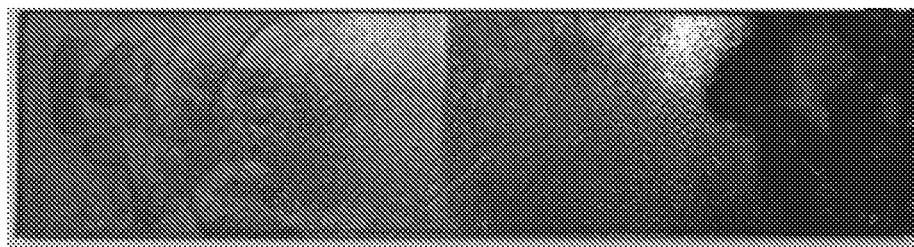
Figure 29:
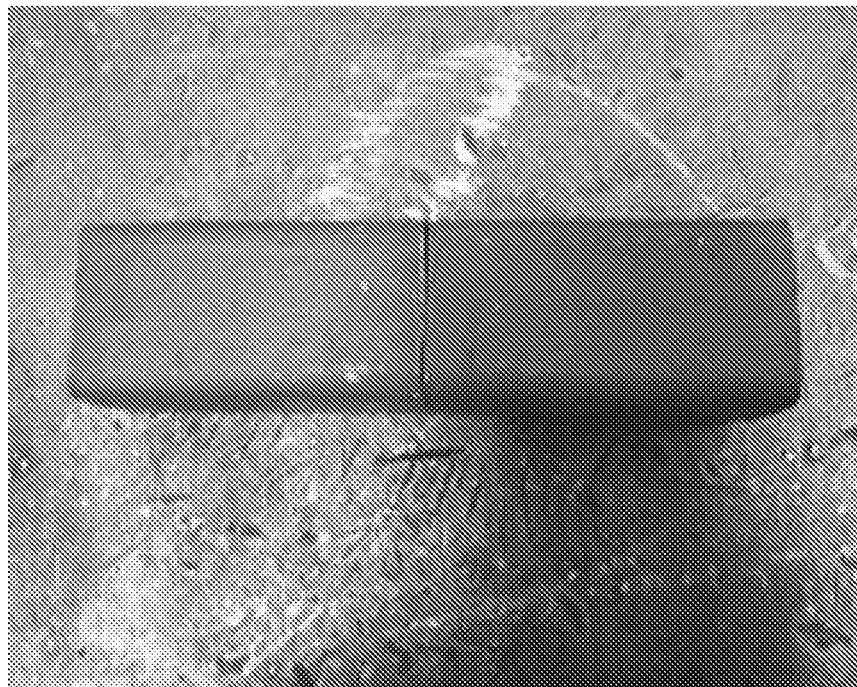
FIG. 29 and FIG. 30 are photos before and after welding in comparative example of welding experiment (experimental example 9).
Figure 30:
Figure 31:
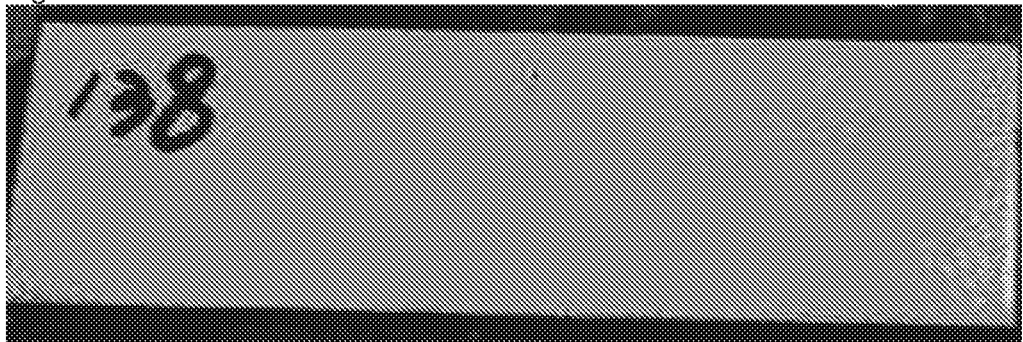
FIG. 31 and FIG. 32 are photos before and after welding in working example 1 of welding experiment (experimental example 10).
Figure 32:
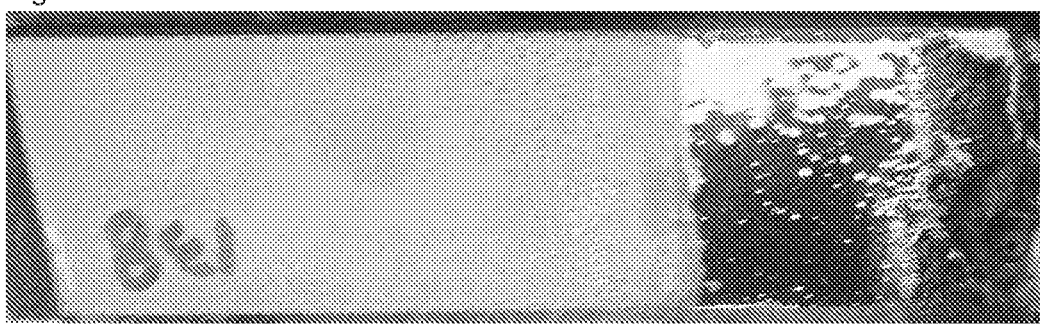
Figure 33:
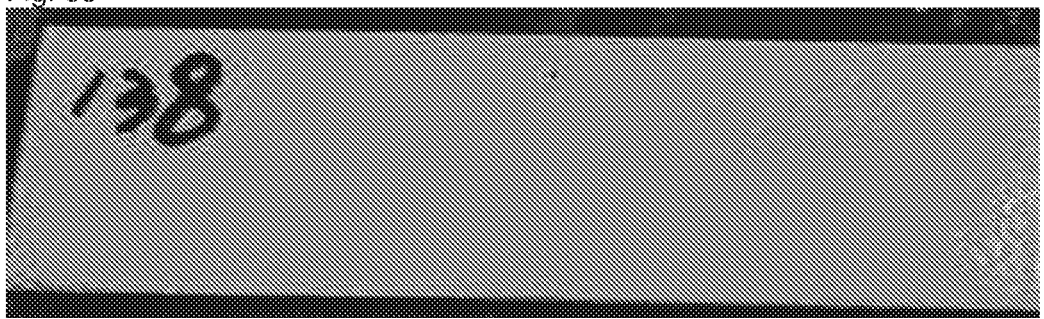
FIG. 33 and FIG. 34 are photos before and after welding in working example 2 of welding experiment (experimental example 10).
Figure 34:
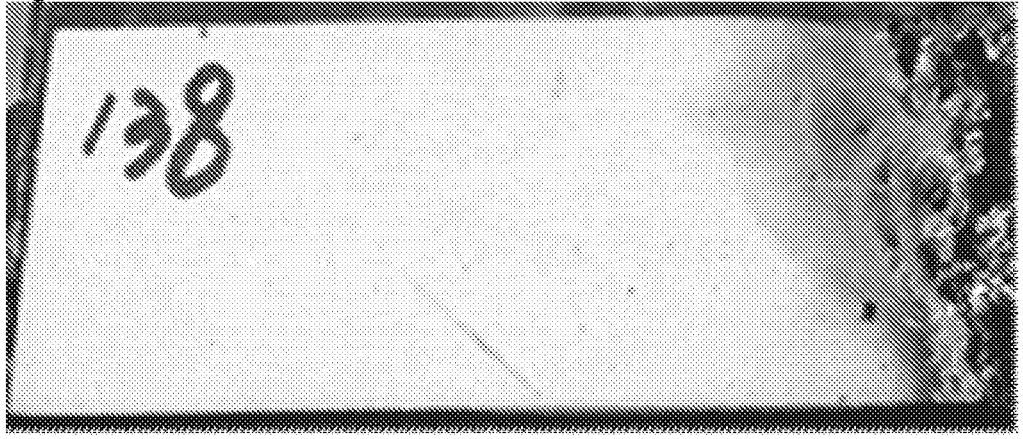
Figure 35:
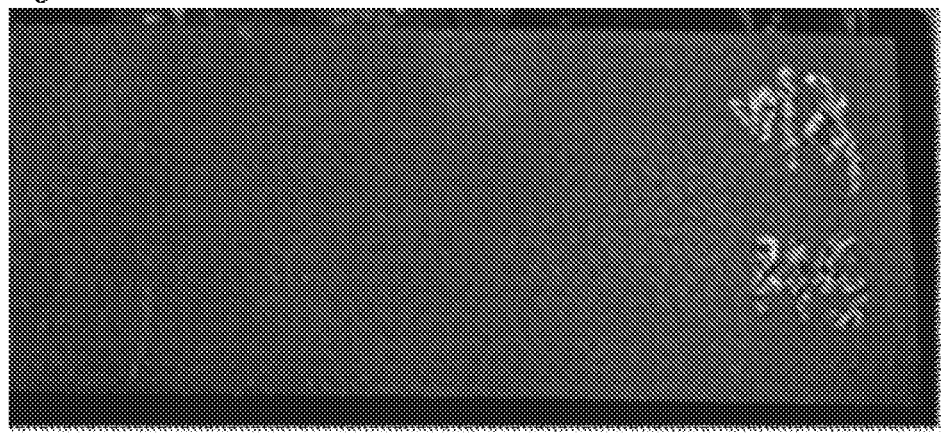
FIG. 35 and FIG. 36 are photos before and after welding in comparative example of welding experiment (experimental example 8).
Figure 36:
Figure 37:
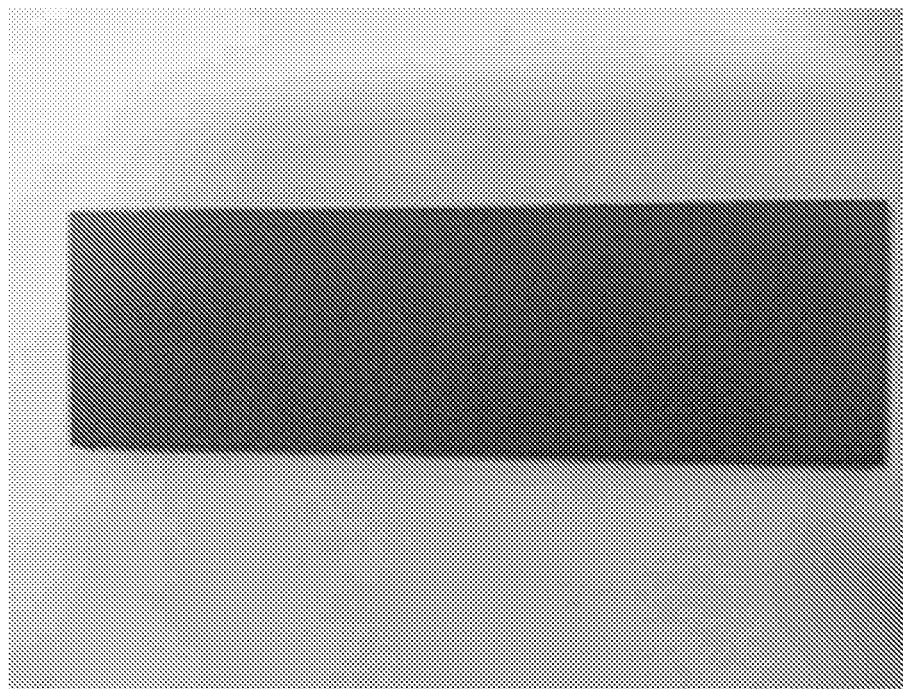
FIG. 37 is a photo before folding using working example 3 in experimental example 12.
Figure 38:
FIG. 38 is a photo after folding using working example 3 in experimental example 12.
Figure 39:
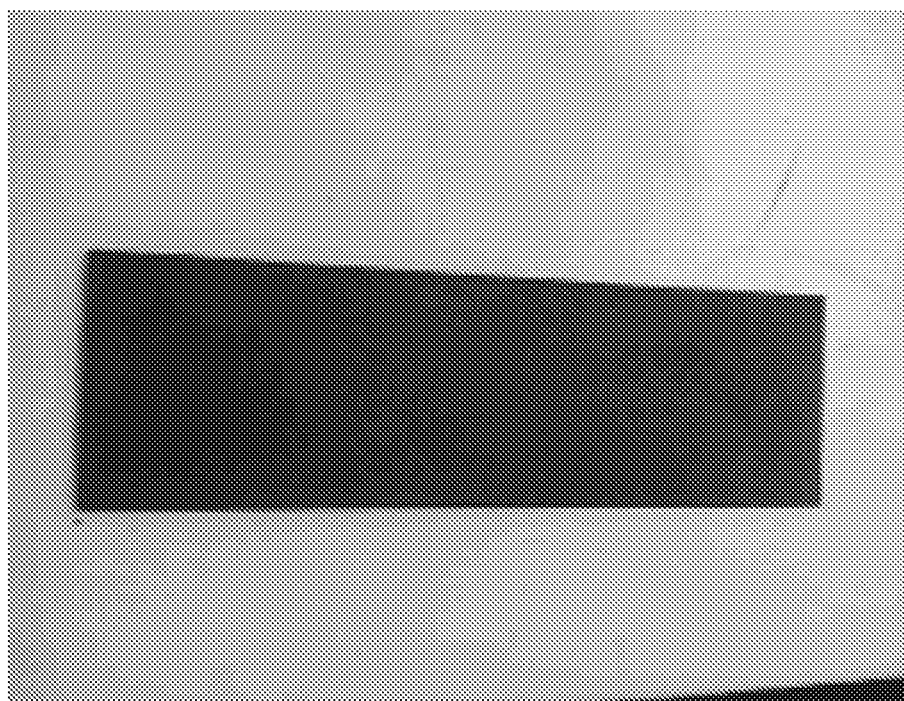
FIG. 39 is a photo before folding using comparative example 2 in experimental example 12.
Figure 40:
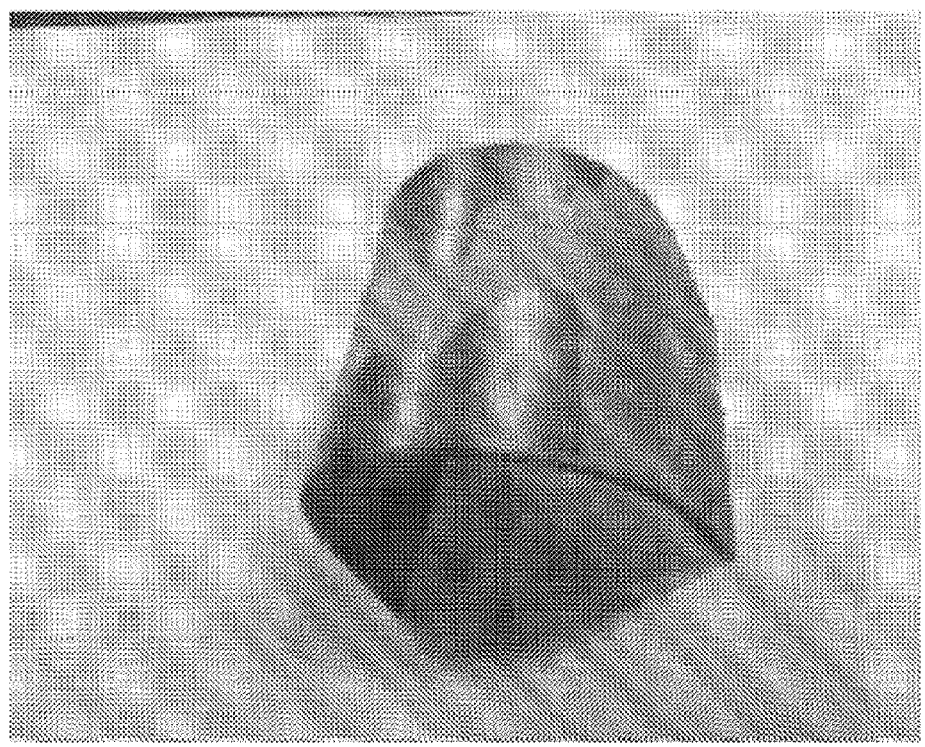
FIG. 40 is a photo after folding using comparative example 2 in experimental example 12.
Figure 41:
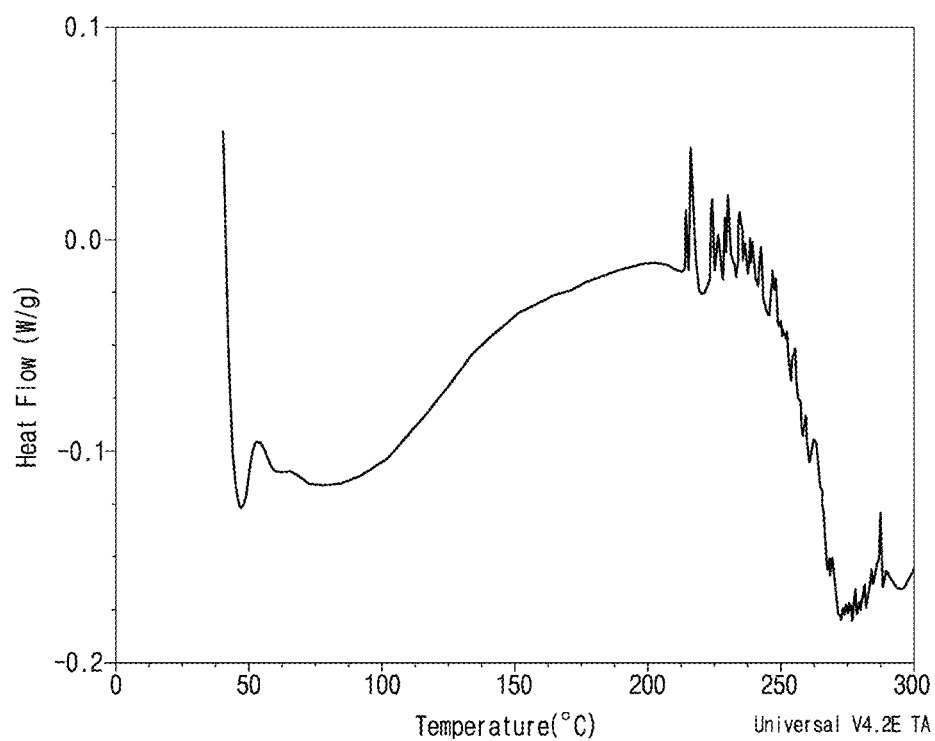
FIG. 41 is a graph showing DSC results of modified sulfur prepared by preparation example 3-1 of the disclosure.

SEM images of the sample before and after ageing were shown in FIG. 25 and FIG. 26. The ageing process was done by using the modified sulfur prepared by US method in the comparative example 2 of working example 1 and progressing the ageing further to the time when spinnability occurred after melting at 120.

Referring the images of the FIG. 25 and FIG. 26, it was observed that while the comparative example terminating polymerization prior to development of spinnability seems to have higher polymerization degree as dark brown color in termination of reaction, be clean and have few or no unreacted grains in observation with naked eyes, its 1000 time magnificated image in FIG. 25 showed that there were a lot of sulfur grains with 1~2 of size on the surface. In addition, largersized unreacted grains, about 40, were observed also.

On the contrary as shown in the image of FIG. 26 which was an SEM image on surface microstructure of the sample of additional working example after ageing, it was found that it seemed clean with few or no unreacted sulfur grains. It is considered that the reaction was progressed until development of spinnability, so the reaction between sulfur and dicyclopentadiene-based modifier was accomplished sufficiently.

Experimental Example 8

Performance Assessment of Anticorrosive Coating

1) Standard of the Performance Assessment

Property of the modified sulfur application test was measured with following methods.

Adhesion strength: With Pull-off test method using PosiTest ATA model of DeFelsko Corporation to measure stress at the moment of coating detachment from iron base material, interface bonding characteristics between iron plate and modified sulfur were assessed.

Scratch resistance: By scratching surface of the coated film as a grid shape crossing each other using a diamond pen, detachment degree of the coating film was confirmed with naked eyes and optical microscope.

As in scratching the film with a diamond pen, the film resistance at the crossover point should be stronger to prevent detachment, it is accurate to judge the scratch resistance. Thus a case that the film is not detached at the crossover point was judged as pass and a case that the film is detached as fail.

Damage of test piece specimen after folding work: After twisting the film test piece applied to 2×10 cm of iron plate with 2 pliers, adhesion state between the film and the iron plate was confirmed. In observation with naked eyes, a case that the adhesion was not separated was judged as pass and a case that the film was detached or separated partially was judged as fail.

Salt spray resistance test: According to KS D 9502, the applied test piece was completely immersed in (5±1)% NaCl solution and left at 35±2 for 3 days. Then adhesion and corrosion state of the film was confirmed. In observation with naked eyes, a case that there was no corrosion was judged as pass and the other case was judged as fail.

Hardening time: This means a time required for hardening of film after application of modified sulfur, for which a time to reach the state that in rubbing the film with finger, the film is not removed and adheres strongly is assessed.

Sprayable minimum coating film thickness: Possible minimum thickness of film in spraying under same condition (types of sprayer, spray distance, air pressure) was measured.

Comparative Example 1 and Comparative Example 2

Using a film prepared by spraying commercially obtained hydrophilic anticorrosive material (manufactured by Dongwon Chem) to the target coating surface as the comparative example 1 and the modified sulfur coating film prepared by spraying the US modified sulfur heated and melted at 120 as comparative example 2, their adhesion strength, scratch resistance, folding work, salt spray test, hardening time, and sprayable minimum coating film thickness were assessed and the results were shown in Table 3.

3) Working Example 1 and Working Example 2

Modified Sulfur Coating Film Prepared by Spraying it Without Heating

Using a film prepared by spraying modified sulfur mixture dissolving the modified sulfur of the preparation example 2-1 in carbon disulfide solvent at RT without heating as the working example 1 and a film prepared by spraying modified sulfur mixture dissolving the modified sulfur of the preparation example 3-1 in carbon disulfide solvent at RT without heating as the working example 2, there properties of matter were measured and shown in below Table 3, same to the above comparative example 1 and 2.

4) Working Example 3 and Working Example 4

Modified Sulfur Coating Film Prepared by Spraying it After Heating

Using a modified sulfur coating film prepared by spraying the modified sulfur of the preparation example 2-2 heated and melted without solvent at 120 as comparative example 3 and a modified sulfur coating film prepared by spraying the modified sulfur of the preparation example 3-1 heated and melted without solvent at 120 as comparative example 4, their properties were assessed and the results were shown in Table 3.

5) Property Measurement Results

TABLE 3

| | Adhesion strength (MPa) | Scratch resistance | Folding work | Salt resistance test (KS D 9502) | Hardening time | Sprayable minimum coating film thickness |
|---|---|---|---|---|---|---|
| Comparative example 1 Spraying hydrophilic anticorrosive material without heating | 1.14 | Pass | Pass | Pass | >1 day | ≤about 3 mm |
| Comparative example 2 Spraying US type after heating | 0.53 | Fail | Fail | Pass | Within several min | ≤about 3 mm |

TABLE 3-continued

| | Adhesion strength (MPa) | Scratch resistance | Folding work | Salt resistance test (KS D 9502) | Hardening time | Sprayable minimum coating film thickness |
|---|---|---|---|---|---|---|
| Example 1 Spraying without heating | 1.07 | Pass | Pass | Pass | Within several seconds | ≤about 0.1 mm |
| Example 2 Spraying without heating | 1.17 | Pass | Pass | Pass | Within several seconds | ≤about 0.1 mm |
| Example 3 Spraying after heating | 1.5 | Pass | Pass | Pass | Within several min | ≤about 3 mm |
| Example 4 Spraying after heating | 1.38 | Pass | Pass | Pass | Within several min | ≤about 3 mm |

The hydrophilic anticorrosive product commercially obtained to apply as comparative example 1 is an existing product widely used in steel industry and has some vivificated effects in all the items excluding slower hardening time, so-based on results of the comparative example 1, scratch resistance and folding work of the coating film of other comparative examples and working examples were tested.

In case of steel products applied with the anticorrosive material, they must needs reprocessing works including cutting, folding, bending, bolting and welding, so they must pass the above property tests durable to impacts during the reprocessing process.

6) Adhesion Strength, Scratch Resistance, Folding Work and Salt Resistance Test In the adhesion strength results, it was identified that the example 3 and the example 4 showed improved adhesion strength than hydrophilic anticorrosive material, the example 1 and 2 prepared without heating showed same or lower adhesion strength and the comparative example 2 of the US method had the weakest adhesion strength.

In the results of scratch resistance and damage of test piece after folding work, it was identified that only the comparative example 2 failed the test and results of other comparative examples and working examples passed the property test.

In the results of salt spray resistance test, all test piece passed the test, but only elemental sulfur failed the salt test. It is because in moist condition, sulfur and iron react and develops rust but the modified sulfur has fundamentally strong anti-chemical property.

7) Hardening Time and Sprayable Minimum Coating Film Thickness Assessment

In the hardening time test results, it was found that the hydrophilic anticorrosive material was cured very slowly at RT even after 1 day; the comparative example 2, the example 3 and the example 4 sprayed after heating were cured within about 5 min; and the example 1 and example 2 sprayed at RT were cured rapidly within about 10 sec.

This is considered because easily evaporable solvent is not only sprayed but also diffused and evaporated in forwarding direction by air pressure.

In addition, it was identified that very thin coating film thickness could be formed by spray according to types and amount of solvent and it was considered that this was another important feature able to reduce the film hardening time.

In this industry, as sprayed steel products are produced continuously, moving fast on the conveyor belt and when slower hardening time may be led to lowering of productivity, the hardening time is an important factor.

Although a method to evaporate water in hydrophilic anticorrosive material to be sprayed by installing dry line on the conveyor line to reduce the hardening time, in spite of so much electric energy cost, current drying time is about 10 min, so it is an important task to reduce the hardening time.

Moreover, the welding thickness has close relationship with hardening time and production cost, so thinner is better if possible. However, the sprayable minimum film thickness of hydrophilic anticorrosive material is relatively thick as about 3 mm. However, it was identified that all the examples sprayed without heating could form remarkably thin coating film.

As results of analyzing all of the above factors comprehensively, it was assessed that the performance of modified sulfur anticorrosive material of the disclosure satisfied all property of matte equally or higher.

Welding Test (Experimental Example 9)

Welding Test Results of Modified Sulfur Coating Sprayed Without Heating

Using images before and after welding the modified sulfur coating film prepared by spraying modified sulfur mixture dissolving 100 parts by weight of the modified sulfur of example 5 of the experimental example 5 in carbon disulfide solvent at RT without heating as the working example 1 and images before and after welding hydrophilic coating film of comparative example 1 of the experimental example 5 were shown in FIG. 16~FIG. 19.

As shown in the FIG. 16~FIG. 19, it was found that although there were remarkable damages on its surrounding film as well as welding site in the comparative example, there was no noticeable damage in the working example.

Welding Test (Experimental Example 10)

Welding Test Results of Modified Sulfur Coating Sprayed After Heating

Coating film formed by heating and melting the modified sulfur of example 3 of the experimental example 5 was used as example 1 of the experimental example 8 and coating film formed by heating and melting the modified sulfur of example 3 of the experimental example 5 at 120 after mixing 10 parts by weight of aluminum sulfate as mineral powder was used as example 2 of the experimental example 8. The coating film of comparative example 2 of the experimental example 5 was used as the comparative example of the experimental example 8 to test it with same method. Images before and after welding of the above example 1, 2 and the comparative example were shown in FIG. 20~FIG. 25.

As shown in the FIG. 20~FIG. 25, it was found that damage area was wider in order of comparative example, example 1 and example 2 and the example showed more excellent properties.

Experimental Example 11

Performance Assessment of Waterproof Coating

1) Standard of the Performance Assessment

Property of the modified sulfur application test was measured with following methods.

Adhesion strength: With Pull-off test method using PosiTest ATA model of DeFelsko Corporation to measure stress at the moment of coating detachment from iron base material, interface bonding characteristics between iron plate and modified sulfur were assessed.

Scratch resistance: By scratching surface of the coated film as a grid shape crossing each other using a diamond pen, detachment degree of the coating film was confirmed with naked eyes and optical microscope.

As in scratching the film with a diamond pen, the film resistance at the crossover point should be stronger to prevent detachment, it is accurate to judge the scratch resistance. Thus a case that the film is not detached at the crossover point was judged as pass and a case that the film is detached as fail.

Damage of test piece specimen after folding work: After twisting the film test piece applied to 2×10 cm of iron plate with 2 pliers, adhesion state between the film and the iron plate was confirmed. In observation with naked eyes, a case that the adhesion was not separated was judged as pass and a case that the film was detached or separated partially was judged as fail.

Salt spray resistance test: According to KS D 9502, the applied test piece was completely immersed in (5±1)% NaCl solution and left at 35±2 for 3 days. Then adhesion and corrosion state of the film was confirmed. In observation with naked eyes, a case that there was no corrosion was judged as pass and the other case was judged as fail.

Hardening time: This means a time required for hardening of film after application of modified sulfur, for which a time to reach the state that in rubbing the film with finger, the film is not removed and adheres strongly is assessed.

Sprayable minimum coating film thickness: Possible minimum thickness of film in spraying under same condition (types of sprayer, spray distance, air pressure) was measured.

Comparative Example 1 and Comparative Example 2

Using a film prepared by spraying commercially obtained hydrophilic anticorrosive material (manufactured by Dongwon Chem) to the target coating surface as the comparative example 1 and the modified sulfur coating film prepared by spraying the US modified sulfur heated and melted at 120 as comparative example 2, their adhesion strength, scratch resistance, folding work, salt spray test, hardening time, and sprayable minimum coating film thickness were assessed and the results were shown in Table 3.

3) Working Example 1 and Working Example 2

Modified Sulfur Coating Film Prepared by Spraying it Without Heating

Using a film prepared by spraying modified sulfur mixture dissolving the modified sulfur of the preparation example 2-1 in carbon disulfide solvent at RT without heating as the working example 1 and a film prepared by spraying modified sulfur mixture dissolving the modified sulfur of the preparation example 3-1 in carbon disulfide solvent at RT without heating as the working example 2, there properties of matter were measured and shown in below Table 3, same to the above comparative example 1 and 2.

4) Working Example 3 and Working Example 4

Modified Sulfur Coating Film Prepared by Spraying it After Heating

Using a modified sulfur coating film prepared by spraying the modified sulfur of the preparation example 2-2 heated and melted without solvent at 120 as comparative example 3 and a modified sulfur coating film prepared by spraying the modified sulfur of the preparation example 3-1 heated and melted without solvent at 120 as comparative example 4, their properties were assessed and the results were shown in Table 4.

5) Property Measurement Results

TABLE 4

| | Adhesion strength (MPa) | Scratch resistance | Folding work | Salt resistance test (KS D 9502) | Hardening time | Sprayable minimum coating film thickness |
|---|---|---|---|---|---|---|
| Comparative example 1 Spraying hydrophilic waterproof material without heating | 1.14 | Pass | Pass | Pass | >1 day | ≤about 3 mm |
| Comparative example 2 Spraying US type after heating | 0.53 | Fail | Fail | Pass | Within several min | ≤about 3 mm |

TABLE 4-continued

| | Adhesion strength (MPa) | Scratch resistance | Folding work | Salt resistance test (KS D 9502) | Hardening time | Sprayable minimum coating film thickness |
|---|---|---|---|---|---|---|
| Example 1 Spraying without heating | 1.07 | Pass | Pass | Pass | Within several seconds | ≤about 0.1 mm |
| EXAMPLE 2 Spraying without heating | 1.17 | Pass | Pass | Pass | Within several seconds | ≤about 0.1 mm |
| Example 3 Spraying after heating | 1.5 | Pass | Pass | Pass | Within several min | ≤about 3 mm |
| Example 4 Spraying after heating | 1.38 | Pass | Pass | Pass | Within several min | ≤about 3 mm |

The hydrophilic waterproof product commercially obtained to apply as comparative example 1 is an existing product widely used in steel industry and has some vivificated effects in all the items excluding slower hardening time, so-based on results of the comparative example 1, scratch resistance and folding work of the coating film of other comparative examples and working examples were tested.

In case of steel products applied with the waterproof material, they must needs reprocessing works including cutting, folding, bending, bolting and welding, so they must pass the above property tests durable to impacts during the reprocessing process.

6) Adhesion Strength, Scratch Resistance, Folding Work and Salt Resistance Test

In the adhesion strength results, it was identified that the example 3 and the example 4 showed improved adhesion strength than hydrophilic waterproof material, the example 1 and 2 prepared without heating showed same or lower adhesion strength and the comparative example 2 of the US method had the weakest adhesion strength.

In the results of scratch resistance and damage of test piece after folding work, it was identified that only the comparative example 2 failed the test and results of other comparative examples and working examples passed the property test.

In the results of salt spray resistance test, all test piece passed the test, but only elemental sulfur failed the salt test. It is because in moist condition, sulfur and iron react and develops rust but the modified sulfur has fundamentally strong anti-chemical property.

7) Hardening Time and Sprayable Minimum Coating Film Thickness Assessment

In the hardening time test results, it was found that the hydrophilic waterproof material was cured very slowly at RT even after 1 day; the comparative example 2, the example 3 and the example 4 sprayed after heating were cured within about 5 min; and the example 1 and example 2 sprayed at RT were cured rapidly within about 10 sec.

This is considered because easily evaporable solvent is not only sprayed but also diffused and evaporated in forwarding direction by air pressure.

In addition, it was identified that very thin coating film thickness could be formed by spray according to types and amount of solvent and it was considered that this was another important feature able to reduce the film hardening time.

In this industry, as sprayed steel products are produced continuously, moving fast on the conveyor belt and when slower hardening time may be led to lowering of productivity, the hardening time is an important factor.

Although a method to evaporate water in hydrophilic waterproof material to be sprayed by installing dry line on the conveyor line to reduce the hardening time, in spite of so much electric energy cost, current drying time is about 10 min, so it is an important task to reduce the hardening time.

Moreover, the welding thickness has close relationship with hardening time and production cost, so thinner is better if possible. However, the sprayable minimum film thickness of hydrophilic waterproof material is relatively thick as about 3 mm. However, it was identified that all the examples sprayed without heating could form remarkably thin coating film.

As results of analyzing all of the above factors comprehensively, it was assessed that the performance of modified sulfur waterproof material of the disclosure satisfied all property of matte equally or higher.

Folding Test Results (Experimental Example 12)

Images before and after folding test of the coating film using the example 3 in performance assessment of the waterproof coating film and images before and after folding test of the coating film using the comparative example 2 in performance assessment of the waterproof coating film were shown in FIG. 16~FIG. 19. As shown in the FIG. 16~FIG. 19, it was identified that folding features of the example of the disclosure were far superior. Concretely, although generally stripping of the film was observed with naked eyes in FIG. 19, there was no damage observed with naked eyes in the FIG. 17.

Experimental Example 13

DSC Results of Modified Sulfur

A graph showing DSC results of modified sulfur prepared by the preparation example 3-1 of the disclosure was shown in FIG. 16. As shown the graph in FIG. 16, it was identified that the DSC results of the modified sulfur were different significantly from the sulfur or dicyclopentadiene-based modifier prior to development of spinnability.

Experimental Example 14

Performance Assessment of Modified Sulfur Asphalt

1) Standard of the Performance Assessment

Asphalt able to substitute for high priced modified asphalt satisfying KSF 2389 (asphalt public standard) was prepared, its property was tested and compared with those of traditional products. Provided, the composition ratio of the modified sulfur in the preparation example was fixed to 5 parts by weight of DICYCLOPENTADIENE against 100 parts by weight of sulfur and specific initiators were mixed and used.

Softening point: According to KS M 2250, internal test of this laboratory was performed. The softening point was measure-based on the time that a steel ball placed on the center of modified sulfur asphalt mixture is contact with bottom of the mixture, during heating double boiling type oil bath in 5/min of speed.

Short term oxidation test (KS M 2259): Using RTFO (Rolling Thin Film Oven) test method, one of asphalt grading methods with viscosity in PG test items, short term oxidation test of asphalt material to test effect of heat and air on the asphalt film was performed. After leaving the modified sulfur asphalt in an air circulated heating dryer maintaining temperature as 163 for 75 min, viscosity and gelation of the modified sulfur asphalt composition were tested. The case developing gelation in observance with naked eyes was judged Fail and the case without gelation was judged pass.

Penetration degree: According to KS M 2252, penetration length of beaker needle with 2.5±0.02 g of weight attached to the top of circular weight with 50±0.05 g of weight was assessed as penetration degree, by placing modified sulfur asphalt composition maintaining constant temperature in a constant water tank at 25.

Elasticity modulus: It was assessed as percentage of original length of an object made of only modified sulfur to rebounding length to original state after pulling it maximally with same power in the laboratory.

2) Comparative Example 1~Comparative Example 5

Using commercially obtained straight asphalt (AP-5 product of SK Energy) as comparative example 1; an asphalt composition mixing elemental sulfur to the straight sulfur as comparative example 2; an asphalt composition mixing the US modified sulfur (U.S. Pat. No. 4,311,826) to the straight sulfur as comparative example 3, short term oxidation test (gelation development), elasticity modulus, penetration degree and softening point were assessed and their results were shown in the Table 3.

3) Working Example 1 and Working Example 2

Using the modified asphalt composition prepared by mixing the modified sulfur of the preparation example 2-2 and the straight asphalt as 1:1 weight ratio (volume ratio is 2:1, because the specific gravity of the modified sulfur is 2.07) as working example 1, the modified asphalt composition prepared by mixing the modified sulfur of the preparation example 3-1 and the straight asphalt as 1:1 weight ratio (volume ratio is 2:1, because the specific gravity of the modified sulfur is 2.07) as working example 2, their property results measured by same method with the comparative example 1~3 were shown in below Table 5.

4) Property Assessment Results

TABLE 5

| | Short term oxidation test (KS M 2259) (163.-75 min) | gelation development (130.) | Elasticity modulus (%) | Penetration (25.) | Softening point (.) |
|---|---|---|---|---|---|
| Comparative example 1 No-mix | Pass | — | <10% | 65 | ≤80. |
| Comparative example 2 Mixing elemental sulfur | Fail | Yes | 30% | 60 | ≤80. |
| Comparative example 3 Mixing US modified sulfur | Fail | Yes | 10% | 80 | ≤80. |
| Example 1 Mixing modified sulfur | Pass | No | 20% | 80 | ≤80. |
| Example 2 Mixing modified sulfur | Pass | No | 70% | 20 | ≥80. |

As the present features may be embodied in several forms without departing from the characteristics thereof, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

What is claimed is:

1. Equipment for preparing modified sulfur comprising:
   a reaction part comprising a first housing having a material inlet and a reactant outlet, and an ultrasonic wave generator for sonication in the first housing; and
   an ageing part comprising a second housing having a reactant inlet connected with the reactant outlet and a modified sulfur outlet, an ageing container for storing a reactant in the second housing, and a temperature maintenance device for maintaining a temperature in the ageing container,
   wherein the modified sulfur is a polymerization reaction product of a mixture comprising sulfur and dicyclopentadiene modifier.

2. The equipment of claim 1, wherein the modified sulfur outlet is disposed on at least one side of the ageing container, and comprises more than 2 outlets located on different distances from the reactant inlet.

3. The equipment of claim 1, wherein the modified sulfur outlet comprises a low viscosity outlet, a medium viscosity outlet, and a high viscosity outlet disposed on at least one side of the ageing container sequentially, and
   wherein a distance between the low viscosity outlet and the modified sulfur outlet is shorter than a distance between the high viscosity outlet and the modified sulfur outlet.

4. The equipment of claim 1, further comprising a flux controlling part for controlling flux of the reactant flown into the ageing part.

5. The equipment of claim 3, further comprising:
a low viscosity modified sulfur storing part connected to the low viscosity outlet; a medium viscosity modified sulfur storing part connected to the medium viscosity outlet; and a high viscosity modified sulfur storing part connected to the high viscosity outlet.

6. The equipment of claim 2, wherein the mixture further comprises an initiator, and through the material inlet, the mixture is put into the first housing in a certain ratio,
wherein the ultrasonic wave generator induces polymerization of the sulfur and the dicyclopentadiene-based modifier by sonicating the mixture with ultrasonic wave, and
wherein the temperature maintenance device maintains the temperature in the ageing container as ageing temperature at 120° C. or lower.

7. The equipment of claim 2, wherein the equipment prepares the modified sulfur in continuous manner and controls viscosity of the prepared modified sulfur by controlling the temperature in the ageing container and a retention time of the reactant to be flown into the ageing container.

* * * * *